United States Patent [19]
Allen et al.

[11] Patent Number: 5,515,499
[45] Date of Patent: May 7, 1996

[54] METHOD AND SYSTEM FOR RECONFIGURING A STORAGE STRUCTURE WITHIN A STRUCTURE PROCESSING FACILITY

[75] Inventors: Ruth A. Allen, Poughkeepsie, N.Y.; Jaime Anaya; Roger L. Brockmeyer, both of San Jose, Calif.; Lisa M. Goetze, Austin, Tex.; James C. Kleewein, San Jose, Calif.; Jeffrey M. Nick, Fishkill, N.Y.; Ronald E. Parrish, San Jose, Calif.; Kelly B. Pushong, Highland, N.Y.; David H. Surman, Milton, N.Y.; Michael D. Swanson, Poughkeepsie, N.Y.

[73] Assignee: International Business Machines Corporation, Armonk, N.Y.

[21] Appl. No.: 544,941

[22] Filed: Oct. 18, 1995

Related U.S. Application Data

[63] Continuation of Ser. No. 146,635, Nov. 1, 1993, abandoned.

[51] Int. Cl.⁶ .................................................. G06F 11/20
[52] U.S. Cl. ........................... 395/182.03; 395/182.13
[58] Field of Search ..................... 395/182.03, 182.02, 395/182.01, 182.13, 182.05, 182.04, 182.18

[56] References Cited

U.S. PATENT DOCUMENTS

| | | | |
|---|---|---|---|
| 3,680,052 | 7/1972 | Arulpragasam et al. | 340/172.5 |
| 3,787,816 | 1/1974 | Hauck et al. | 340/172.5 |
| 4,484,270 | 11/1984 | Quernemoen et al. | 364/200 |
| 4,660,141 | 4/1987 | Ceccon et al. | 364/200 |
| 4,951,192 | 8/1990 | Chase, Jr. et al. | 364/200 |
| 4,965,717 | 10/1990 | Cutts, Jr. et al. | 364/200 |
| 5,060,140 | 10/1991 | Brown et al. | 364/200 |
| 5,170,480 | 12/1992 | Mohan et al. | 395/600 |
| 5,191,651 | 3/1993 | Halim et al. | 395/200 |
| 5,193,168 | 3/1993 | Corrigan et al. | 395/425 |
| 5,197,146 | 3/1993 | LaFetra | 395/425 |
| 5,201,044 | 4/1993 | Frey, Jr. et al. | 395/575 |
| 5,220,654 | 6/1993 | Benson et al. | 395/275 |
| 5,276,823 | 1/1994 | Cutts, Jr. et al. | 395/575 |
| 5,295,258 | 3/1994 | Jewett et al. | 395/575 |

OTHER PUBLICATIONS

Curtis, Informix–Turbo, CompCon Spring '88 IEEE Computer Society International Conference, 1988, pp. 422–425.
Eliezer Levy & Avi Silberschatz, Incremental Recovery in Main Memory Database Systems, IEEE Transactions on Knowledge and Data Engineering, Dec. 1992, p. 529.
John R. Rymer, VNIX OLTP: Getting Ready for Commercial Prime Time, Seybold's Unix in the Office, Aug. 1990, p. 1.
Ron Carnahan, New Twists in Error Recovery, Systems Integration, Dec. 1989, p. 31.
King et al., Overview of Disaster Recovery for Transaction Processing, The 10th International Conference on Distributed Computing Systems, May 28, 1990, pp. 286–293.
ORACLE RDBMS Database Administrator's Guide Version 7.0, Developer's Release May 1992, pp. 1–14 to 1–26, 1–40 to 1–49, 2–5 to 2–6, 3–1 to 3–6, 3–12 to 3–14; Chapters 26 to 28; Appendix B1 to B5, C–25 to C–30, and E–21.

*Primary Examiner*—Hoa T. Nguyen
*Assistant Examiner*—Alan M. Fisch
*Attorney, Agent, or Firm*—Bernard M. Goldman; Joann K. Crockatt

[57] ABSTRACT

A method and system for rebuilding storage structures located within one or more structure processing facilities of a data processing system. A connection is made to a first storage structure having a name and one or more predefined characteristics. Thereafter, a second storage structure is allocated having the same name as the first structure, however, one or more of the predefined characteristics of the second structure are different than the predefined characteristics of the first structure. The second structure may be used for planned system reconfigurations or for recovery from system failures. During the rebuilding process, notification of phases of the rebuilding process are given to the active users. Further, a capability is provided for terminating the rebuilding process. In addition, a method and system for coordinating phases of user defined processing is provided.

27 Claims, 56 Drawing Sheets

LOCAL CACHE OF SYSTEM 1

20a

| NAME 60A | DATA | | STATE 68A |
|---|---|---|---|
| | 64A | 66A | |
| A | DATA | ADJ | VALID |
| C | DATA | ADJ | VALID |
| L | | | INVALID |
| X | DATA | ADJ | VALID |

LOCAL CACHE OF SYSTEM 2

20b

| NAME 60B | DATA | | STATE 68B |
|---|---|---|---|
| | 64B | 66B | |
| C | DATA | ADJ | VALID |
| B | DATA | ADJ | VALID |
| | | | INVALID |
| X | DATA | ADJ | VALID |

GLOBAL CTLS — 67

COUPLING FACILITY—16

STRUCTURE CONTROLS — 69      CACHE STRUCTURE—46

70 — LCCB

NAME (L)

| DIRECTORY | | | 72 |
|---|---|---|---|
| NAME 78 | STATE 80 | REG 82 | |
| A | | | |
| B | | | |
| C | | | |
| ⋮ | ⋮ | ⋮ | |
| X | | | |

| DATA 74 | ADJ 75 |
|---|---|
| DATA AREA 1 | ADJ AREA 1 |
| DATA AREA 2 | ADJ AREA 2 |
| DATA AREA 3 | ADJ AREA 3 |
| ⋮ | ⋮ |
| DATA AREA M | ADJ AREA M |

DASD—32

DATA BLOCKS

*fig. 3*

CACHE-STRUCTURE CONTROLS

| | |
|---|---|
| TOTAL-DIRECTORY-ENTRY COUNT | (TDEC) |
| TOTAL-DATA-AREA-ELEMENT COUNT | (TDAEC) |
| ADJUNCT-ASSIGNMENT INDICATOR | (AAI) |
| MAXIMUM STORAGE CLASS | (MSC) |
| MAXIMUM CAST-OUT CLASS | (MCC) |
| DATA-AREA-ELEMENT CHARACTERISTIC | (DAEX) |
| MAXIMUM DATA-AREA SIZE | (MDAS) |
| STRUCTURE SIZE | (SS) |
| MAXIMUM STRUCTURE SIZE | (MXSS) |
| MINIMUM STRUCTURE SIZE | (MNSS) |
| STRUCTURE AUTHORITY | (SAU) |
| USER STRUCTURE CONTROL | (USC) |
| LCID VECTOR | (LCIDV) |

DIRECTORY INFORMATION BLOCK

72

| | | |
|---|---|---|
| NAME | (N) | 78 |
| USER-DATA FIELD | (UDF) | |
| STORAGE CLASS | (SC) | |
| CHANGE INDICATOR | (C) | |
| DATA-CACHED INDICATOR | (D) | 80 |
| CAST-OUT-PARITY-BITS INDICATOR | (CP) | |
| CAST-OUT CLASS | (CC) | |
| CAST-OUT-LOCK VALUE | (CLV) | |
| DATA-AREA SIZE | (DAS) | |
| LOCAL-CACHE IDENTIFIER | (LCID) | |
| LCEN-VALIDITY INDICATOR | (LVI) | 82 |
| LOCAL-CACHE ENTRY NUMBER | (LCEN) | |

*fig. 6*

LIST-STRUCTURE CONTROLS

| | |
|---|---|
| MAXIMUM DATA-LIST-ENTRY SIZE | (MDLES) |
| LIST-STRUCTURE TYPE | (LST) |
| LOCK-TABLE-ENTRY CHARACTERISTIC | (LTEX) |
| LIST-ELEMENT CHARACTERISTIC | (LELX) |
| MINIMUM STRUCTURE SIZE | (MNSS) |
| LOCK-TABLE-ENTRY COUNT | (LTEC) |
| LIST COUNT | (LC) |
| STRUCTURE SIZE | (SS) |
| MAXIMUM STRUCTURE SIZE | (MXSS) |
| MAXIMUM LIST-SET-ELEMENT COUNT | (MLSELC) |
| LIST-SET-ELEMENT COUNT | (LSELC) |
| NON-ZERO-LOCK-TABLE-ENTRY COUNT | (NLTEC) |
| MAXIMUM LIST-SET-ENTRY COUNT | (MLSELC) |
| LIST-SET-ENTRY COUNT | (LSEC) |
| STRUCTURE AUTHORITY | (SAU) |
| USER STRUCTURE CONTROL | (USC) |
| USER-IDENTIFIER VECTOR | (UIDV) |

LIST-USER CONTROL BLOCK (LUCB)

94

| | |
|---|---|
| USER IDENTIFIER | (UID) |
| USER STATE | (US) |
| LIST-NOTIFICATION TOKEN | (LNT) |
| USER AUTHORITY | (UAU) |
| SYSTEM IDENTIFIER | (SYID) |
| USER-ATTACHMENT CONTROL | (UAC) |
| DETACHMENT RESTART TOKEN | (DURT) |

*fig. 9*

LIST ENTRY CONTROL BLOCK (LECB)

102

| | |
|---|---|
| DATA-LIST-ENTRY SIZE | (DLES) |
| LIST NUMBER | (LN) |
| LIST-ENTRY IDENTIFIER | (LEID) |
| VERSION NUMBER | (VN) |
| LIST-ENTRY KEY | (LEK) |
| LIST-ENTRY NAME | (LEN) |

*fig. 11*

LIST CONTROLS

| | |
|---|---|
| LIST-ENTRY-COUNT LIMIT | (LECL) |
| LIST-ENTRY-COUNT | (LEC) |
| LIST-STATE-TRANSITION COUNT | (LSTC) |
| LIST AUTHORITY | (LAU) |
| USER LIST CONTROLS | (ULC) |

LIST-MONITOR-TABLE ENTRY 0

LIST-MONITORING-ACTIVE BIT    (LMAB)

LIST-NOTIFICATION-REQUEST TYPE  (LNRT)

LIST-NOTIFICATION-ENTRY NUMBER  (LNEN)

LIST-MONITOR-TABLE ENTRY 1

LIST-MONITORING-ACTIVE

LIST-NOTIFICATION-REQUEST TYPE

LIST-NOTIFICATION-ENTRY NUMBER

...

LIST-MONITOR-TABLE ENTRY n

LIST-MONITORING-ACTIVE

LIST-NOTIFICATION-REQUEST TYPE

LIST-NOTIFICATION-ENTRY NUMBER

REQUEST/RESPONSE OPERANDS

| | |
|---|---|
| ATTACHMENT INFORMATION | (AINF) |
| COMPARATIVE LOCAL-CACHE AUTHORITY | (CLCAU) |
| COMPARATIVE STRUCTURE AUTHORITY | (CSAU) |
| COMPARATIVE USER AUTHORITY | (CUAU) |
| DETACHMENT-REQUEST TYPE | (DRT) |
| LIST-MONITORING-ACTIVE BIT | (LMAB) |
| LIST-NOTIFICATION-ENTRY NUMBER | (LNEN) |
| LIST-NOTIFICATION-TOKEN | (LNT) |
| LCID-UNASSIGNMENT CONTROL | (LUC) |
| LOCAL-CACHE AUTHORITY | (LCAU) |
| LOCAL-CACHE-ENTRY NUMBER | (LCEN) |
| LOCAL-CACHE IDENTIFIER | (LCID) |
| LOCAL-CACHE TOKEN | (LCT) |
| STRUCTURE AUTHORITY | (SAU) |
| USER-ATTACHMENT CONTROL | (UAC) |
| USER AUTHORITY | (UAU) |
| USER IDENTIFIER | (UID) |
| USER STATE | (US) |
| USER STRUCTURE CONTROL | (USC) |
| ALLOCATON TYPE | (AT) |

*fig. 13*

METHOD AND SYSTEM FOR RECONFIGURING A STORAGE STRUCTURE WITHIN A STRUCTURE PROCESSING FACILITY

This application is a continuation of application Ser. No. 08/146,635, filed Nov. 1, 1993, now abandoned.

TECHNICAL FIELD

This invention relates in general to the field of data processing and, in particular, to planned and unplanned reconfiguration of structures located within coupling facilities of a data processing system.

CROSS REFERENCE TO RELATED APPLICATIONS

This application contains subject matter which is related to the subject matter of the following applications which are assigned to the same assignee as this application. Each of the below listed applications is hereby incorporated by reference in its entirety:

"Configurable, Recoverable Parallel Bus," by N. G. Bartow et al., Ser. No. 07/839,657, (Docket No. PO9-91-066), Filed: Feb. 20, 1992, U.S. Pat. No. 5,357,608, Issued Oct. 18, 1994;

"Communications System Having Plurality of Origination and Corresponding Recipient Buffers With Each Buffer Having Three Different Logical Areas for Transmitting Messages in Single Transfer," by N. G. Bartow et al., Ser. No. 07/839,652, (Docket No. PO9-91-067), Filed: Feb. 20, 1992;

"Frame-Group Transmission And Reception For Parallel/Ser. Buses," by N. G. Bartow et al., Ser. No. 07/839,986, (Docket No. PO9-92-001), Filed: Feb. 20, 1992, U.S. Pat. No. 5,267,240, Issued Nov. 30, 1993;

"Communicating Messages Between Processors And A Coupling Facility," by D. A. Elko et al., Ser. No. 07/860,380, (Docket No. PO9-91-006), Filed: Mar. 30, 1992;

"Sysplex Shared Data Coherency Method And Means," by D. A. Elko et al., Ser. No. 07/860,805, (Docket No. PO9-91-052), Filed: Mar. 30, 1992;

"Method And Apparatus For Distributed Locking Of Shared Data, Employing A Central Coupling Facility," by D. A. Elko et al., Ser. No. 07/860,808, (Docket No. PO9-91-059), Filed: Mar. 30, 1992, U.S. Pat. No. 5,339,427, Issued Aug. 16, 1994;

"Command Quiesce Function," by D. A. Elko et al., Ser. No. 07/860,330, (Docket No. PO9-91-062), Filed: Mar. 30, 1992, U.S. Pat. No. 5,339,405, Issued Aug. 16, 1994;

"Storage Element For A Shared Electronic Storage Cache," by D. A. Elko et al., Ser. No. 07/860,807, (Docket No. PO9-91-078), Filed: Mar. 30, 1992;

"Management Of Data Movement From A SES Cache To DASD," by D. A. Elko et al., Ser. No. 07/860,806, (Docket No. PO9-91-079), Filed: Mar. 30, 1992;

"Command Retry System," by D. A. Elko et al., Ser. No. 07/860,378, (Docket No. PO9-92-002), Filed: Mar. 30, 1992, U.S. Pat. No. 5,392,397, Issued Feb. 21, 1995;

"Integrity Of Data Objects Used To Maintain State Information For Shared Data At A Local Complex, " by D. A. Elko et al , Ser. No. 07/860,800, (Docket No. PO9-92-003), Filed: Mar. 30, 1992, U.S. Pat. No. 5,331,673, Issued Jul. 19, 1994;

"Management Of Data Objects Used To Maintain State Information For Shared Data At A Local Complex," by J. A. Frey et al., Ser. No. 07/860,797, (Docket No. PO9-92-004), Filed: Mar. 30, 1992, U.S. Pat. No. 5,388,266, Issued Feb. 07, 1995;

"Recovery Of Data Objects Used To Maintain State Information For Shared Data At A Local Complex," by J. A. Frey et al., Ser. No. 07/860,647, (Docket No. PO9-92-005), Filed: Mar. 30, 1992, U.S. Pat. No. 5,394,542, Issued Feb. 28, 1995;

"Message Path Mechanism For Managing Connections Between Processors And A Coupling Facility," by D. A. Elko et al., Ser. No. 07/860,646, (Docket No. PO9-92-006), Filed: Mar. 30, 1992, (Abandoned); File Wrapper Continuation application Ser. No. 08/324,447, Filed Oct. 18, 1994;

"Data Processing System And Method For Providing Notification To A Central Processor of State Changes For Shared Data Structure On External Storage," by J. A. Frey et al., Ser. No. 07/860,809, (Docket No. PO9-92-007), Filed: Mar. 30, 1992, U.S. Pat. No. 5,390,328, Issued Feb. 14, 1995;

"Method And Apparatus For Performing Conditional Operations On Externally Shared Data," by J. A. Frey et al., Ser. No. 07/860,655, (Docket No. PO9-92-008), Filed: Mar. 30, 1992 (Abandoned); File Wrapper Continuation application Ser. No. 08/383,532, Filed Feb. 01, 1995;

"Apparatus And Method For List Management In A Coupled Data Processing System," by J. A. Frey et al., Ser. No. 07/860,633, (Docket No. PO9-92-009), Filed: Mar. 30, 1992;

"Interdicting I/O And Messaging Operations In A Multi-System Complex," by D. A. Elko et al , Ser. No. 07/860,489, (Docket No. PO9-92-010), Filed: Mar. 30, 1992;

"Method And Apparatus For Coupling Data Processing Systems," by Elko et al., Ser. No. 07/860,803, (Docket No. PO9-92-012), Filed: Mar. 30, 1992, U.S. Pat. No. 5,317,739, Issued May 31, 1994;

"Authorization Method For Conditional Command Execution," by Elko et al , Ser. No. 08/021,285, (Docket No. PO9-92-018), Filed Feb. 22, 1993 (Abandoned); File Wrapper Continuation Application Filed Mar. 22, 1995;

"A Dumping Service Facility For Multisystem Environment," by Elko et al , Ser. No. 08/073,909 (Docket No. P09-92-068), Filed Jun. 08, 1993;

"A Method And System For Capturing and Controlling Access To Information In A Coupling Facility," by Neuhard et al., Ser. No. 08/146,647 (Docket No. KI9-93-004), Filed Nov. 01, 1993;

"A Method And System For Managing Data and Users of Data in a Data Processing System, by Allen et. al., Ser. No. 08/146,727 (Docket No. KI9-93-009 ), Filed Nov. 01, 1993; and "A Method And System For Managing One or More Coupling Facilities in a Data Processing System, by Allen et. al., Ser. No. 08/148,075 (Docket No. KI9-93-008), Filed Nov. 01, 1993.

BACKGROUND ART

Many existing data processing systems require multiple copies of control information and data so that recovery from a failing system or reconfiguration of a system may be provided. The ability to have a duplexed copy of information is known to be achieved through hardware and software services. Significant difficulties are encountered in maintaining duplexed copies of data, however.

Specifically, performance is disadvantageously impacted if the duplexed copies are recorded one after the other. If the duplexed copies are recorded concurrently, significant complexity is created in assuring at least one correct copy exists and in synchronizing the overlap of operations to minimize the performance degradation.

Further, duplexed copies provide an exact replica onto media. Should a logical error occur in the requests which place data on the data store, that logical error is propagated to both copies of the data. A further disadvantage of duplexed data occurs in those environments where an exact second copy is not required. For instance, in those systems in which information is recreated from logs or journals of prior activity, a duplexed copy of control information and data is not needed.

In many instances, to have a duplexed copy of control information and data would be disadvantageous as it would increase the quantity of storage required, significantly increase the management of data information, and greatly increase the complexity of either or both, the hardware and software supporting the duplexed operations. These complexities may fail to provide the availability improvement anticipated by the duplexing capability in as much as the complexity associated with establishing, maintaining and switching to a duplexed copy are often error prone and difficult to test for correct operation.

A second technique in which more than one copy of control information and data is maintained is found in existing systems which support versioning of the information. Through versioning, multiple occurrences of control information and data may exist at different levels of currency. It is typical in such systems for a copy of the control information and data to be taken at established points in time. Such copies may be complete copies of all of the relevant control information and data or may be increment copies of portions of the relevant data store.

In order to recover from a failure of the control information and data store, a previous version is typically restored and incremental changes are applied from journals or logs. This requires that each user of the data store maintain a journal or a log of changes made following creation of a version. This requirement is extremely expensive, both from a performance and product development cost perspective. The performance disadvantage comes from requiring that any recoverable change in the data store be recorded on the log or journal prior to completing the unit of work requesting the change. Complexity and costs occur in developing the log or journal code to support a wide variety of workloads, with widely varying arrival rates and execution path lengths.

A versioning approach does not provide the flexibility to support recovery coordination and dynamically access two instances of the data store concurrently to achieve the necessary recovery operation.

Based on the foregoing, a need exists for a technique for providing a structure that is not an exact duplication of a related structure but can be used effectively for recovery from system failure or planned reconfiguration. A further need exists for a method and system for providing a rebuilt structure which does not degrade system performance or add to the complexity of the system. A further need exists for a technique that will synchronize the two instances of the structure, which are not identical and which do not require the maintenance and use of a recovery log.

SUMMARY OF THE INVENTION

The shortcomings of the prior art are overcome and additional advantages are provided through the provision of a method for rebuilding a structure located in a data processing system. A connection is made to a first structure having one or more predefined characteristics. The first structure has a name. A second structure having the same name as the first structure is allocated. The second structure has one or more predefined characteristics different from the first structure. In one embodiment, the first structure and the second structure are located within the same coupling facility. However, in another embodiment, the first and second structures are located within different coupling facilities of the data processing system.

In one embodiment, one or more users are notified of the allocation of the second structure. The users to be notified are those users which are active. In addition, one or more synchronization points are established. A response is provided for each of the synchronization points, and a next synchronization point is established after a response is received for a previous synchronization point.

In one embodiment, prior to allocating the second structure, a rebuild service is initiated, and after initiation of the rebuild service, activity against the first structure is quiesced. In addition, after allocation of the second structure, information is built into the second structure. In a further embodiment, any references to the first structure are removed subsequent to building information into the second structure.

In one example, the rebuild service is initiated either by an operator command or a program. Further, quiescing is performed by completing any outstanding requests and preventing new requests against the first structure.

In yet a further embodiment, a rebuild process is initiated prior to the allocation of the second structure. Further, one or more users are connected to a first structure and one or more users are connected to a second structure. During the rebuild process, one of the users of either the first or the second structure terminates. When a user terminates, each user connection to the first and second structures are cleaned up and the allocation of the first and second structure are cleaned up.

In a further embodiment, the user to terminate is the last user connected to a structure. If the last user terminates, clean up is based on the phase of rebuild processing. Should the phase be a cleanup phase, then each user connection to the first structure and the allocation of the first structure are cleaned up. If the phase is prior to the cleanup phase, then each user connection to the second structure and the allocation of the second structure are cleaned up.

In yet another embodiment of the invention, one or more user defined synchronization events is provided. Each user defined synchronization event is responded to, and a next user defined synchronization event is established after a response is received for a previous user defined synchronization event.

In another embodiment of the invention, a method for coordinating phases of user defined processing is provided. A user is connected to a structure and one or more user defined synchronization events are provided to the user.

In another aspect of the invention, a system for rebuilding a structure located in a data processing system is provided. The system includes a means for connecting to a first structure having one or more predefined characteristics and a name. Means are also provided for allocating a second structure having the same name as the first structure. The second structure has one or more predefined characteristics different from the first structure.

In another embodiment of the invention, means for initiating a rebuild service prior to allocation of the second structure, means for quiescing activity against the first structure after initiation of the rebuild service and means for building information into the second structure after allocation of the second structure are provided.

In a further aspect of the present invention, a system for coordinating phases of user defined processing is provided. Means are provided for connecting a user to a structure and for providing the user with one or more user defined synchronization events.

In accordance with the principles of the present invention, a structure rebuild method and system is provided. Advantageously, the method and system of the present invention provide for the creation of two structures which have different characteristics but the same name. Therefore, duplication of data and control information is avoided. The technique of the present invention allows diversity of recovery protocol based on the connector's ability to rebuild from local copies. It is possible to start with an initialized structure and to repopulate only those data items which change. In addition, the technique allows for the synchronization of two instances of a structure which are not identical and which do not require the maintenance and use of a recovery log.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention will be apparent from the following detailed description taken in conjunction with the accompanying drawings in which:

FIG. 3 depicts one embodiment of a three-level storage hierarchy in a network of attached processors, in accordance with the principles of the present invention;

FIG. 4 depicts one example of the controls associated with a cache structure, in accordance with the principles of the present invention;

FIG. 6 depicts one embodiment of a directory information block in connection with the directory depicted in FIG. 3, in accordance with the principles of the present invention;

FIG. 8 depicts one example of the controls associated with the list structure of FIG. 7, in accordance with the principles of the present invention;

FIG. 9 depicts one embodiment of a list-user control block, in accordance with the principles of the present invention;

FIG. 10 depicts one example of the controls associated with a list within the list structure of FIG. 7, in accordance with the principles of the present invention;

FIG. 11 illustrates one example of a list entry control block, in accordance with the principles of the present invention;

FIG. 13 depicts one embodiment of request/response operands, in accordance with the principles of the present invention;

FIG. 25 depicts one embodiment of the logic associated with a deallocate structure command, in accordance with the principles of the present invention;

BEST MODE FOR CARRYING OUT THE INVENTION

In accordance with the principles of the present invention, a mechanism is provided to rebuild a coupling facility structure. Two coupling facility structures may be allocated and associated with a single named coupling facility structure. The rebuild process may be initiated through, for example, a program interface or operator command. When rebuild is initiated, if the targeted coupling facility structure is accessible, the ability exists for both the original and newly allocated structure to be accessed during the rebuild process. The second coupling facility structure may have characteristics different from the original coupling facility structure. This includes changes in the size of the structure, coupling facility in which the structure resided, and attributes unique to the type of coupling facility structure.

Figure 1:
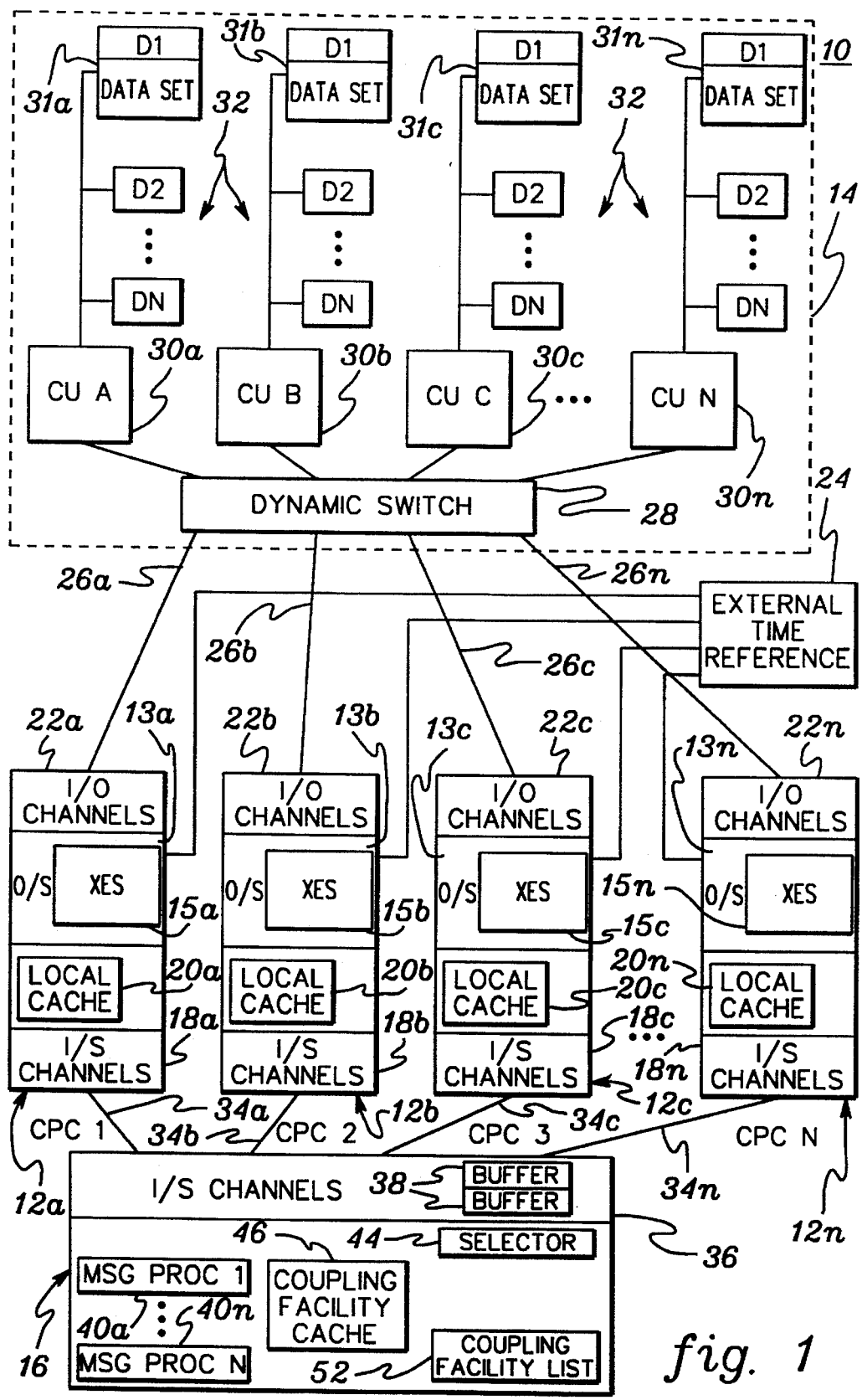
FIG. 1 depicts one example of a block diagram of a data processing system incorporating a Cross-Systems Extended Services (XES) facility of the present invention.

FIG. 1 is a block diagram of a data processing system 10 incorporating the rebuild capability, and in particular the Cross-System Extended Services capability of the present invention. Data processing system 10 includes multiple central processing complexes (CPCs) 12a through 12n which are coupled to an input/output (I/O) system 14 and a coupling facility 16. (As used herein, central processing complexes 12a–12n are collectively referred to as central processing complex (CPC) 12.) The main components associated with each central processing complex 12, input/output system 14 and coupling facility 16 are described in detail below. (While the invention is described in relation to a multisystem environment, such as the one depicted in FIG. 1, it can also be used with a single system environment, which includes one central processing complex 12.)

Each of the CPCs 12a–12n may be an International Business Machines' (IBM) system following the Enterprise Systems Architecture/390 Principles of Operation as described in IBM publication SA22-720100, which is hereby incorporated by reference in its entirety. Each of CPCs 12a–12n includes one or more central processing units (CPUs) (not shown) which executes an operating system 13a–13n, respectively. As used herein, operating systems 13a–13n are collectively referred to as operating system 13. In one instance, operating system 13 is an International Business Machines' Multiple Virtual Storage (MVS) operating system for controlling execution of programs and the processing of data, as is well known. In addition, in accordance with the principles of the present invention, each operating system 13a–13n includes a Cross-System Extended Services (XES) facility 15a–15n, respectively, for managing and accessing information in a coupling facility and for providing the rebuild capability, as described further below.

In addition, each CPC 12a–12n contains a plurality of intersystem (I/S) channels 18a–18n, a plurality of local caches 20a–20n, and a plurality of input/output (I/O) channels 22a–22n, respectively. (Local caches 20a–20n are referred to herein collectively as local cache 20. Similarly, intersystem channels 18a–18n and input/output channels 22a–22n are collectively referred to as intersystem channels 18 and input/output channels 22, respectively.) It will be understood that input/output channels 22 are part of the well known channel subsystem (CSS), which also includes intersystem channels 18 disclosed herein, even though channels 18 and 22 are shown separately in FIG. 1 for convenience.

Coupled to each CPC 12a–12n is an external time reference (ETR) 24, which provides time stamps of control information to be written into a log to document recovery from failures, backing out of undesired operations and for audit trails. External time reference 24, which uses fiber optic interconnect cables, synchronizes the time clocks (not shown) of CPCs 12a–12n to a precision equal to or greater than the duration of the shortest externally visible operation. External time reference 24 provides for cable length propagation time differences, where those differences are important, in order to be able to maintain synchronization to within the length of the mentioned external operation.

As depicted in FIG. 1, each central processing complex 12a–12n is coupled via a link 26a–26n, respectively, to input/output system 14. Input/output system 14 includes, for example, a dynamic switch 28, which controls access to multiple input/output (I/O) control units (CU) 30a through 30n and one or more direct access storage devices (DASD) D1 through DN (collectively referred to as DASD 32), which are controlled by the control units. Dynamic switch 28 may be an ESCON Director Dynamic Switch available from IBM Corporation, Armonk, N.Y. Such a dynamic switch is disclosed in U.S. patent application Ser. No. 07/429,267 for "Switch and its Protocol," filed Oct. 30, 1989 and assigned to the owner of the present invention, which application is incorporated herein by reference in its entirety. As is known, input/output commands and data are sent from a central processing complex 12a–12n to an I/O control unit 30a–30n through dynamic switch 28 by means of I/O channels 22a through 22n of the respective CPCs 12a through 12n. Channel programs for a particular I/O channel are established by channel command words (CCWs), as is well known in the art.

One or more of direct access storage devices 32 includes one or more data sets 31a–31n, respectively. In particular, DASD 32 may include one or more couple data sets for storing status information relating to one or more CPCs 12 (i.e., read information for all CPCs and write information relating to one CPC) and/or one or more function data sets for storing the active policy, as described in detail below. In one embodiment, the couple and function data sets are not stored on the same DASD data set or volume.

Each central processing complex 12a–12n is also coupled via a bus 34a–34n, respectively, to coupling facility 16. Coupling facility 16 contains storage accessible by the CPCs, performs operations requested by programs in the CPCs and maintains status regarding structures and users of structures located within the coupling facility. The coupling facility enables sharing of data, which is directly accessible by multiple operating systems. As described further below, the coupling facility contains control information regarding shared data and may contain shared data. In one embodiment, coupling facility 16 is a structured-external storage (SES) processor and includes, for example, a plurality of intersystem (I/S) channels 36 for communicating with intersystem channels 18a–18n, one or more buffers 38 located within intersystem channels 36 for storing data received from intersystem channels 18a–18n, message processors 40a–40n for handling messages, a selector 44 for directing message requests received over an intersystem channel to a message processor 40a–40n, a coupling facility cache 46 and a coupling facility list 52, which are described in further detail below. Even though only one coupling facility 16 is shown in the embodiment of FIG. 1, it will be understood that multiple coupling facilities may be provided for, each with its own I/S channels and message paths connected to all or some subset of the CPCs 12a–12n.

Figures 2, 5:
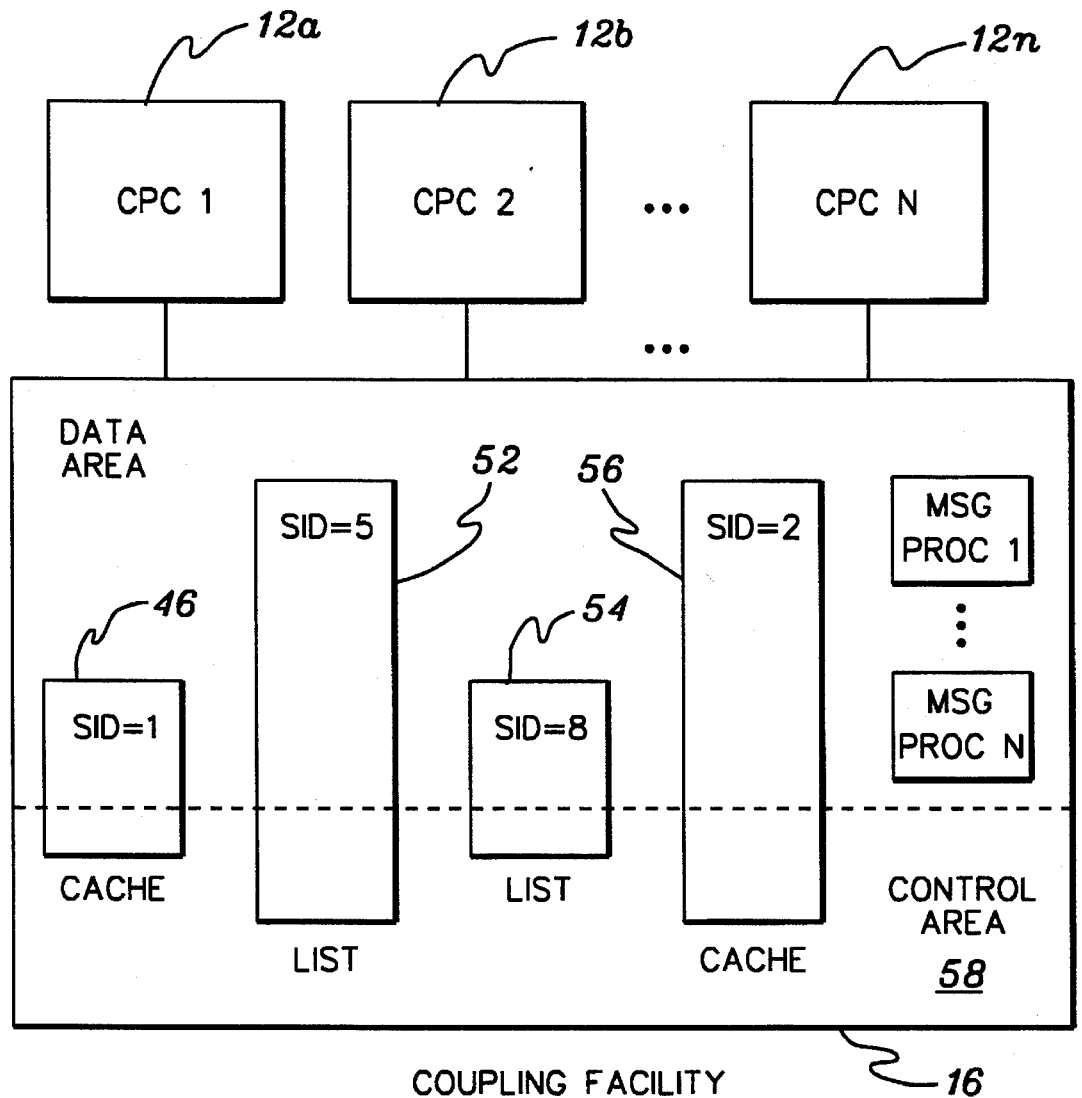
FIG. 2 depicts one example of a coupling facility including multiple storage structures, in accordance with the principles of the present invention.
FIG. 5 depicts one example of a local cache control block associated with each local cache of the data processing system depicted in FIG. 1, in accordance with the principles of the present invention.

Coupling facility cache 46 of coupling facility 16 is one example of a coupling facility storage structure. As shown in FIG. 2, coupling facility 16 includes multiple storage structures, such as storage structures 46, 52, 54 and 56. The storage structures include, for instance, list structures (for example, 52 and 54) and cache structures (for example, 46 and 56). Each coupling facility storage structure contains data objects and control objects. The data objects may reside in any storage location, whereas the control objects are generally restricted to control area 58.

Allocated structures (such as cache structures 46 and 56 and list structures 52 and 54) reside in separate coupling facility storage locations and are located by a structure identifier (SID). The SID value provides an identification of a target structure by a command. A command of a particular structure type, such as a cache-structure or list-structure command, may only address or alter the contents of a single structure of the given type. The allocation of a structure is described in detail below.

Figure 7:
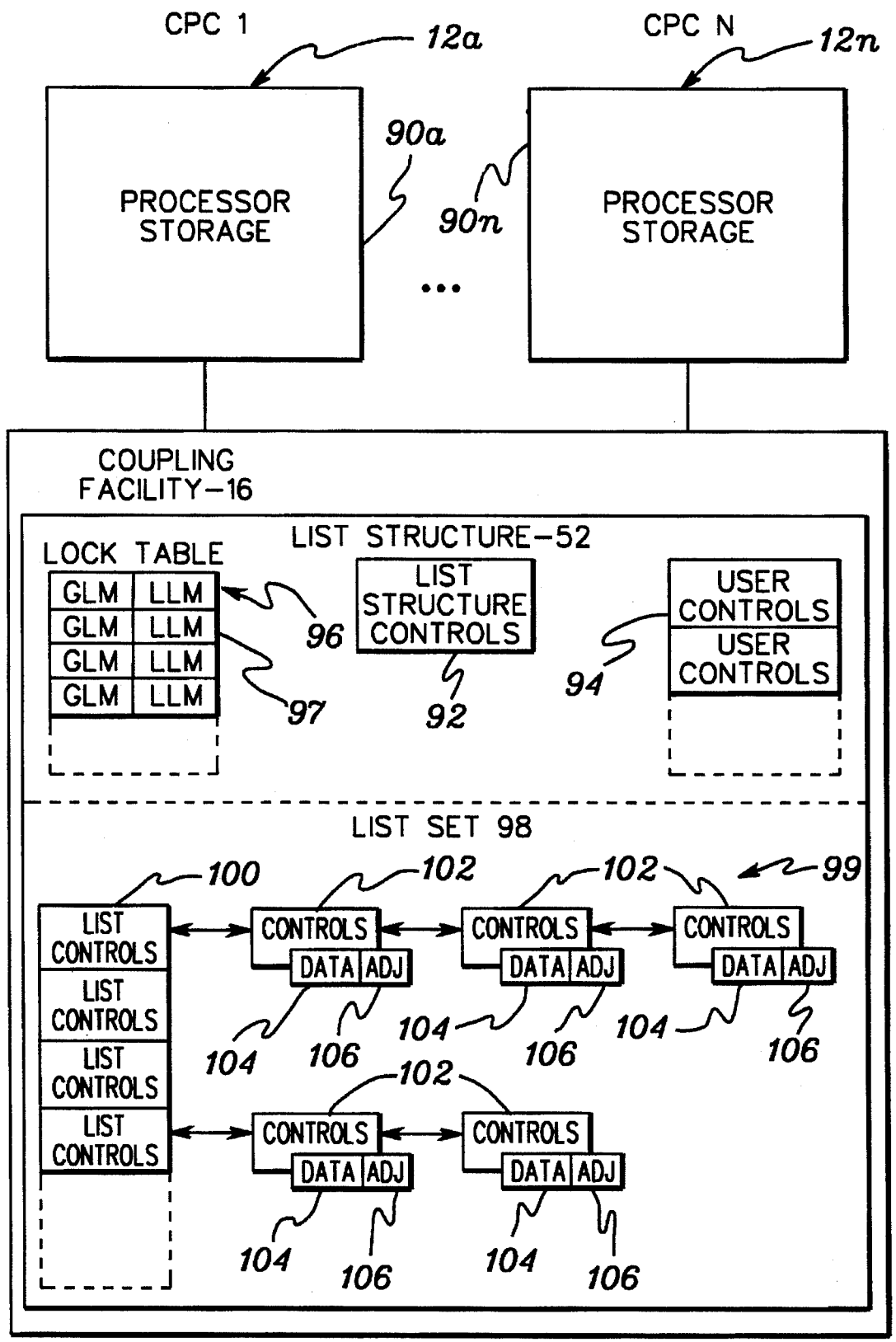
FIG. 7 depicts one example of a list structure, in accordance with the principles of the present invention.

The partitioning of the coupling facility storage and control area 58 into structures, as shown in FIGS. 2, 3 and 7, is managed by the operating system program. The data objects are organized in tables or lists with an optional adjunct data area. The remaining objects are controls. The relative amount of storage assigned to data and control objects is determined by program-specified parameters in the allocation commands.

Referring to FIG. 3, a three-level storage hierarchy in a network of attached processors 12a–12n is described. The lowest level of hierarchy is DASD 32, the intermediate level is coupling facility cache structure 46, and the highest level is local cache 20 (e.g., local caches 20a and 20b). Each of these levels is described below.

Direct access storage devices 32 include data blocks which represent data stored in the devices. Local caches 20a and 20b include, for instance, a 16-byte name field 60A, 60B for referencing data; a data field 64A, 64B for storing the data; an optional adjunct data field 66A, 66B for additional data; and a state field 68A, 68B, respectively, for indicating whether the data is valid or invalid. When the data is located in local cache 20, the state of the data is either valid or invalid. The data is validated by CPU instructions and invalidated by, for example, SES-write and SES-invalidate operations. The valid state of the data is tested by a CPU instruction. A valid named data object must be registered in a coupling facility cache directory, described below, in order to maintain local cache coherency. Local cache coherency is maintained by the invalidation process. A registered local-cache entry may test as invalid.

Cache structure 46 includes, for instance, a number of cache structure controls 69, a number of local-cache control blocks (LCCB) 70, a directory 72, a data area 74, and an adjunct area 75, each of which is explained in further detail below.

As shown in FIG. 4, cache structure controls 69 include, for instance, the following controls:

(a) Total-Directory-Entry Count (TDEC): A value that specifies the number of directory entries allocated for the cache.

(b) Total-Data-Area-Element Count (TDAEC): A value that specifies the number of data-area elements allocated for the cache.

(c) Adjunct-Assignment Indicator (AAI): A value that indicates the presence or absence of adjunct areas. Two possible values are: adjunct areas not assigned; adjunct areas assigned. When adjunct areas are assigned, an adjunct area is associated with each directory entry.

(d) Maximum Storage Class (MSC): A value that specifies the number of storage classes. Valid storage class values range from one to the maximum storage class value.

(e) Maximum Cast-Out Class (MCC): A value that specifies the number of cast-out classes. Valid cast-out class values range from one to the maximum cast-out class value.

(f) Data-Area-Element Characteristic (DAEX): A value that specifies the number of bytes in each data-area element. The size of the data-area element in bytes is the product of 256 and 2 raised to the power of the value specified in the data-area element characteristic.

(g) Maximum Data-Area Size (MDAS): A value that specifies the maximum allowable size of a data area as an integral multiple of the data-area-element size. The maximum data-area size is set by the program when the cache is allocated.

(h) Structure Size (SS): A value that specifies the number of units of, for example, SES storage allocated for the cache.

(i) Maximum Structure Size (MXSS): A value that specifies the maximum number of units of SES storage that can be allocated for the cache.

(j) Minimum Structure Size (MNSS): A value that specifies the minimum number of units of SES storage that can be allocated for the cache.

(k) Structure Authority (SAU): A value associated with each bit in a SID vector, described herein. The structure authority has two parts: A time of day (TOD), which reflects the moment when a system was allocating the structure and the system ID used to make the TOD unique. Paired with the sysplex name, it further identifies who caused the structure to be allocated.

(l) User Structure Control (USC): A value defined by the user.

(m) LCID Vector (LCIDV): A bit string with an initial value of zero. The bit positions start at zero and increase sequentially to the local-cache-identifier limit. The bit at position (i) in the string is set to one when a local cache is attached with a local-cache identifier (LCID) value of (i). When the bit is one, the local-cache-identifier is assigned. The bit at position (i) is reset to zero when the local cache is detached and LCID unassignment is requested, when the cache structure is de-allocated, or when a SES power-on reset occurs. When the bit is zero, the local-cache-identifier is not assigned.

A local cache may have, for instance, local-cache states and local-cache-identifier states, described below:

Local-Cache States: A cache structure local cache exists when the associated local-cache identifier is assigned. When a local cache exists, it is either in the attached or the detached state. A local cache is placed in the attached state by an attach-local-cache command, described below. A local cache is placed in the detached state by a detach-local-cache command, also described below, when the detachment process is complete.

Local-Cache-Identifier States: A local-cache identifier is in the assigned state when the associated assigned bit in the local-cache-identifier vector is one. A local-cache identifier is placed in the assigned state by the attach-local-cache command. A local-cache identifier is in the unassigned state when the associated bit in the local-cache-identifier vector is zero. A local-cache identifier is placed in the unassigned state by the detach-local-cache command, depending on LCID-unassignment control, described herein.

As mentioned above, in addition to structure controls 69, cache structure 46 includes local-cache control block 70. Local-cache control block 70 includes a number of local cache controls, described below, which are initialized when a local cache is attached to a coupling facility cache. In one embodiment, local-cache control block 70 includes the following fields (FIG. 5):

(a) Local-Cache Identifier (LCID): A value that identifies a local cache. The controls are deleted when the local-cache identifier is unassigned and they are valid when the local-cache identifier is assigned.

(b) Attachment Status (AS): A control that describes the state of the attachment of a local cache. When the value of the attachment status is one, the local cache is active (attached). When the value of the attachment status is zero, the local cache is inactive (detached).

The attachment status controls the execution of commands that specify the local cache. When the local cache is active (attached), all commands that specify the local cache are processed normally. When the local cache is inactive (detached), all commands that specify the local cache, except attach local-cache, detach local-cache and read local-cache information are suppressed with a request-exception condition.

(c) Local-Cache Token (LCT): A value used to identify the local cache on the CPC.

(d) Local-Cache Authority (LCAU): A value set by the program when the local cache is attached.

(e) System Identifier (SYID): A value specified by the program when a message path, used to communicate commands and messages (as described in co-pending U.S. patent applications entitled, "Communicating Messages Between Processors And A Coupling Facility," by D. A. Elko et al., Ser. No. 07/860,380, (Docket No. PO9-91-006), Filed: Mar. 30, 1992 and "Message Path Mechanism For Managing Connections Between Processors And A Coupling Facility," by D. A. Elko et al., Ser. No. 07/860,646, (Docket No. PO9-92-006), Filed: Mar. 30, 1992, each of which is hereby incorporated herein by reference in its entirety) is activated. The system identifier is maintained in a message-path status vector and copied into the local cache controls when an attach-local-cache command is communicated over the message path.

(f) Attachment Information (AINF): A value set by the program when the local cache is attached.

(g) Detachment Restart Token (DURT): A value used to indicate how far along a detachment process has proceeded.

Referring back to FIG. 3, cache structure 46 also includes a directory 72. Directory 72 is a collection of directory entries positioned into storage classes and arranged as a fully associative array. The directory is a repository of state and location information for the storage hierarchy. The subset of changed directory entries is additionally positioned into cast-out classes. As described with reference to FIGS. 3 and 6, directory 72 includes a name field 78, a state field 80 for indicating the state of each directory entry and a register field 82, described below. Whenever a named data object is placed in the higher two levels of the storage hierarchy (i.e., coupling facility cache structure 46 and local cache 20), its name is registered in name column 78 and its state is registered in state column 80 by coupling facility cache directory 72. In general, state information indicates whether the data is changed, unchanged, locked for cast-out, or resident in coupling facility 16. In particular, state field 80 includes:

(a) A User-Data Field (UDF): The user-data field contains a value that is associated with the data when it is initially changed in the SES cache and is maintained until the data area is re-used. The user-data field is valid when the data is cached as changed.

(b) A Storage Class (SC): A value which identifies the storage class assigned for the name.

(c) A Change Indicator (C): A value which, in conjunction with the cast-out lock, indicates the changed state of the data. When the change bit is one, the data is cached as changed. When the change bit is zero and the data is not locked for cast-out, the data is either not cached, or is cached but not changed. When the change bit is zero and the data is locked for cast-out, the data is cached as changed. Whenever the data is in the changed state, the most recent version of the data resides in the cache. When the change bit is one, the data bit must also be one.

(d) A Data-Cached Indicator (D): A value which indicates whether the data is located in the SES cache. When the data bit is one, the data is cached. When the data bit is zero, the data is not cached.

(e) A Cast-Out-Parity-Bits Indicator (CP): A field which indicates the current assignment of the cast-out parity. Three possible values are: cast-out parity is zero; cast-out parity is one; the cast-out parity is unknown.

(f) A Cast-Out Class (CC): A value which identifies the cast-out class assigned for the name.

(g) A Cast-Out-Lock Value (CLV): A value which indicates the cast-out state of the data. When the cast-out lock is zero, the data is not being cast-out. When the cast-out lock is not zero, the value of the first byte of the cast-out lock identifies the local cache that is casting out the data block from the SES cache to DASD. The value of the second byte identifies the cast-out process on the local system. When the cast-out lock is not zero, the data bit must be one.

(h) A Data-Area Size (DAS): A value that specifies the size of the data area as an integral multiple of the data-area-element size. The initial value is zero when the directory entry is assigned and is zero until the data bit is set to one.

In addition to the above, register 82 is a table containing information on the location of the locally cached copies of the data block. Each row in the table corresponds to an attached local cache. The columns contain the local cache identifier (LCID), local-cache-entry number (LCEN) and a valid bit (LVI) for the local-cache-entry number. A valid local-cache-entry number is registered in the local-cache register when the registration process is executed for the specified name and local cache. A local-cache-entry number is invalidated when a local cache is detached, or when a local copy invalidation process is executed for the specified name and the local cache is a member of the set of local caches being invalidated. The LCEN field is invalid, when LVI is zero.

Location information includes which of the local caches 20a–20n contains a copy. Certain SES-read and SES-write commands register the local cache copy in coupling facility directory 72. SES write and SES-invalidate commands remove the registration and invalidate local copies.

Cache structure 46 further includes data areas 74 and optional adjunct data areas 75. The data sizes are variable with the range of variability being, in one embodiment, between 1 and n times the data-area element size. The data-area element size is fixed for each coupling facility cache structure 46 and is a power of 2 with a minimum size of 256 bytes.

Coupling facility cache 46 is normally smaller than DASD storage 32. Thus, periodically, the changed data is transferred from cache 46 to the backing DASD 32 (FIG. 3). This process, called cast-out, is controlled by the operating system program. In one embodiment, a control associated with a cast-out class includes a cast-out class count, which indicates the number of elements associated with the cast-out class. Cast-out involves for a coupling facility, such as a SES facility, the following operations:

A SES-read for cast-out operation is issued that sets the cast-out serialization and copies the data block to main storage which may or may not be put in local cache 20.

An I/O operation is executed that copies the data block to DASD 32.

A SES-unlock cast-out locks operation is issued that releases the cast-out serialization.

Multiple cast-out processes may co-exist for a single one of local caches 20a-20n. Whenever data is locked for cast-out, an identifier for local cache 20a–20n and an identifier for the cast-out process are placed in directory 72. This is disclosed in U.S. patent application Ser. No. 07/860, 806 for "Management of Data Movement from a SES Cache to DASD" by D. A. Elko, et al. (Attorney Docket No. PO9-91-079), incorporated herein by reference in its entirety as noted.

Described in detail above is one example of a cache storage structure. In addition to cache structures, there are list structures, such as list structure 52, depicted in FIGS. 2 and 7. Referring to FIG. 7, the contents of a list structure, such as list structure 52, are described in detail.

List structure 52 resides within coupling facility 16. As shown in FIG. 7, in one embodiment, coupling facility 16 is coupled to processor storage 90a–90n located within each CPC 12a–12n, respectively. List structure 52 includes list-structure controls 92, user controls 94 and, optionally, a lock table 96, and/or a list set 98. List set 98 includes list controls 100 and list-entry controls 102. Each of the components of list structure 52 is described in detail below.

List structure controls 92 contain attributes of the structure and are initialized when list structure 52 is created. One example of the controls associated with list structure controls 92 is depicted in FIG. 8. Referring to FIG. 8, list structure controls 92 include, for example:

(a) Maximum Data-List-Entry Size (MDLES): An object or field that specifies the maximum size of the data list entry.

(b) List-Structure Type (LST): An object or field that indicates the list objects created on allocation. A field contains a counter indicator (CI), a lock indicator (LI), a data indicator (DI), an adjunct indicator (AI), a name indicator (NI) and a key indicator (KI).

The counter indicator specifies that either: a list-entry count and list-entry-count limit are defined or a list-element count and list-element-count limit are defined.

The lock indicator specifies whether or not a lock table is created.

The data and adjunct indicators specify whether: no list-set is created; list entries have adjunct only; list entries have data only; or list entries have data and adjunct in the list entries.

The name indicator specifies whether or not list entries are named.

The key indicator specifies whether or not the list entries are keyed.

(c) Lock-Table-Entry Characteristic (LTEX): An object or field that specifies the number of bytes in each lock-table entry. The number of bytes is the product of 2 raised to the power of the LTEX value.

(d) List-Element Characteristic (LELX): An object or field that specifies the number of bytes in each list element. The number of bytes is the product of 256 and 2 raised to the power of the LELX value.

(e) Minimum Structure Size (MNSS): A value that specifies the minimum number of units of SES storage that can be allocated for the list.

(f) Lock-Table-Entry Count (LTEC): An object or field that specifies the number of lock-table entries allocated.

(g) List Count (LC): An object or field that specifies the number of lists created.

(h) Structure Size (SS): An object or field that specifies the amount of storage allocated.

(i) Maximum Structure Size (MXSS): A value that specifies the maximum number of units of SES storage that can be allocated for the list.

(j) Maximum List-Set-Element Count (MLSELC): An object or field that specifies the maximum number of list elements that are available for assignment to list entries or retry-data blocks, or both, in the list set.

(k) List-Set-Element Count (LSELC): An object or field that specifies the number of list elements that have been assigned to list entries or retry-data blocks, or both, in the list set.

(l) Non-Zero-Lock-Table-Entry-Count (NLTEC): An object or field that specifies the number of non-zero lock-table entries that exist in the structure.

(m) Maximum List-Set-Entry Count (MLSELC): An object or field that specifies the maximum number of possible list entries in a list set.

(n) List-Set-Entry Count (LSEC): An object or field that specifies the number of existing list entries in the list set.

(o) Structure Authority (SAU): A value associated with each bit in the SID vector.

(p) User Structure Control (USC): A field per structure defined by the user.

(q) User-Identifier Vector (UIDV): An object or field that specifies the assigned UIDs, described below.

Referring back to FIG. 7, user controls 94 are created and initialized when the list-structure user is attached. In one embodiment, user controls 94 include the following fields (FIG. 9):

(a) A User Identifier (UID): A value that identifies an attached list user. A user identifier is either in the assigned or the unassigned state. A user identifier is in the assigned state when the associated assigned bit in the user-identifier vector is one. A user identifier is placed in the assigned state by the attach-list-structure-user command. A user identifier is in the unassigned state when the associated assigned bit in the user-identifier vector is zero. A user identifier is placed in the unassigned state by the detach-list-structure-user command, depending on detachment-request type, described below.

(b) A User State (US): A field that specifies the state of the user. The value has the following encoding: the user is detached; the user is attached. A list structure user exists when the associated user identifier is assigned. When a list structure user exists, it is either in the active (attached) or the inactive (detached) state. A user is placed in the active (attached) state by the attach-list-structure-user command. A user is placed in the inactive (detached) state by the detach-list-structure-user command when the detachment process is complete.

(c) A List-Notification Token (LNT): A value that specifies a list-notification vector to the system.

(d) A User Authority (UAU): A value that is compared and conditionally updated.

(e) A System Identifier (SYID): A value specified by the program when a message path is activated. The system identifier is maintained in the message-path status vector and copied into the user controls when an attach-list-structure-user command is communicated over the message path.

(f) A User-Attachment Control (UAC): A field per attached user defined by the user.

(g) A Detachment Restart Token (DURT): A value used to indicate how far along a detachment process has proceeded.

Referring once again to FIG. 7, lock table 96 consists of a sequence of one or more lock table entries 97 identified by a lock-table-entry number (LTEN). In one embodiment, lock table entry 97 includes a lock-table-entry number (LTEN), which starts at zero and runs consecutively and a lock-table-entry value (LTEV), including a global-lock manager (GLM) object and optionally, a local-lock-manager (LLM) object or both. The lock-table entry format is determined by the list-structure type located within list structure controls 92.

Commands associated with list structure 52 provide a means for updating lock-table entry 97. That is, a command may compare global-lock managers (GLM) and conditionally replace a global-lock manager (GLM), a local-lock manager (LLM), or both the global-lock and local-lock managers (GLM) and (LLM). The list commands also provide a means for reading an entry in lock-table 96 or the next non-zero lock-table entry, or for clearing lock table 96.

As previously mentioned, also contained within list structure 52 is list set 98. In one example, list set 98 includes one or more lists 99 represented by list controls 100, which are numbered consecutively, starting at zero. In one embodiment, list controls 100 include the following controls, as depicted in FIG. 10:

(a) List-Entry-Count Limit (LECL): An object or field that specifies the maximum number of possible list entries in a list. This object is initialized to the maximum list-set-entry count when a list structure is created.

(b) List-Entry Count (LEC): An object or field that specifies the number of list entries currently in the list.

(c) List-State-Transition Count (LSTC): An object or field that specifies the number of empty to not-empty list state transitions that have occurred.

(d) List Authority (LAU): A value that is compared and conditionally updated. The LAU is initialized to zeros.

(e) User List Controls (ULC): A field per list defined by the user.

(f) List-Monitor-Table: The list-monitor table contains information used to process the list-notification vector of each user who has registered interest in the state transitions of the list.

The list-monitor table is a sequence of objects, called list-monitor-table entries. The number of list-monitor-table entries is determined when the table is created and is equal to the maximum number of list-structure users. The list-monitor-table entries are numbered from zero to the user-identifier limit and are indexed by the user identifier (UID).

Each list-monitor-table entry has a list-monitoring-active-bit object, a list-notification-request-type object and a list-notification-entry-number object, each of which is described below:

(1) List-Monitoring-Active Bit (LMAB): An object or field that specifies whether the user associated with the list-monitor-table entry is monitoring the list-state transitions of the list.

When a user is not monitoring a list, all previously issued list-notification commands on behalf of the associated user for this list are complete.

(2) List-Notification-Request Type (LNRT): An object or field that indicates whether the list-notification-vector summaries are to be updated when an empty to not-empty state transition occurs on a monitored list.

(3) List-Notification-Entry Number (LNEN): An object or field that specifies a list-notification-vector entry.

When a list-state transition occurs, one or more list-notification commands are initiated for each user who is monitoring the list to the system which attached the user. All the list-notification commands initiated as a result of the list-state transition are initiated before the command that caused the list-structure transition is completed.

The list-notification command provides the information necessary for the system to update one list-notification entry and, when requested, the associated list-notification summaries, to reflect the new list state.

A user becomes a list monitor by registering with the list by means of a register-list-monitor command. A user ceases to be a list monitor by deregistering from the list by means of a deregister-list-monitor command or by detaching from the list structure by means of a detach-list-structure-user command.

A list-notification command issued to a system for a user as a result of a not-empty-to-empty list-state transition must complete before another list-notification command on behalf of the same list and user that specifies the opposite list-state transition may be issued.

All SES list-structure commands capable of adding, deleting, or moving a list entry execute the list-monitor-notification process for each user monitoring a list that changes state.

When a transition notification is initiated to a system, any previously initiated but unsent notifications for the same list and user may be purged.

Each list 99 consists of a sequence of zero or more entries. The list-structure type (described above) determines whether all the list entries in list set 98 have a data list entry 104, an adjunct list entry 106, or both. Associated with each entry of a list 99 is one of list-entry controls 102. Controls 102 contain list-entry-location information and other information for controlling operations against data list entry 104.

In particular, list entry controls 102 include, for instance, the following controls, as depicted in FIG. 11:

(a) A Data-List-Entry Size (DLES) indicating the size of the associated data entry.

(b) A List Number (LN) representing the list that a particular entry is associated with.

(c) A List-Entry Identifier (LEID) identifying a particular list entry. The list-entry identifier is unique to a list set 98 and is assigned by coupling facility 16.

(d) A Version Number (VN) object that is conditionally compared and conditionally updated, reflecting a program specified state for the list entry.

(e) An optional List-Entry Key (LEK) indicating a key, if one exists. When list-entry keys exist, the keyed list entries are ordered by the key with the lowest numerical key at the leftmost position. Elements with the same key value may be located by first or last within the same key value.

When an unkeyed list entry is created or moved, the target list-entry position is always located by an unkeyed position. When a keyed list entry is created or moved, the target list-entry position is always located by a keyed position and first or last within the same key value.

(f) An optional List-Entry Name (LEN). A list-entry name is unique to a list set 98 (FIG. 7) at any particular instant and is provided by the operating system program.

List commands provide a means for conditionally creating, reading, replacing, moving, or deleting one entry in list 99. A number of comparisons may be requested during these processes. They include a list-number comparison, a version-number comparison, a global-lock-manager (GLM) comparison, or any combination of the preceding. Additionally, when global locks are compared, local locks (LLM) may be compared. A list entry may be moved from one list 99 to another within the same structure 52 or from one position to another within the same list 99. This is disclosed in U.S. patent application Ser. No. 07/860,655 for "Method and Apparatus for Performing Conditional Operations on Externally Shared Data" by J. A. Frey, et al. (Attorney Docket No. PO9-92-008), incorporated herein by reference in its entirety as noted.

The position of a list entry in list 99 is determined when it is created, and may be changed when any entry in the list is created, deleted or moved. A list entry or list-entry position is located within a list set 98 by means of the list-entry identifier or the optional list-entry name (as described above), or by position. Position is specified by means of a list number, a direction, and an optional list-entry key.

The list commands also provide a means for synchronously writing and moving, moving and reading, or reading and deleting one entry of list 99. More than one list entry may be deleted synchronously, and more than one data list entry 104 or adjunct list entry 106 may also be read synchronously. Data list entry 104 is always returned in the data area designated in main storage by a message command/response block, described below. The adjunct list entry is returned in either a message command/response block or the data area, depending on the command. This is disclosed in U.S. patent application Ser. No. 07/860,633 for "Apparatus and Method for List Management in a Coupled DP System" by J. A. Frey, et al., (Attorney Docket No. PO9-92-009), incorporated herein by reference in its entirety, as noted.

Figure 12:
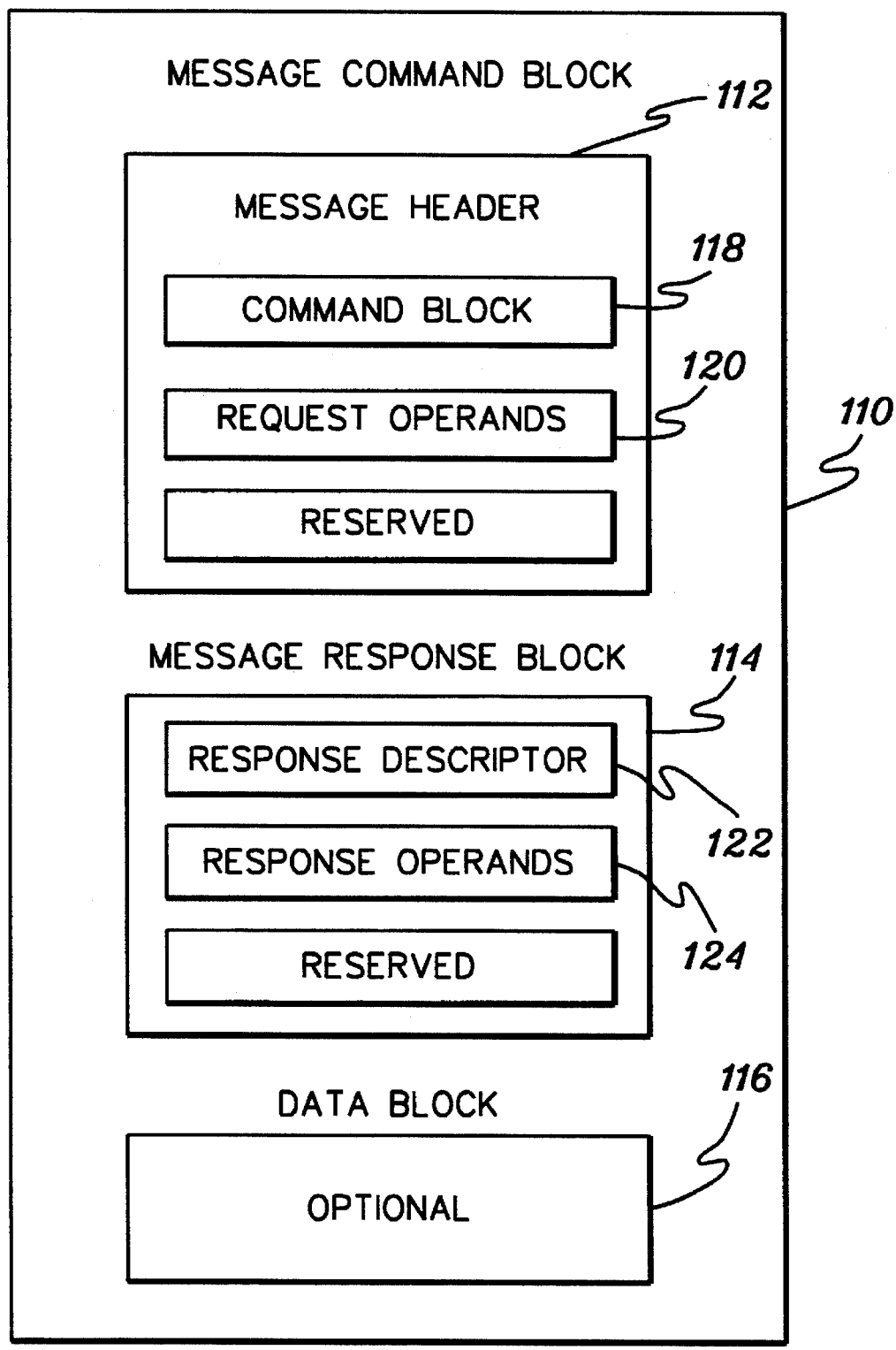
FIG. 12 depicts one example of a message command/response block, in accordance with the principles of the present invention.

In one embodiment, messages are communicated between CPC 12 and coupling facility 16 via a message command/response block 110 (FIG. 12). In one example, message command/response block 110 includes a message command block 112, a message response block 114 and an optional data block 116. Message command block 112 includes a command block 118 and a plurality of request operands 120 and message response block 114 includes a response descriptor 122 and a plurality of response operands 124. In one embodiment, request operands 120 and response operands 124 include the operands listed below, which are depicted in FIG. 13. (An operand may be a request operand, a response operand or both, depending upon the command. It is also possible that other request and/or response operands exist, which are not shown in FIG. 13.) In one embodiment, the response/request operands include the following:

(a) Attachment Information (AINF): A value set by the program when the local cache is attached.

(b) Comparative Local-Cache Authority (CLCAU): A value used as a comparison value to the local-cache authority when a local-cache attachment is performed for an assigned local-cache identifier or when a local cache is detached.

(c) Comparative Structure Authority (CSAU): A value used as a comparison value to the structure authority when the structure is allocated and deallocated.

(d) Comparative User Authority (CUAU): A value that is compared to the user-authority object.

(e) Detachment-Request Type (DRT): A value that indicates whether the user identifier is to be unassigned when the list-structure user is detached. The value has one of two meanings: Keep the user identifier assigned and unassign the user identifier.

(f) List-Monitoring-Active Bit (LMAB): A value that specifies whether the user associated with the list-monitor-table entry is monitoring the list-state transitions of the list. The value has one of the two following meanings: Not monitoring the list and monitoring the list. When the list-monitoring-active bit indicates that the list is not monitored, all previously issued list-notification commands on behalf of the associated user for this list are complete.

(g) List-Notification-Entry Number (LNEN): An unsigned binary integer that specifies a list-notification-vector entry.

(h) List-Notification Token (LNT): A value that specifies a list-notification vector to the system. A list-notification token of zero indicates that the user may not be registered to monitor a list.

(i) LCID-Unassignment Control (LUC): A value that controls the unassignment of the local-cache identifier. When the value is one, the local-cache identifier is unassigned, and the local-cache controls are reset. The LCID value is available for assignment. When the value is zero, the LCID vector and the local-cache controls are not updated.

(j) Local-Cache Authority (LCAU): A value set by the program when the local cache is attached.

(k) Local-Cache-Entry Number (LCEN): A value that specifies a local cache entry.

(l) Local-Cache Identifier (LCID): An integer that identifies a local cache. The LCID must be assigned for a read-local-cache-information, attach local cache and detach local cache commands and must be attached for all other commands.

(m) Local-Cache Token (LCT): A value that identifies a local cache.

(n) Structure Authority (SAU): A value that is conditionally updated.

(o) User-Attachment Control (UAC): A field per attached user defined by the user.

(p) User Authority (UAU): A value that is compared and conditionally updated.

(q) User Identifier (UID): A value that identifies a user. A user identifier must identify an attached UID when a user is registered, and must identify an assigned UID when a user is deregistered or user controls are read. (r) User State (US): A field that specifies the state of the user. The value has the following two meanings: The user is detached or the user is attached.

(s) User Structure Control (USC): A field per structure defined by the user.

(t) Allocation Type (AT): A field that indicates the type of allocation.

In addition to cache and list structures, there exists a lock structure which is comprised of a coupling facility list structure with an associated lock table and a set of operating system services to assist in lock contention resolution.

In support of the cache and list structures, described above, is a set of global controls 67, which is located in coupling facility 16 (see FIG. 3). In one embodiment, global controls 67 identify the coupling facility, describe its state, define its model-dependent limitations and summarize the status of its resources. In one example, global controls 67 include a free-space object, a free-control space object and a structure identifier (SID) vector. The SID vector is a string of bits, which increases sequentially having an initial value of zero. The structure identifier value provides an identification of a target structure by a command. A position i in the string is set to one when a structure is created with a SID value of i. The bit at position i is reset to zero when the structure is deallocated. A read SID vector command, returns the SID vector to the data area in the requesting program.

In one embodiment, a structure identifier is either in the assigned or unassigned state. A structure identifier is in the assigned state when the associated created bit in the structure-identifier vector is one. A structure identifier is placed in the assigned state when a structure is created by the allocate-cache-structure or allocate-list-structure command.

In addition, a structure identifier is in the unassigned state when the associated created bit in the structure-identifier vector is zero. A structure identifier is placed in the unassigned state by the deallocate-cache-structure or deallocate-list-structure command.

A coupling facility structure has one of the following states:

Allocated: The structure is created and commands are processed against structure objects.

Allocation Incomplete: An allocation process has been initiated for a structure, but the initialization of the structure objects has not completed.

Deallocation Incomplete: A deallocation process has been initiated for a structure, but the storage has not all been released.

Unassigned: The structure identifier (SID) value is available for selection by an allocate-cache-structure or allocate-list-structure command, as described in detail below.

A set of commands is provided for each coupling facility storage structure type, as well as additional commands for referencing global objects. The creation, deletion and attributes of a particular structure are controlled by the operating system program through allocation and deallocation commands, described in detail below. Allocation commands for list structures are described in "Apparatus and Method For List Management In A Coupled DP System" (Docket No. PO9-92-009), by J. A. Frey et al., Ser. No. 07/860,633, Filed: Mar. 30, 1992, which is hereby incorporated by reference in its entirety. In addition, allocation commands for cache structures are described in "Sysplex Shared Data Coherency Method and Means" (Docket No. PO9-91-052), by D. A. Elko et al., Ser. No. 07/860,805, Filed: Mar. 30, 1992, which is also hereby incorporated by reference in its entirety.

In one embodiment, rules governing coupling facility structure allocation and coupling facility structure and user status are stored in an active coupling facility policy. In one embodiment, the coupling facility policy is stored on a function data set, which is coupled to each central processing complex, as shown in the overview diagram of FIG. 14.

Figure 14:
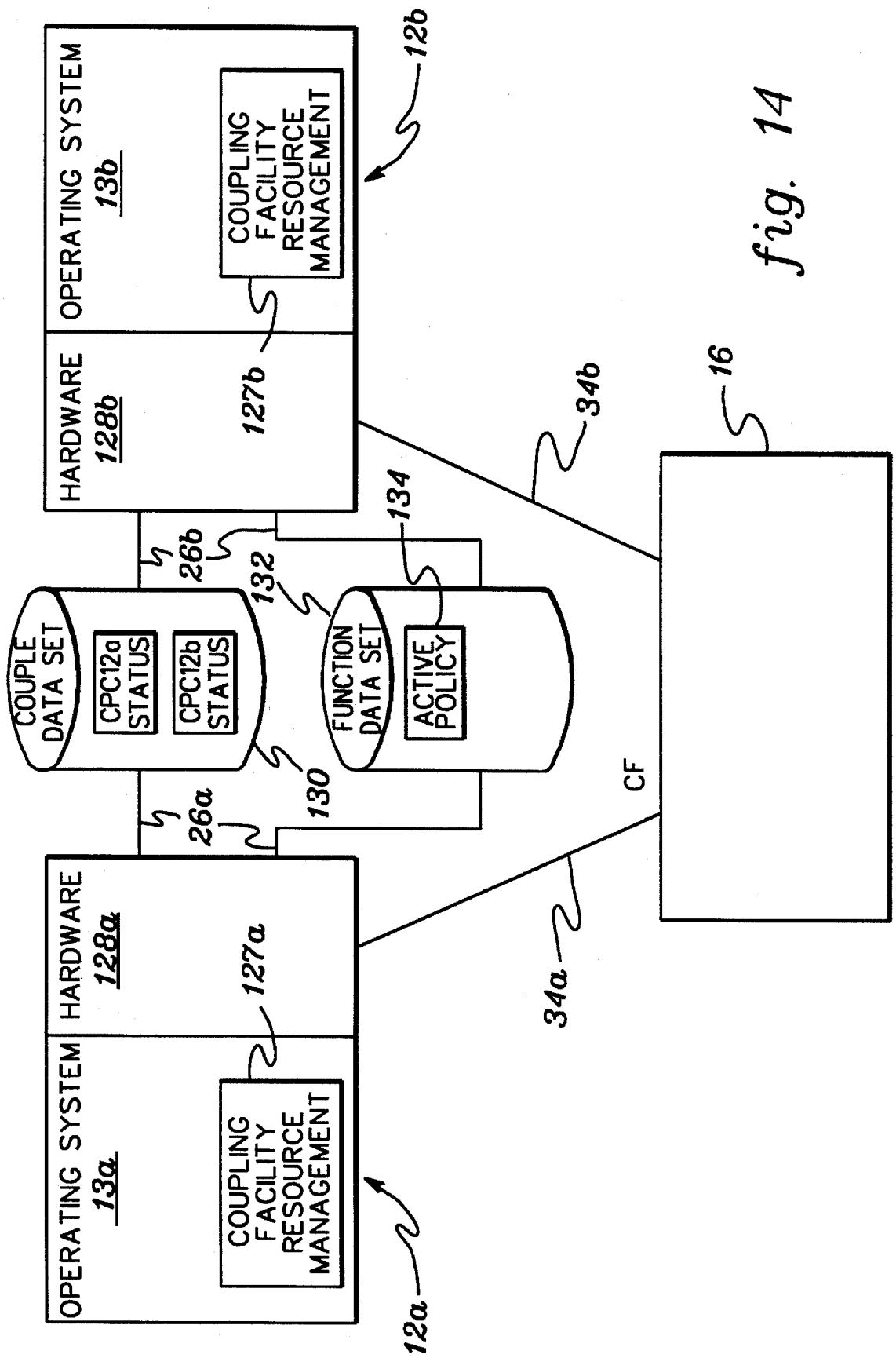
FIG. 14 illustrates one example of an overview diagram depicting an active policy coupled to central processing complexes, in accordance with the principles of the present invention.

Referring to FIG. 14, two CPC's (CPC 12a and CPC 12b) exist. Each CPC is coupled to coupling facility 16; a couple data set 130, which includes the status for CPC 12a and CPC 12b; and a function data set 132, which includes the active policy for coupling facility resources.

Each CPC includes hardware for connecting the respective CPC to the coupling facility and the couple and function data sets. In particular, located within CPC 12a is hardware 128a which includes, for instance, I/S channels 18a (not shown) to connect coupling facility 16 via a bus 34a to CPC 12a, and I/O channels 22a (not shown) to couple CPC 12a via a link 26a to couple data set 130 and function data set 132.

Similarly, located within CPC 12b is hardware 128b, which includes, for instance, I/S channels 18b (not shown) to connect coupling facility 16 to CPC 12b via a bus 34b, and I/O channels 22b (not shown) to couple CPC 12b via a link 26b to couple data set 130 and function data set 132.

In one embodiment, each CPC further includes an operating system 13a, 13b, respectively. Each operating system, as part of XES services 15 (FIG. 1), includes a coupling facility resource manager (CFRM) 127a, 127b, respectively, which governs the coupling facility resource use in a sysplex. CFRM provides services to the installation to manage the coupling facility resources usage based on the customer environment. These services include, for instance, managing the gain/loss of function data set 132, which contains CFRM data, gain/loss of coupling facility 16 access, and cleanup of coupling facility resources for system failure.

Figure 15:
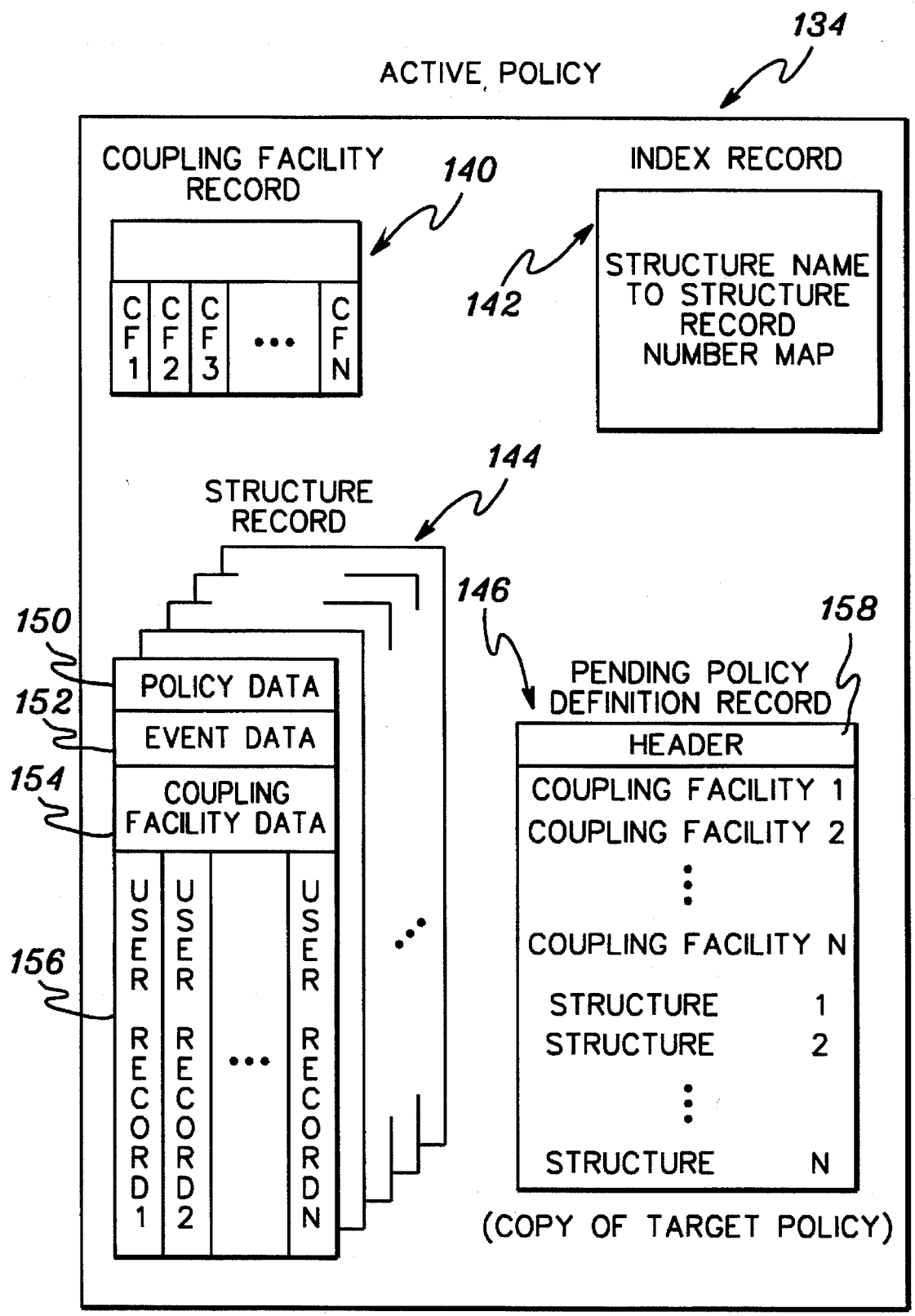
FIG. 15 depicts one embodiment of the fields associated with the active policy of FIG. 14, in accordance with the principles of the present invention.

One example of the coupling facility policy stored on function data set 132 is described in detail with reference to FIG. 15. Referring to FIG. 15, in one embodiment, the active policy includes a coupling facility record 140, an index record 142, one or more structure records 144, and a pending policy definition record 146, each of which is described below. (The active policy is further described in co-pending, commonly assigned patent application entitled "A Method And System For Managing One Or More Coupling Facilities In A Data Processing System," by Allen et al., Ser. No. 08/148,075, filed Nov. 1, 1993, which is incorporated herein by reference in its entirety.)

Coupling facility record 140 includes a record for each coupling facility in the sysplex. This record includes the coupling facility name, coupling facility identifier and an indication of which systems have connectivity to the coupling facility.

Index record 142 includes the structure name to structure record number map and the structure record includes, for example, policy data 150 (e.g., characteristics such as size, exclusion and preference lists), event data 152 for keeping track of events, coupling facility data 154, indicating where hardware resources are allocated, and a number of user records 156 for describing status of users (e.g., user record 1–user record n). Further, the structure record includes a status area, described below.

Pending policy definition record 146 is a copy of the target active policy and includes, for instance, a header 158, which includes, for instance, a number of structures that need to be added to the active policy that could not be added from the pending policy and a count of the number of facilities that need to be added to the active policy that could not be added from the pending policy.

A user gains access to a coupling facility structure through use of an operating system service, referred to as Cross-System Extended Services or XES. A user of a coupling facility structure is termed a connected XES user. XES supports the defined list and cache structures. Additionally, XES supports the use of a list structure for high performance database locking and specialized use of a list structure with a lock table comprising only global management objects termed a serialized list.

As mentioned above, an XES supported lock structure is comprised of a list coupling facility structure and operating system services. A lock table associated with the list may contain both global management and local management objects. The list set is used in a manner which assigns one list to each assigned user identifier. List entries are comprised of adjunct only areas. The list set is termed a record substructure. A list for a given user identifier is termed a record substructure header. Entries on a given list are termed record substructure entries.

In accordance with the principles of the present invention and as described in detail below, during rebuild processing, a rebuild start is presented and thereafter, a rebuild quiesce event is presented to each connector's event exit. The reason for the rebuild and whether there were any failed-persistent connections at the time rebuild was initiated is also presented to the connector.

A connection is considered failed-persistent when the connection is persistent and it fails. Likewise, a structure is considered failed-persistent when the structure is non-persistent and failed persistent users exist. As described in detail in co-pending, commonly assigned U.S. patent application entitled "A Method And System For Managing Data and Users of Data in a Data Processing System, by Allen et. al., U.S. Pat. No. 5,465,359, which is incorporated herein by reference in its entirety, persistence for a connection means that the connection and the structure remain allocated if the connection terminates abnormally until all surviving connections have provided an event exit response. Similarly, persistence for a structure means that the structure remains allocated even after all connections to the structure have terminated.

Since XES is waiting for an event exit response for the quiesce event, the connectors either quiesce all activity against the structure, and then provide an event exit response using an IXLEERSP MVS service; disconnect from the structure allowing others to continue in the rebuild process but not participating itself; or stop the rebuild process by issuing an IXLREBLD MVS service and providing a reason for stopping rebuild, as described below.

Assuming the connector chooses to participate in the rebuild process, the connector quiesces activity against the structure and provides an event exit response. Quiescing activity on the structure means that the connector completes or terminates all outstanding requests and prevents new requests against the structure.

When the connector provides an event exit response for the rebuild quiesce event, the connector's connect token is temporarily invalidated in order to prevent new accesses to the coupling facility structure. Once the connector has provided an event exit response for the rebuild quiesce event, there should not be any outstanding requests. XES does not try to purge or complete any in progress requests.

When all connectors have provided an event exit response for the rebuild quiesce event, the connector's event exits will be driven with a rebuild connect event and the connector issues IXLCONN REBUILD to allocate a new structure for rebuild. Once the connector is connected to the new structure, a temporary contoken and a vector token exist for referencing the new structure when both the new and old structures exist. From this point in the rebuild process up until the rebuild process is complete, only rebuild connect requests are permitted. All new connections are rejected with a non-zero return/reason code.

Connectors can begin rebuilding information into the new structure as soon as their IXLCONN REBUILD request completes successfully. However, the rebuild connect complete event is presented to the event exit when all currently active connectors have attempted to connect to the new structure. This event provides a summary of the connections that were able to successfully connect to the structure. This information can be used to determine whether rebuild processing should continue, or whether rebuild processing should be stopped.

If the old structure is still accessible (i.e., the structure has not failed and the connector has connectivity), then the old structure may, in most cases, be accessed during the rebuild process. This means that connectors can read from the old structure and copy into the new structure. One restriction for accessing the old structure during rebuild is that old lock structures cannot be accessed.

It is recommended that data in the old structure not be modified between the time the rebuild connect event is presented until either the structure is deleted when rebuild is complete, or the structure is returned to normal use when a rebuild stop request is complete.

As each connection finishes rebuilding its share of information into the new structure, the connections quiesce all activity against both the old and new structure and then issue IXLREBLD to indicate that rebuild processing is complete. As each connector issues IXLREBLD COMPLETE, both the temporary and original connect tokens are invalidated in order to prevent accesses to both the new and old structure.

Once the connector has issued IXLREBLD complete, there should not be any outstanding requests. XES does not try to ensure that all outstanding requests have completed.

The rebuild process is not actually complete when an individual connector invokes IXLREBLD to indicate rebuild complete. A connector will be told that the rebuild process has completed when the rebuild process complete event has been presented to its event exit. Connectors are prevented from accessing the old and new structures until the rebuild process complete event is presented because there is still the possibility of rebuild processing being terminated which would cause the new structure to be deallocated and cause normal processing to continue using the old structure.

When all connectors have invoked IXLREBLD COMPLETE, connectors are presented a rebuild cleanup event.

This event requires confirmation via IXLEERSP. Once all connectors have indicated that they have completed the rebuild process and XES begins notifying each connector via the rebuild cleanup event, the rebuild process cannot be stopped. If a rebuild stop request is initiated, the request will be rejected with a reason code which indicates that the rebuild process cannot be stopped during the cleanup phase. If a start request is initiated, the request will be rejected with a reason code which indicates that a rebuild request is already in progress. XES will make sure that no failure events that would require a new rebuild request to be initiated (new structure failure, loss of connectivity to the new structure) are presented to the connector during this window. The connector is notified of all failures that may occur in this window after the rebuild process complete event is presented. Additionally, XES will no longer notify the connector of any failures associated with the original structure (structure failure or loss of connectivity).

Before providing a response to this event, connectors should clean up all information in their control structures related to the old structure. At this point, each connector should discard the temporary contoken and the old vector token (if applicable). The vector token returned on the rebuild connect is not temporary like the contoken and must be used to access the structure after the rebuild has completed.

When a connector provides an event exit response to the rebuild cleanup event, XES will purge outstanding requests; however, notification is only provided for synchronous requests where a unit of work has been suspended by XES. For a lock structure, only outstanding requests against the original structure have been suspended by XES and only outstanding requests against the original structure are resumed. On completion of the IXLEERSP service, exits are only driven for activity against the newly rebuilt structure using the original contoken. The temporary contoken is no longer defined.

When all connections have provided an event exit response for the rebuild cleanup event, the connectors are presented the rebuild process complete event. Connections with a list transition exit should register interest in the new structure at this time. All connections can resume normal usage of the structure. This is the end of the rebuild process.

When the rebuild process has completed, all failed-persistent connections which were not able to connect to the new structure during the rebuild process have been cleaned up. In order for a connection to be reconnected, the connection must have previously been connected to the structure which is no longer the case for the set of failed-persistent connections.

In one embodiment, before rebuilding is to take place, a user is connected to a structure, such as a cache, list or lock structure via, for example, an operating system connection service, referred to as IXLCONN, which is described in further detail below. After connecting to a structure, a number of events may be reported to the connection. These events include, for instance:

(1) New Connection—This event is initiated by a successful connect to a coupling facility structure. For the new connection event, each active connected XES user connected to the same structure specified on the IXL-CONN request is notified that a new connection to the coupling facility structure has been assigned. Information provided about the new connection includes the new connection's connection name, connection identifier, and connection disposition. This notification may be received before the IXLCONN service returns to the caller.

(2) Existing Connection—This event is initiated by a successful connect to a coupling facility structure. For the existing connection event, the new connected XES user receives notification of all other connections to the same coupling facility structure specified on its IXLCONN request. Each existing connection event describes one connection. Additional information provided along with the event describes the state (active or failed persistent) and disposition of the existing connection. These events may be received by the new connection's event exit before the connection completes. When the new connection receives a dummy event exit parameter list representing the end of existing connection events, then the new connection knows that all existing connection events have been presented to its event exit.

(3) Disconnected or Failed Connection—This event is initiated when either: (a) a connected XES user disconnects from a coupling facility structure by issuing an IXLDISC macro, described below. If the disconnecting XES user was connected to a lock structure, an indication of whether the connection terminated with lock resources is provided; or (b) termination of the task, the address space or the system that requested connections to a coupling facility structure occurs before the corresponding disconnect is issued.

(4) Loss of Structure Connectivity—This event is initiated when a connected XES user loses connectivity to the coupling facility containing a coupling facility structure.

For example, if a system loses connectivity to a coupling facility, then for each connection connected to a structure in the facility that the system lost connectivity to, a loss of coupling facility structure connectivity event will be issued. This event is sent to all connections to the structure.

Connections that lost connectivity to the structure are expected to either disconnect with REASON=FAILURE or initiate a rebuild, as described further below. All new requests to access the structure will be rejected.

When this event is received and a rebuild is in progress, a flag in the event exit parameter list indicates whether connectivity was lost to the new structure allocated for rebuild or the original structure.

(5) Structure Failure—This event is initiated when a coupling facility structure failure is detected. A coupling facility structure failure may be the result of a single structure failure or a coupling facility failure.

Connections affected by this event are expected to either disconnect with REASON=FAILURE or initiate a rebuild. All new requests to access the structure will be rejected.

When this event is received and a rebuild is in progress, the structure failure occurred for the original structure. If the new structure fails, XES will stop the rebuild implicitly and the connector will receive a rebuild stop event, described below, with a stop reason indicating that the new structure failed.

When the coupling facility structure failure is the result of a single structure failure rather than a facility failure, XES will deallocate the failed structure when either there are no longer any active connections, or when the last rebuild cleanup event exit response is received as part of the rebuild process. The failed structure is deallocated in order to ensure that facility resources assigned to the failed structure are released.

(6) Rebuild Quiesce—This event is initiated when structure rebuild is started by either the operator issuing the SETXCF START,REBUILD command, or by an authorized program issuing the IXLREBLD start service.

Connectors are expected to either participate in the rebuild processing, disconnect from the structure, or invoke IXLREBLD to stop the rebuild process. If connectors decide to participate in the rebuild process, the connectors must quiesce activity against the structure, i.e., complete all outstanding requests and prevent new requests. Once activity against the structure has been quiesced, each connector provides an event exit response using the IXLEERSP service.

When a rebuild quiesce event occurs and then a rebuild stop event occurs before all connectors are told about the rebuild quiesce event, the rebuild quiesce event will be filtered and only the rebuild stop event will be presented.

(7) Rebuild Connect—This event is presented to connectors when all connectors have provided an event exit response to the rebuild quiesce event. When the rebuild connect event is presented, each connector must connect to the structure again using the REBUILD keyword on IXLCONN, as described below. Connectors which successfully issue IXLCONN REBUILD can begin rebuilding into the new structure allocated for rebuild.

(8) Rebuild Connects Complete—This event is presented to all connectors when each connector has initiated an IXLCONN REBUILD request. This event identifies the connections which were successfully connected to the new structure and those that were not by their connection identifier. This does not imply that all IXLCONN REBUILD requests have completed. The rebuild connect failure event will be presented to all connectors in the event that the unit of work that requested the rebuild connect abnormally terminates before the IXLCONN REBUILD request returns to the requestor.

A total count of the number of successful connections is provided in the event exit parameter list. The total number may be zero, if no suitable facility was available to allocate the new structure.

This event is intended to help the connectors decide whether the rebuild can be completed successfully or not. If the set of connectors connected to the new structure is not sufficient, then IXLREBLD, described below, can be invoked to stop rebuild processing.

(9) Rebuild New Connection—This event is initiated by a successful connect (IXLCONN REBUILD) to the new structure allocated for rebuild. This event indicates that a connection to the old structure has been successfully connected to the new structure allocated for rebuild. For the rebuild new connection event, each active connected XES user already connected to the new structure is notified of this event. The information provided in the event identifies the original connection that has obtained access to the new structure allocated for rebuild. This information includes the connection name and the connection identifier. This notification may be received before the IXLCONN service returns to the caller.

The rebuild new connection event is analogous to the new connection event; however, only informs connectors already connected to the new structure about the new connection.

(10) Rebuild Existing Connection—This event is initiated by a successful rebuild connect (IXLCONN REBUILD) to the new structure allocated for rebuild. For the rebuild existing connection event, the connector that has just obtained access to the new structure receives notification of all other connections to the new structure. Each rebuild existing connection event describes one connection. These events may be received by the connection's event exit before the rebuild connection completes. When the new connection receives a dummy event exit parameter list representing the end of rebuild existing connection events, then the new connection knows that all rebuild existing connection events have been presented to its event exit.

The rebuild existing connection event is analogous to the existing connection event; however, only reports about connections which have successfully connected to the new structure.

(11) Rebuild Connect Failure—This event is initiated when an IXLCONN REBUILD request fails because the requesting task or address space abnormally terminated and this task is different from the task which owns the original connection. Connections are expected to cleanup any control structures containing information about a successful rebuild connect request as indicated by the new rebuild connection event or the rebuild existing connection event.

(12) Rebuild Cleanup—This event is presented to all connectors when all connectors have issued IXLREBLD COMPLETE, described below. This event is presented to connectors before the rebuild process complete event is presented. Before providing an event exit response for this event, connectors should ensure that all control structures only refer to the new structure that has just been rebuilt.

(13) Rebuild Process Complete—This event is presented to all connectors when all rebuild processing has been completed. Connectors are expected to resume normal use of the structure.

(14) Rebuild Stop—This event is presented to all connectors when rebuild processing is stopped. Rebuild stop processing can be initiated by the operator issuing the SETXCF STOP REBUILD command, as described below, an authorized program invoking in the IXLREBLD stop service, or XES when a structure failure for the new structure occurs.

Connectors are expected to quiesce activity against the old and new structure, i.e., complete all outstanding requests and prevent new requests. Once activity against the structure(s) has been quiesced, each connector provides an event exit response using the IXLEERSP service.

(15) Rebuild Stop Process Complete—This event is presented to all connectors when rebuild stop processing is complete. Connectors are expected to resume normal usage of the old structure.

(16) User Sync Point—This event is presented to all connectors when a new event is defined and when all connectors have confirmed a user event (i.e., a user sync point has been reached). The IXLUSYNC service, described below, is used to set and confirm user events.

In accordance with the principles of the present invention, connectors of a structure can allocate another structure with the same name and rebuild any of the structure's data into the new structure. This process is referred to as rebuild. During the rebuild process, both the original and the newly allocated structure are capable of being accessed. It is possible for the new coupling facility structure to have attributes different from the original coupling facility structure. This includes changes in the size of the structure, differences in which coupling facility structures reside, and changes in the attributes unique to the type of coupling facility structure.

Figure 16:
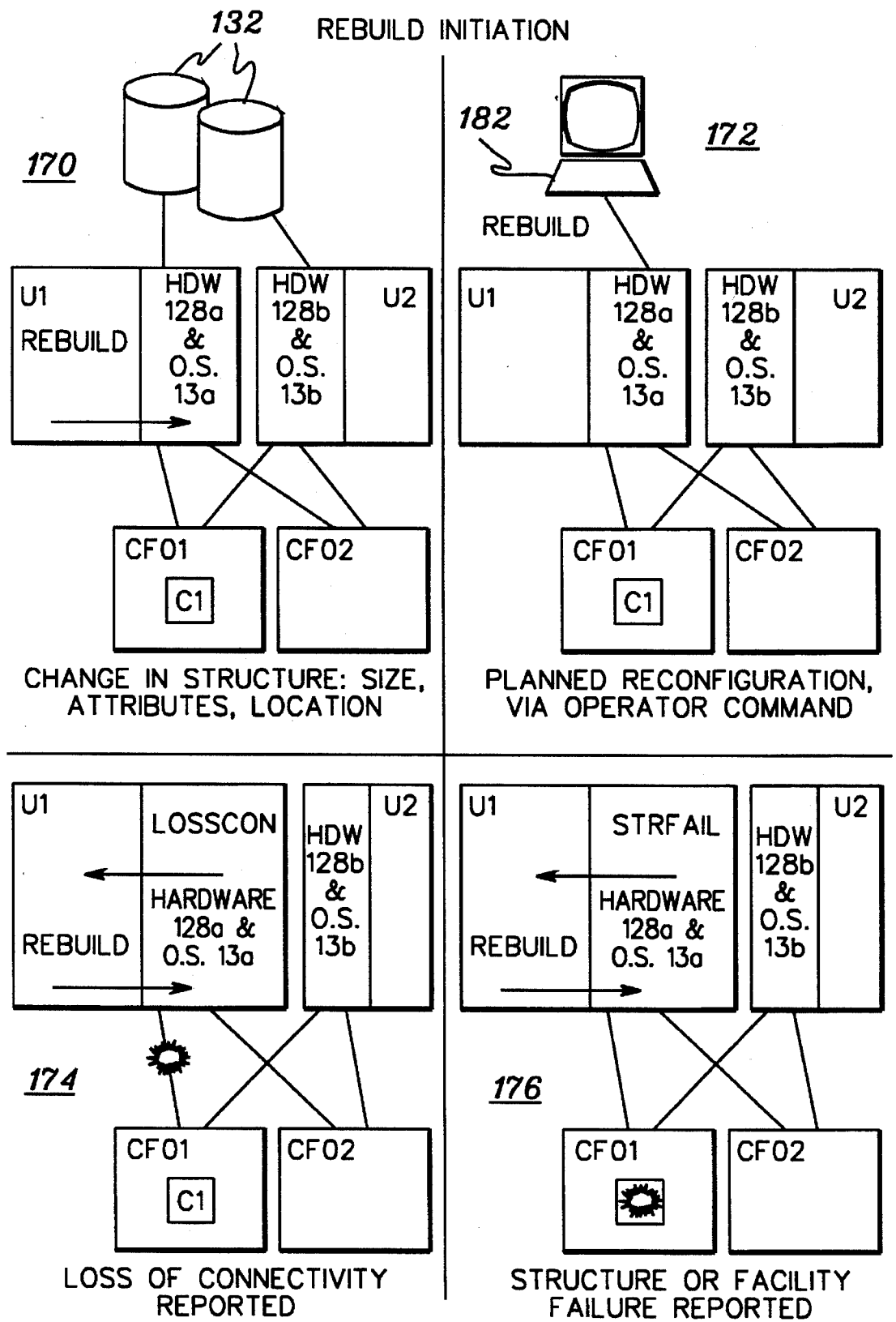
FIG. 16 depicts one example of an overview diagram demonstrating the manner in which rebuild initiation may be invoked, in accordance with the principles of the present invention.

As shown in FIG. 16, rebuild may be initiated for a number of reasons. First, with reference to quadrant 170, rebuild initiation may be invoked due to a change in structure size, attributes and/or location. A connector can start a rebuild request for a specific reason, which is presented to the REBUILD service in a manner described below. Two users (U1 and U2) are connected via hardware 128a, 128b, respectively, to coupling facility (CF01), which includes a structure C1, and coupling facility (CF02). Should user U1 determine the structure is to change, it can issue a rebuild start through, e.g., a program. If there is a pending policy in function data set 132, which is coupled to the users via hardware 128a, 128b and operating systems 13a, 13b, then that information may be used in the rebuild process.

Referring to quadrant 172, an operator may enter a start rebuild command at console 182, which is coupled to user U1 via hardware 128a. (The configuration in quadrants 172, 174 and 176 are similar to that of quadrant 170 and, therefore, are not explained in detail again.) The operator may issue the start command due to, for example, a planned reconfiguration.

Referring to quadrant 174, if operating system 13a detects a loss of connectivity to the structure, C1, or the coupling facility CF01, then user U1, for example, may issue a rebuild start program request.

Referring to quadrant 176, if operating system 13a detects the failure of a structure, such as C1, or of a coupling facility, such as CF01, then user U1 may issue a rebuild start program request.

As described above, a program or an operator may initiate the rebuild process. If an operator initiates the process, then, as one example, a SETXCF START REBUILD command is used. The SETXCF command can initiate structure rebuild processing for a single structure (or list of structures), or initiate structure rebuild for all structures in a coupling facility. Structure rebuild processing may cause the specified structures to be rebuilt at another location dynamically, with participation from all connectors in the sysplex, which are connected to the target structure.

In one example, the SETXCF START, REBUILD command has the following syntax (Some of the keywords listed below or in other macros herein, may be specified as required and others may be specified as optional. However, in another embodiment, the required keywords may not be required.):

```
SETXCF START, REBUILD
   [,STRNAME = (strname[,strname] . . .)]
   [,CFNAME = (cfname[,cfname) . . .)]
   [,LOCATION = (NORMAL|OTHER)]
```

Where:
CFNAME and STRNAME are mutually exclusive keywords.
STRNAME (strname{,strname}. . .) specifies one or more coupling facility structures to be rebuilt. Strname specifies the name of the coupling facility structure to be rebuilt. If only one strname is specified, the surrounding parentheses are not needed. If the STRNAME keyword is specified, at least one strname must be provided.
CFNAME=(cfname{,cfname}. . .) indicates one or more facilities for which all structures are to be rebuilt. CFNAME specifies the coupling facility name. If only one cfname is specified, the surrounding parentheses are not needed. If the CFNAME keyword is specified, at least one cfname must be provided.
LOCATION=NORMAL|OTHER—The LOCATION keyword is an optional keyword which identifies where the new structure allocated for rebuild can be located. If LOCATION=NORMAL is specified, then the new structure can be allocated in any facility in the preference list using the normal allocation rules. In one example, the preference list is located in the active policy and designates a list of coupling facilities in which the coupling facility structure should be assigned. If LOCATION= OTHER is specified, then the new structure allocated for rebuild cannot be allocated in the same facility as the original structure. The new structure can be allocated in any facility in the preference list, other than the facility containing the original structure, using the normal allocation rules.

Figure 17:
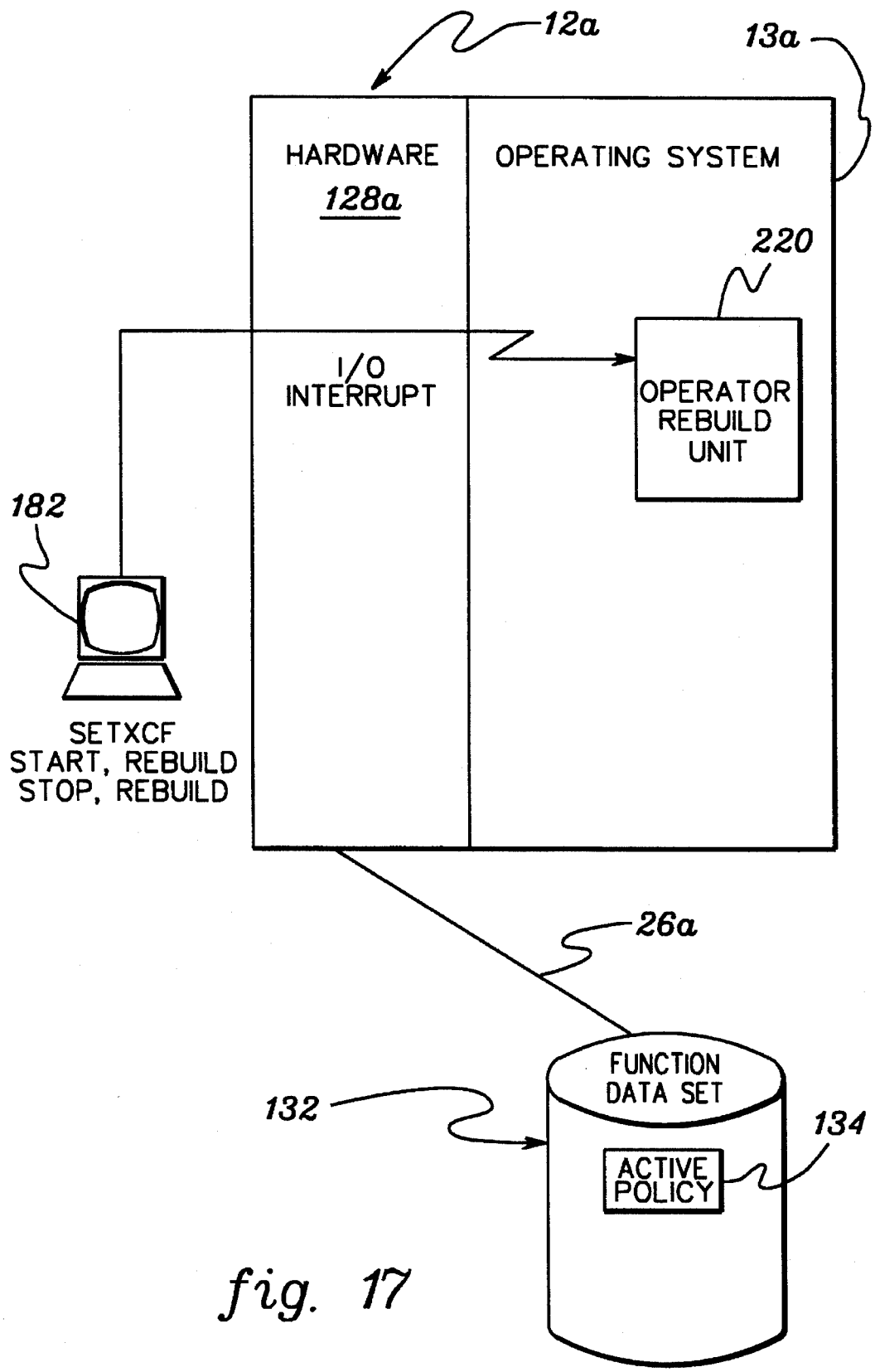
FIG. 17 illustrates one example of the SETXCF command for rebuild, in accordance with the principles of the present invention.

As shown in FIG. 17, when an operator enters the SETXCF START, REBUILD command via a console 182, an I/O interrupt causes control to be passed to an operator rebuild unit 220 for initiating the rebuild process, as described below. Unit 220 is located within operating system 13a, which in turn is located within CPC 12a, along with hardware 128a, as described above. CPC 12a is coupled to function data set 132 via a link 26a. Function data set 132 includes active policy 134, which is used in the rebuild process as described below.

Figure 18:
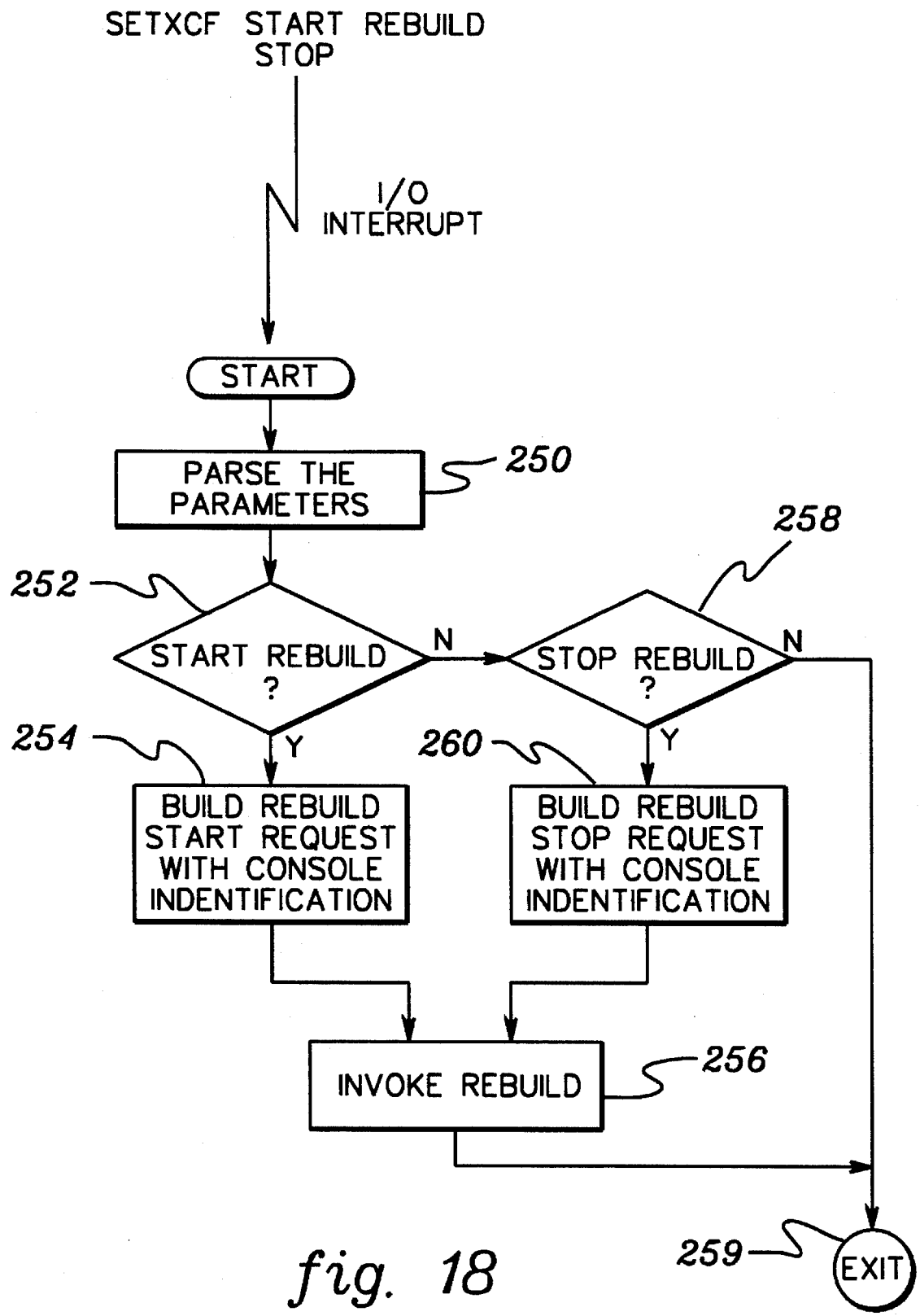
FIG. 18 depicts one embodiment of the logic associated with an operator rebuild routine, in accordance with the principles of the present invention.

One embodiment of the logic associated with an operator rebuild command is described in detail with reference to FIG. 18. For example, a SETXCF START, REBUILD command causes an I/O interrupt to the operating system, which gives control to the start rebuilding process. The parameters of the rebuild command are parsed in order to determine the attributes of the rebuild command, STEP 250 "PARSE THE PARAMETERS." Thereafter, a determination is made as to whether this is a start rebuild command, INQUIRY 252 "START REBUILD?" If this is a start rebuild command, as indicated by the SETXCF REBUILD command, then a rebuild start request is built, indicating the console which initiated the operator command, STEP 254 "BUILD REBUILD START REQUEST WITH CONSOLE IDENTIFICATION." In particular, an IXLREBLD macro is invoked which includes the console identification.

One example of the syntax associated with IXLREBLD is described below:

```
IXLREBLD REQUEST = START
        ,STRNAME = xstrname
        ,CFNAME = xcfname
        [,LOCATION = NORMAL]
        [,LOCATION = OTHER]
        ,STARTREASON = LOSSCONN
        ,STARTREASON = STRFAILURE
        ,STARTREASON = CONNECTOR
        [,USERCODE = {xusercode|0}]
        ,STARTREASON = OPERATOR
        ,REQUEST = STOP
        ,STRNAME = xstrname
        ,CFNAME = xcfname
        ,STOPREASON = LOSSCONNOLD
        ,STOPREASON = LOSSCONNNEW
        ,STOPREASON = STRFAILUREOLD
        ,STOPREASON = CONNECTOR
        [,USERCODE = xusercode|0}]
        ,STOPREASON = OPERATOR
        ,REQUEST = COMPLETE
        ,CONTOKEN = xcontoken
```

Where:
REQUEST ({START|STOP|COMPLETE}) is a required keyword input which identifies the type of rebuild request.
REQUEST(START)—Start rebuild processing for the specified structure name.
The following is a set of mutually exclusive keys. This set is required; only one key must be specified.
STRNAME (xstrname) is the name of a 16 character input that specifies the name of a structure belonging to a group of mutually exclusive keys of which only one is required.

If structure rebuild is not supported for the target structure (ALLOWREBLD= NO specified on IXL-CONN, described below, when the structure was allocated) then a non-zero return/reason code is set.

CFNAME(xcfname) is the name of an 8 character input that specifies the name of a coupling facility belonging to a group of mutually exclusive keys of which only one is required. Structure rebuild should be attempted for each structure allocated in the target facility. One application should not be initiating rebuild for structures owned by other applications.

End of a set of mutually exclusive required keys.

[LOCATION({NORMAL|OTHER})] is an optional keyword input, which indicates where the new structure allocated for rebuild can be located. DEFAULT:NORMAL

[LOCATION(NORMAL)] indicates that the new structure can be allocated in any facility in the preference list using the normal allocation rules.

[LOCATION(OTHER)] indicates that the new structure for rebuild cannot be allocated in the same coupling facility as the original structure. The new structure can be allocated in any coupling facility in the preference list, other than the coupling facility containing the original structure, using the normal allocation rules.

This option is intended for planned reconfiguration cases where the system administrator has verified that the policy does contain a facility where the structure can be rebuilt. If there is only one coupling facility in the preference list for the structure being rebuilt and this coupling facility is the location of the original structure, each connector will receive a non-zero return code when the rebuild connect is attempted. The ConaFacilityArray, which is located in the answer area of connect, indicates that the current coupling facility was not chosen because the LOCATION=OTHER option was specified on IXL-REBLD.

STARTREASON({LOSSCONN|STRFAILURE| CONNECTOR| OPERATOR}) is a required keyword input which indicates the reason for initiating rebuild processing.

STARTREASON(LOSSCONN) specifies that a loss of connectivity to the structure was the reason for initiating a rebuild.

STARTREASON (STRFAILURE) specifies that a structure failure was the reason for initiating a rebuild.

STARTREASON (CONNECTOR) specifies that the connector had an application specific reason for initiating rebuild processing.

{USERCODE({xusercode|0})] is the name of an optional fullword input that specifies a user code which represents the connector's reason for initiating rebuild processing. DEFAULT=0

STARTREASON (OPERATOR) specifies that rebuild processing was initiated by an operator command.

REQUEST(STOP) Stop rebuild processing for the specified structure name.

The following is a set of mutually exclusive keys. This set is required; only one key must be specified.

STRNAME(xstrname) is the name of a 16 character input that specifies the structure name belonging to a group of mutually exclusive keys of which only one is required, for which rebuild processing should be stopped.

CFNAME(xcfname) is the name of an 8 character input the specifies the name of a coupling facility belonging to a group of mutually exclusive keys of which one is required.

Structure rebuild will be stopped for each structure allocated in the target facility.

End of a set of mutually exclusive required keys.

STOPREASON({LOSSCONNOLD|LOSSCONNNEW| STRFAILUREOLD|CONNECTOR|OPERATOR}) is a required keyword input which indicates the reason for stopping the rebuild processing.

STOPREASON (LOSSCONNOLD) specifies that a loss of connectivity to the old structure was the reason for stopping the rebuild process.

STOPREASON (LOSSCONNNEW) specifies that a loss of connectivity to the new structure was the reason for stopping the rebuild process.

STOPREASON (STRFAILUREOLD) indicates that a structure failure for the old structure was the reason for stopping the rebuild process.

STOPREASON (CONNECTOR) specifies that the connector had an application specific reason for initiating stopping the rebuild process.

[USERCODE({xusercode|0})] is the name of an optional fullword input that specifies a user code which represents the connector's reason for stopping the rebuild process. DEFAULT:0

STOPREASON (OPERATOR) specifies that rebuild processing was stopped because of an operator command.

REQUEST (COMPLETE) indicates that rebuild processing is complete for the specified connection.

CONTOKEN(xcontoken) is the name of a required 16 character input field that specifies the connect token of the responding connection.

Returning to FIG. 18, and in particular, STEP 254, subsequent to building the start request, a rebuild service is invoked, STEP 256 "INVOKE REBUILD" which is described below Returning to INQUIRY 252 "START REBUILD?", if this is not a start rebuild request, then a further determination is made as to whether the SETXCF REBUILD command indicated a stop rebuild, INQUIRY 258 "STOP REBUILD?" If this is neither a start or stop rebuild command, then the operator rebuild command is complete, STEP 259 "EXIT." Otherwise, if this is a stop rebuild request, then a rebuild stop request indicating the console which initiated the command is built, STEP 260 "BUILD REBUILD STOP REQUEST WITH CONSOLE IDENTIFICATION." Similar to building rebuild start, rebuild stop is built by invoking the rebuild macro, described above. Subsequently, a rebuild service is invoked, STEP 256. After invoking the rebuild service, the operator rebuild command is complete, STEP 259 "EXIT."

The rebuild service, which is invoked at STEP 256 during the operator command, or by a program, is given control from the IXLREBLD macro. The IXLREBLD macro allows rebuild processing to start for one or more structures in a facility, to stop for one or more structures in a facility or to complete rebuild processing.

One embodiment of the logic associated with a rebuild service is described in detail with reference to FIGS. 19a–19i. Initially, a determination is made as to whether the rebuild service was initiated by an implicit entry request, INQUIRY 280 "REBUILD IMPLICIT ENTRY?" In particular, a check is made to see if an indicator is set in a rebuild parameter list, or whether the entry point of the rebuild module indicated an implicit entry. If a rebuild implicit entry request was not made, then the active policy is read and locked from the function data set, STEP 282 "READ AND LOCK THE ACTIVE POLICY (AP) FROM FUNCTION DATA SET." In one example, the data set is read and locked via, for example, the procedure described in co-pending U.S. patent application Ser. No. 07/548,516 for "Shared Data Access Seralization Method and Apparatus" by Insalaco et al (Attorney Docket No. PO9-88-007), filed on Jul. 2, 1990, which is incorporated herein by reference in its entirety. Subsequently, or if there was a rebuild implicit entry request, then a further determination is made as to whether the structure to be rebuilt is specified in the active policy, INQUIRY 284 "STRUCTURE SPECIFIED IN AP?"

Should the structure not be specified in the active policy, then processing of the rebuild service ends, STEP 285 "EXIT." Otherwise, processing continues and a determination is made as to whether the structure is allocated as indicated by coupling facility data 154 of the structure record of the active policy, INQUIRY 286 "STRUCTURE ALLOCATED?"

If the structure is not allocated, then once again processing ends, STEP 285 "EXIT." However, if the structure is allocated, then a determination is made as to whether this is a rebuild start request, INQUIRY 288, "REBUILD START REQUEST?" Should this be a rebuild start request, and the rebuild is not permitted, INQUIRY 290, then processing of the rebuild service ends, STEP 285 "EXIT". However, if rebuild is permitted, as indicated by information saved in the active policy from the connect service, then a further determination is made as to whether a rebuild stop is in progress, INQUIRY 292 "REBUILD STOP IN PROGRESS?" If a rebuild stop is in progress, then processing of the rebuild service ends, STEP 285 "EXIT." Otherwise, another inquiry is made to determine if rebuild is already in progress for the structure, INQUIRY 294 "REBUILD IN PROGRESS?" Should rebuild already be in progress, then processing of the rebuild service ends, STEP 305 "EXIT."

Should rebuild not be in progress for the structure, and there are no active users, INQUIRY 296 "ANY ACTIVE USERS?", then processing of the rebuild service ends. However, if there are active users, then a confirm string, based on the active users to respond, is built in the status area of structure record 144 of the active policy, STEP 298 "BUILD CONFIRM STRING BASED ON ACTIVE USERS TO RESPOND." Thereafter, an indication is made in the structure record status area, specifying that the quiesce phase of the rebuild service is in progress, STEP 300 "INDICATE REBUILD IN PROGRESS: QUIESCE PHASE." Subsequently, notification of the quiesce phase is initiated via a rebuild event notification routine, STEP 302 "INITIATE NOTIFICATION OF REBUILD QUIESCE".

Figure 20:
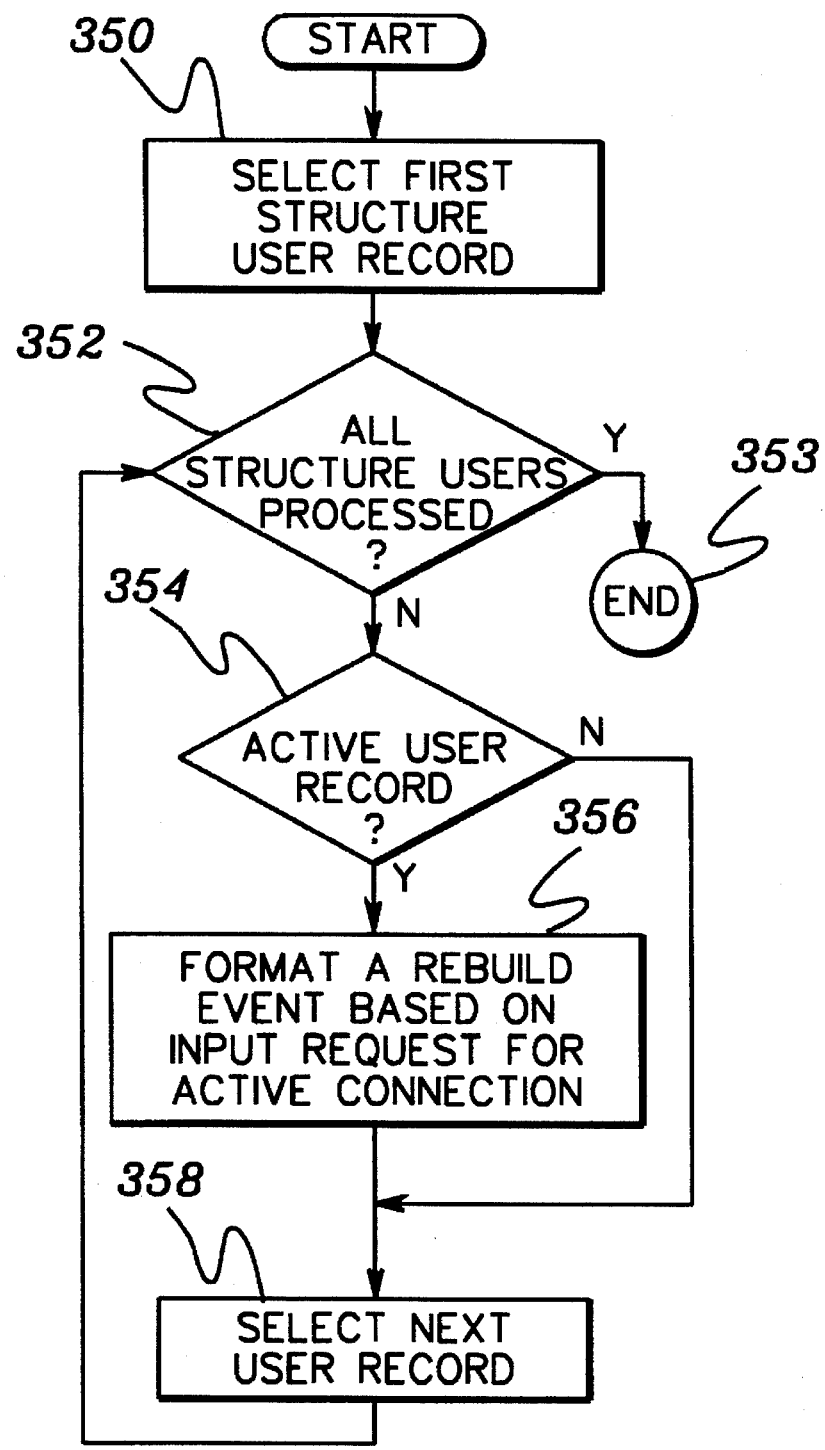
FIG. 20 illustrates one embodiment of the logic associated with a rebuild event notification routine, in accordance with the principles of the present invention.

One embodiment of the logic associated with a rebuild event notification routine is explained in detail with reference to FIG. 20. Initially, the first structure user record from the active policy is selected, STEP 350 "SELECT FIRST STRUCTURE USER RECORD." Thereafter, a determination is made as to whether all of the structure users have been processed, INQUIRY 352 "ALL STRUCTURE USERS PROCESSED?" If all of the structure users have been processed, then processing of the rebuild event notification routine is ended, STEP 353 "END." Otherwise, a further determination is made as to whether the user record is active, as indicated in the active policy, INQUIRY 354 "ACTIVE USER RECORD?" Should the user record be active, then a rebuild event based on input requests for an active connection is formatted, STEP 356. In particular, a parameter list is built using the input request, such as, for instance, rebuild quiesce. The parameter list will be passed to the event exits, as described herein. Subsequently, or if the user record is not active, the next user record is selected, STEP 358 "SELECT NEXT USER RECORD" and flow passes to INQUIRY 352 "ALL STRUCTURE USERS PROCESSED?"

Figure 19A:
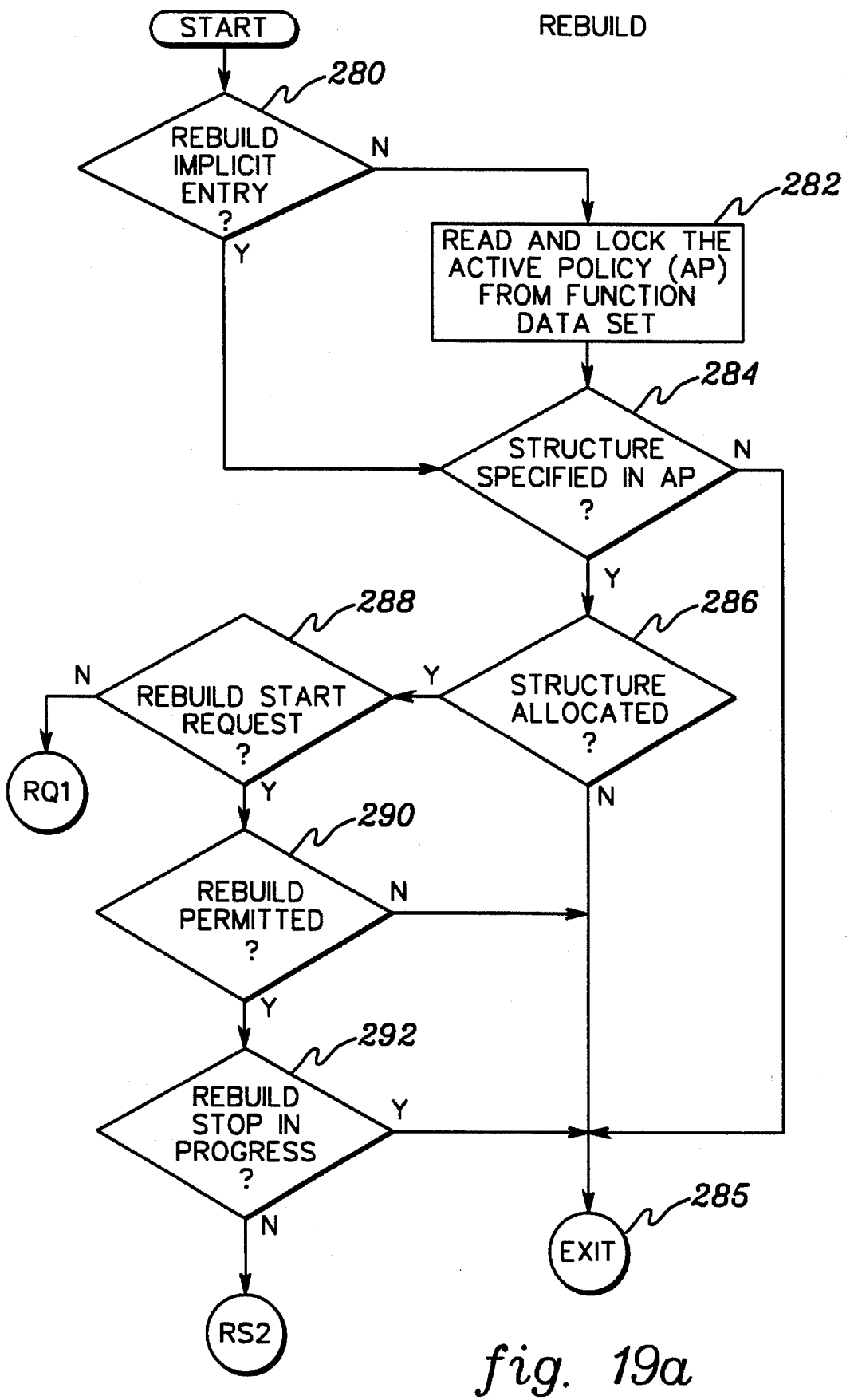
FIGS. 19a–19i depict one embodiment of the logic associated with a rebuild service, in accordance with the principles of the present invention.
Figure 19B:
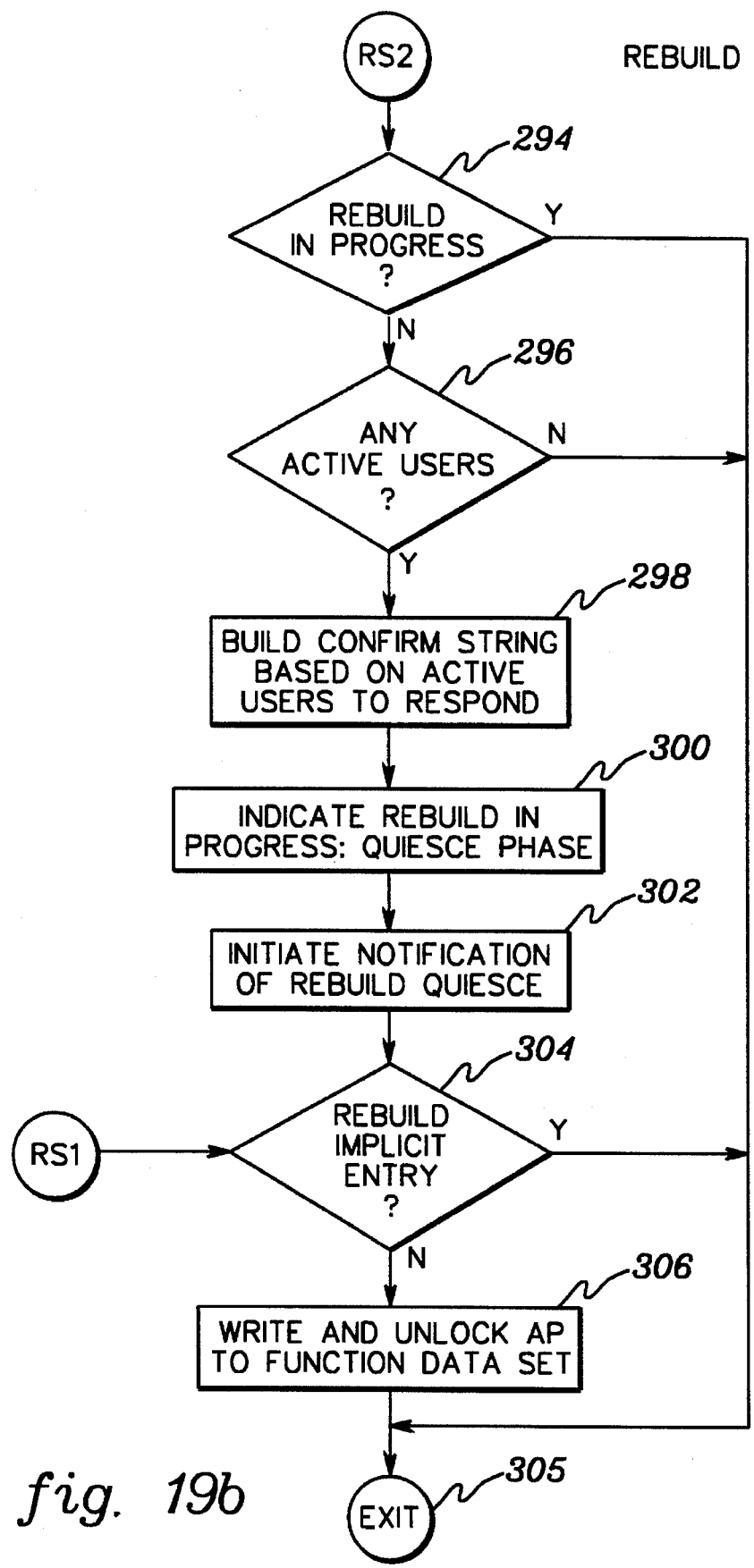
Figure 19C:
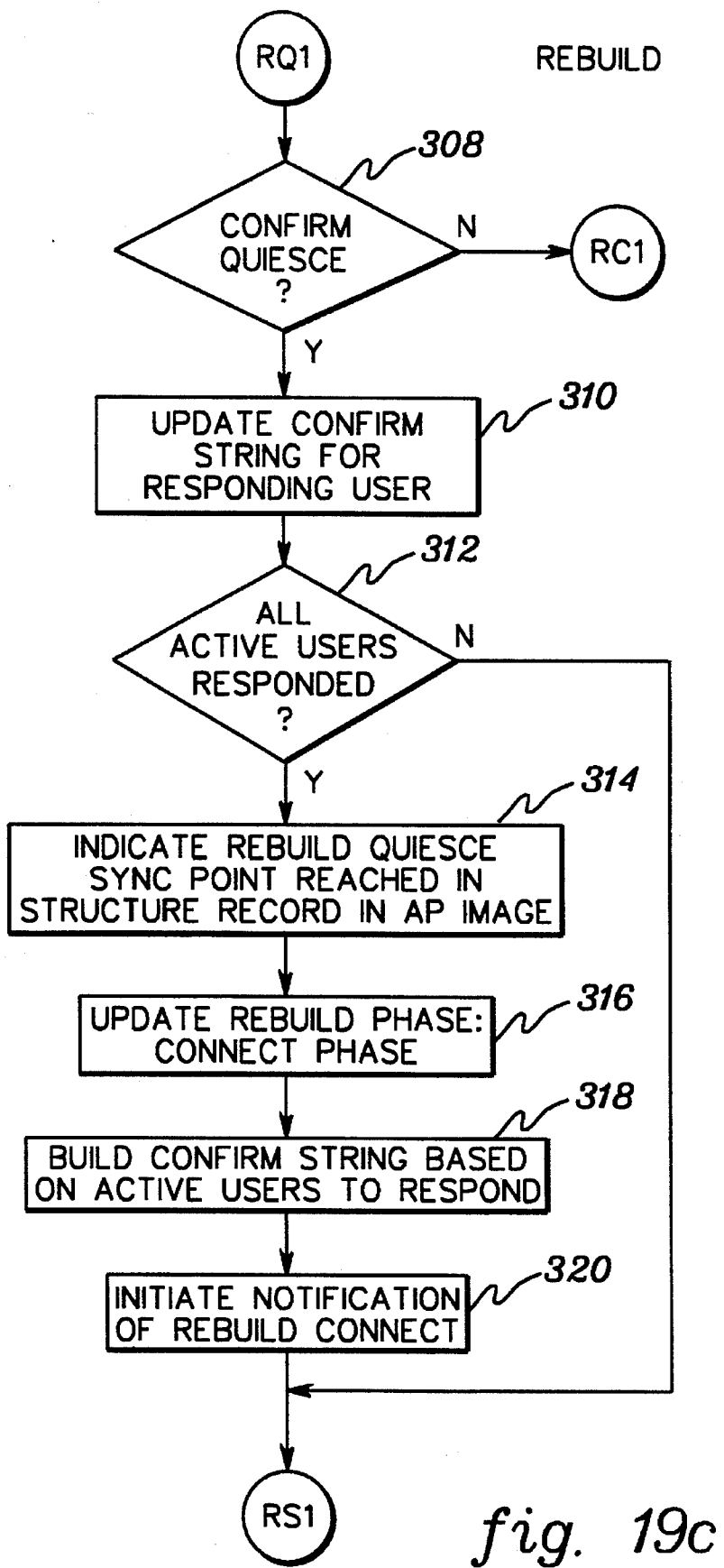
Figure 19D:
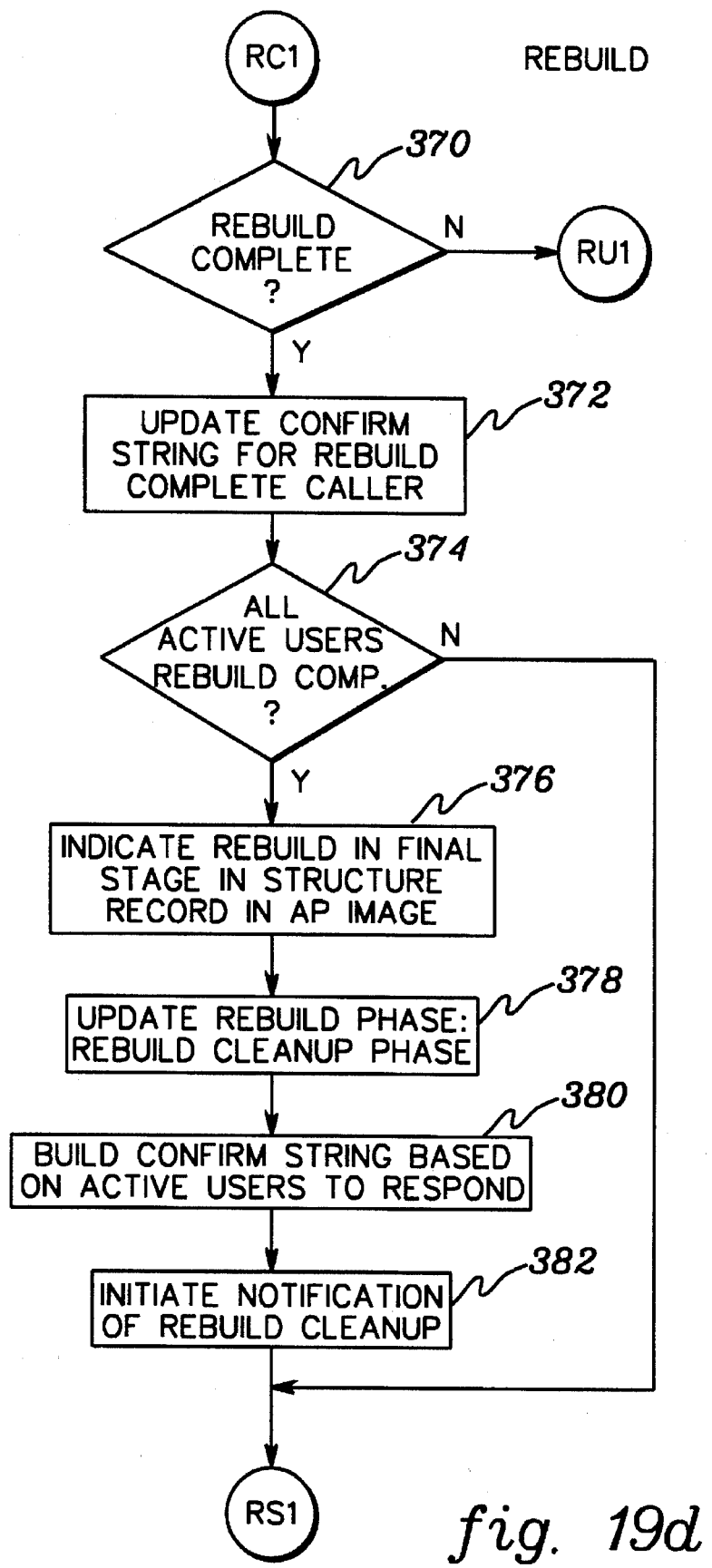
Figure 19E:
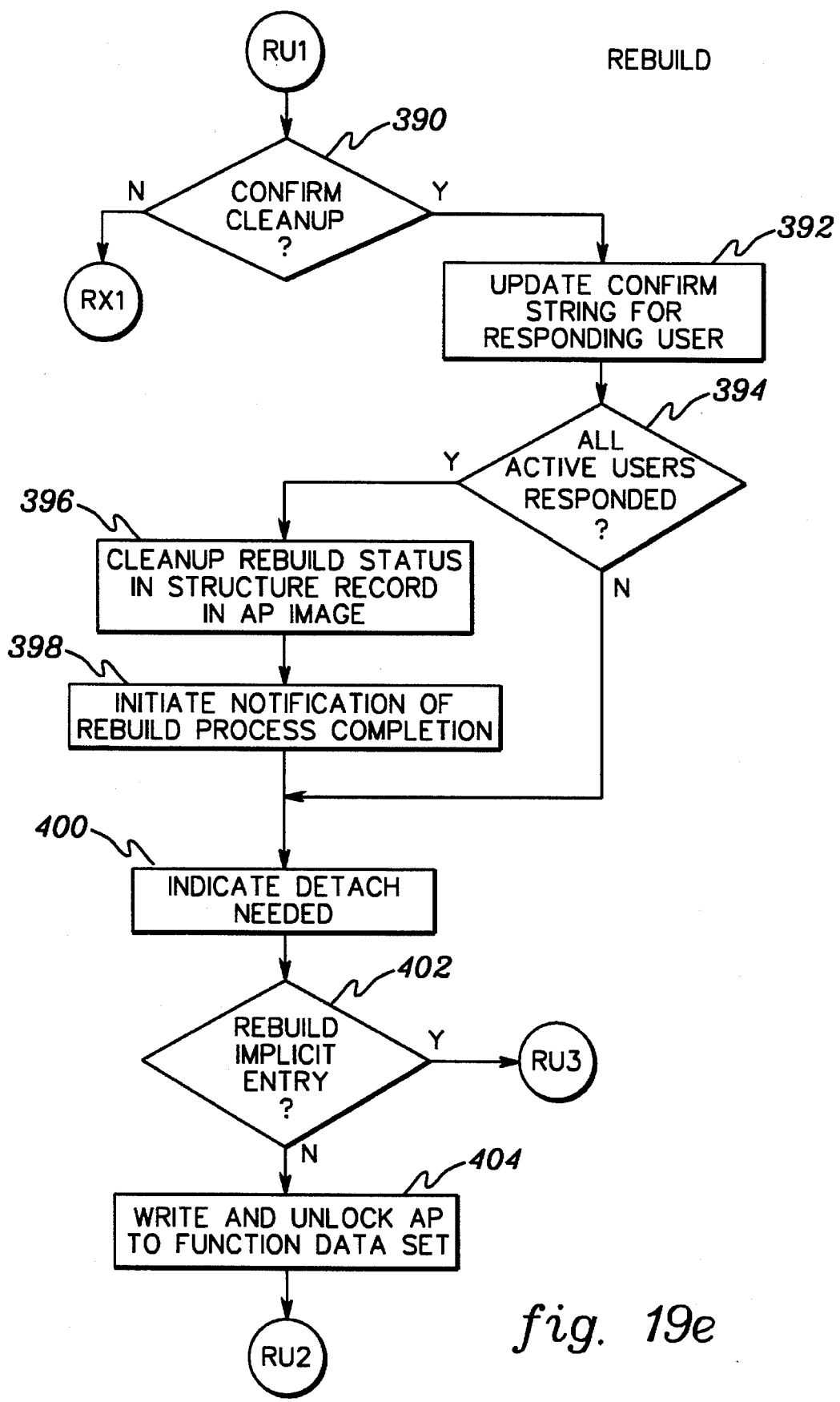
Figure 19F:
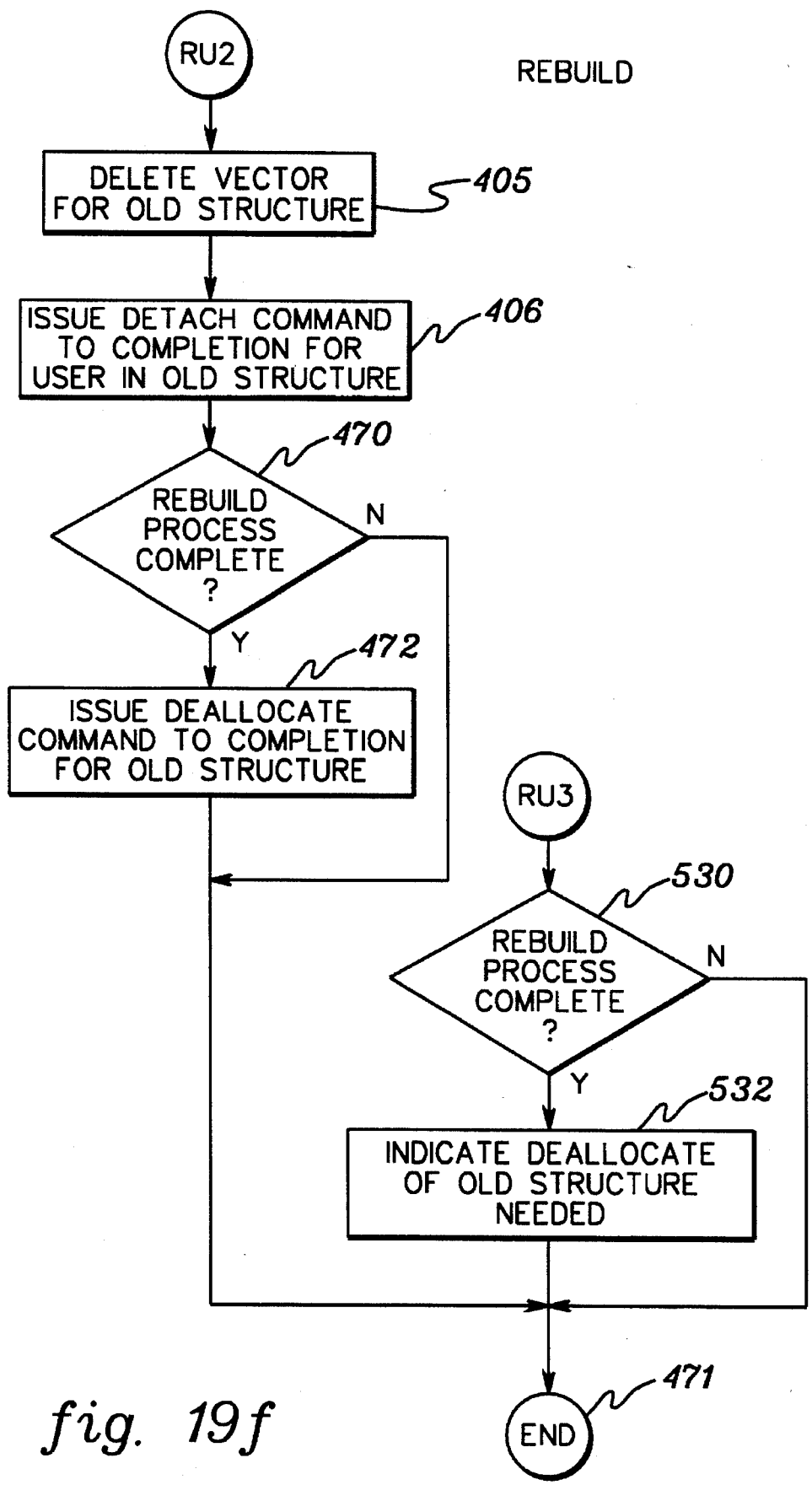
Figure 19G:
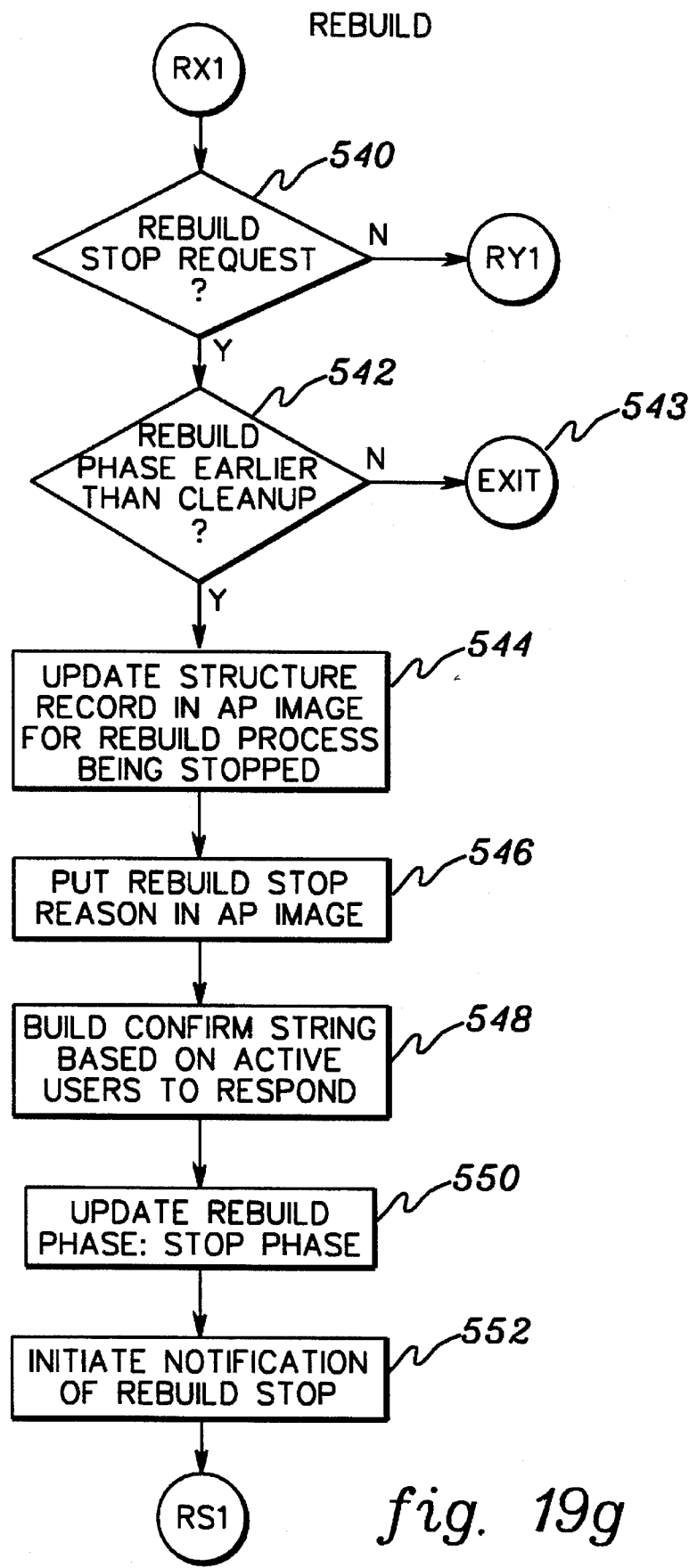
Figure 19H:
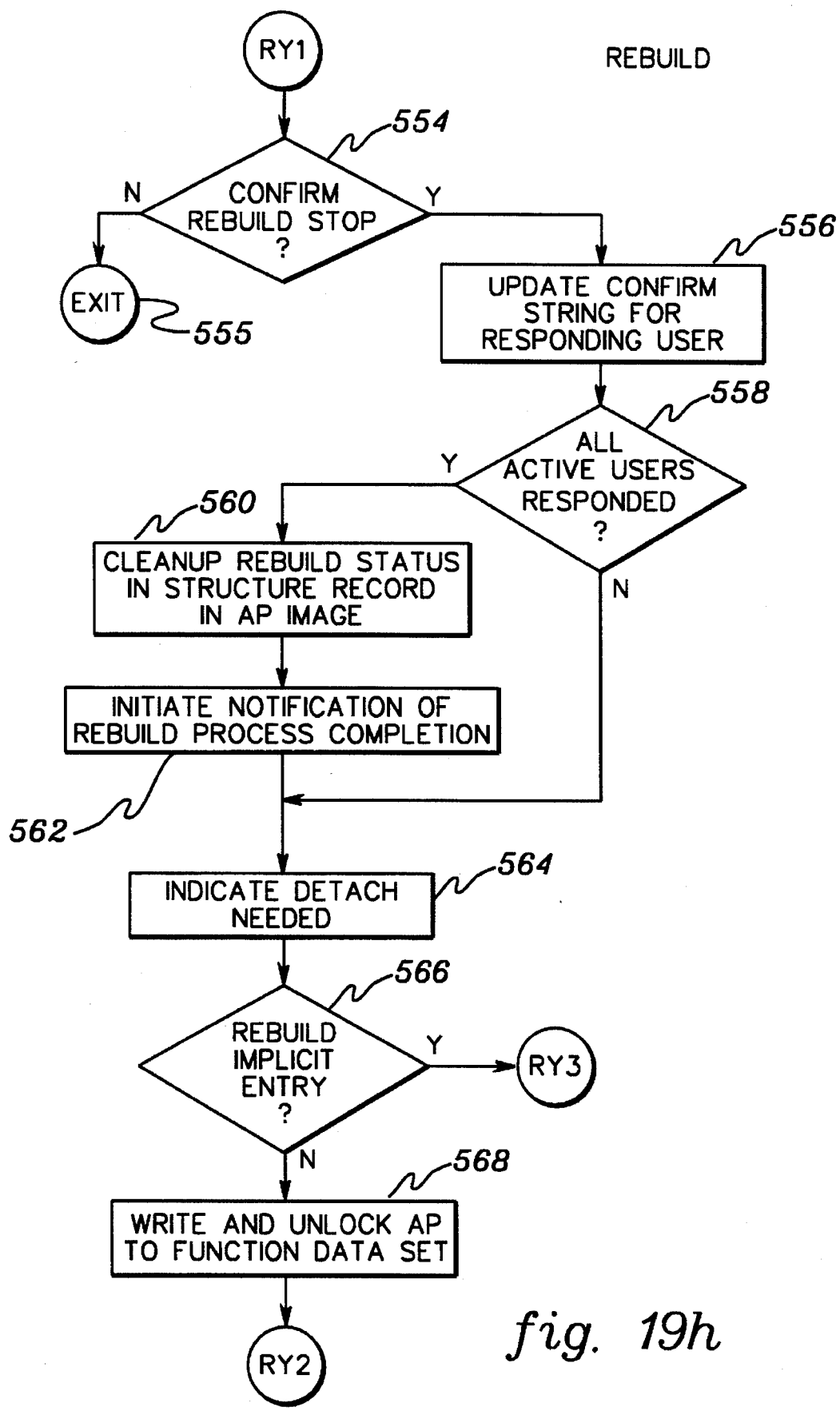

Referring to FIG. 19b and, in particular, STEP 302 "INITIATE NOTIFICATION OF REBUILD QUIESCE", after initiating notification, an inquiry is made into whether the rebuild service was invoked by a rebuild implicit entry, INQUIRY 304 "REBUILD IMPLICIT ENTRY?" Should a rebuild implicit entry be made, then processing of the rebuild service ends, STEP 305 "EXIT." Otherwise, the active policy is written to the function data set and the function data set is unlocked, STEP 306. One embodiment of the write and unlock process is described in U.S. patent application Ser. No. 07/548,516 for "Shared Data Access Seralization Method and Apparatus" by Insalaco et al (Attorney Docket No. PO9-88-007), filed on Jul. 2, 1990, and is incorporated herein by reference in its entirety.

Returning to INQUIRY 288, "REBUILD START REQUEST?", if a start request was not initiated, then a determination is made as to whether quiesce was confirmed by the responding user via an event exit response, described below, INQUIRY 308 "CONFIRM QUIESCE?" If quiesce was confirmed, then the confirm string for the responding user is updated, STEP 310, and another determination is made as to whether all active users have responded, INQUIRY 312, "ALL ACTIVE USERS RESPONDED?" If all the active users have responded, then an indication is made in the structure record in the active policy, indicating that a rebuild quiesce sync point has been reached, STEP 314. Subsequently, the rebuild phase specified in the structure record is updated to indicate that it is now in the connect phase, STEP 316 "UPDATE REBUILD PHASE: CONNECT PHASE." Additionally, the confirm string, based on active users to respond, is built, STEP 318, and notification of rebuild connect is initiated, STEP 320, as described above.

Returning to FIG. 19c and, in particular, STEP 320 "INITIATE NOTIFICATION OF REBUILD CONNECT", subsequent to initiating notification of rebuild connect, or if all of the active users have not responded, INQUIRY 312, then processing continues with INQUIRY 304 "REBUILD IMPLICIT ENTRY?"

Returning to INQUIRY 308 "CONFIRM QUIESCE?", if quiesce is not confirmed, then a further determination is made as to whether the rebuild service was invoked to report processing is complete, INQUIRY 370 (FIG. 19d) "REBUILD COMPLETE?" Should rebuild processing be complete, then the confirm string entry associated with the rebuild complete caller is updated, STEP 372, and a determination is made as to whether rebuild is complete for all active users, INQUIRY 374 "ALL ACTIVE USERS REBUILD COMP.?" If rebuild is complete for all active users, then an indication is made in the structure record in the active policy image that rebuild is in the final stage, STEP 376. Thereafter, the rebuild phase is updated, indicating the rebuild cleanup phase, STEP 378 "UPDATE REBUILD PHASE: REBUILD CLEANUP PHASE."

Subsequently, the confirm string, based on active users to respond, is built, STEP 380, and notification of rebuild cleanup is initiated via the rebuild event notification, described above, STEP 382 "INITIATE NOTIFICATION OF REBUILD CLEANUP." Thereafter, or if rebuild is not complete for all active users, INQUIRY 374, processing passes to INQUIRY 304 "REBUILD IMPLICIT ENTRY?"

Returning to INQUIRY 370 (FIG. 19d), "REBUILD COMPLETE?", if rebuild processing is not complete, then a determination is made as to whether the active user has confirmed cleanup via an event exit response, INQUIRY 390 (FIG. 19e) "CONFIRM CLEANUP?" If the responding user has confirmed cleanup, then the confirm string entry for the responding user is updated, STEP 392 "UPDATE CONFIRM STRING FOR RESPONDING USER", and a further determination is made as to whether all active users have responded, INQUIRY 394 "ALL ACTIVE USERS RESPONDED?" If all of the active users have responded, then the rebuild status in the structure record in the active policy image is cleaned up, STEP 396, and notification of rebuild process completion is initiated, STEP 398 "INITIATE NOTIFICATION OF REBUILD PROCESS COMPLETION." Thereafter, or if all of the active users have not responded, INQUIRY 394, an indication is made in the active policy that detach is needed for the old structure, STEP 400 "INDICATE DETACH NEEDED."

After indicating detach is needed, an inquiry is made into whether entry into the rebuild service was an implicit entry, INQUIRY 402 "REBUILD IMPLICIT ENTRY?" Should the entry into rebuild processing not be an implicit entry, the active policy is written to the function data set and the function data set is unlocked, STEP 404 "WRITE AND UNLOCK AP TO FUNCTION DATA SET." Subsequently, the vector (which is described below) for the old structure is deleted, STEP 405 (FIG. 19f) "DELETE VECTOR FOR OLD STRUCTURE" and a detach command is processed to completion for the user in the old structure, STEP 406. In particular, a detach-local-cache command is issued to atomically remove the identification of a local cache to a coupling facility cache and to free the specified local-cache identifier. Alternatively, a detach-list-structure-user command is used to detach a list structure user. One embodiment of the logic associated with a detach-local-cache command and/or a detach-list-structure-user command is described in detail below with reference to FIGS. 21a–21b. The particular controls associated with the detach-list-structure-user command are included in parentheses after the associated cache controls for the detach-local cache command.

Figure 21A:
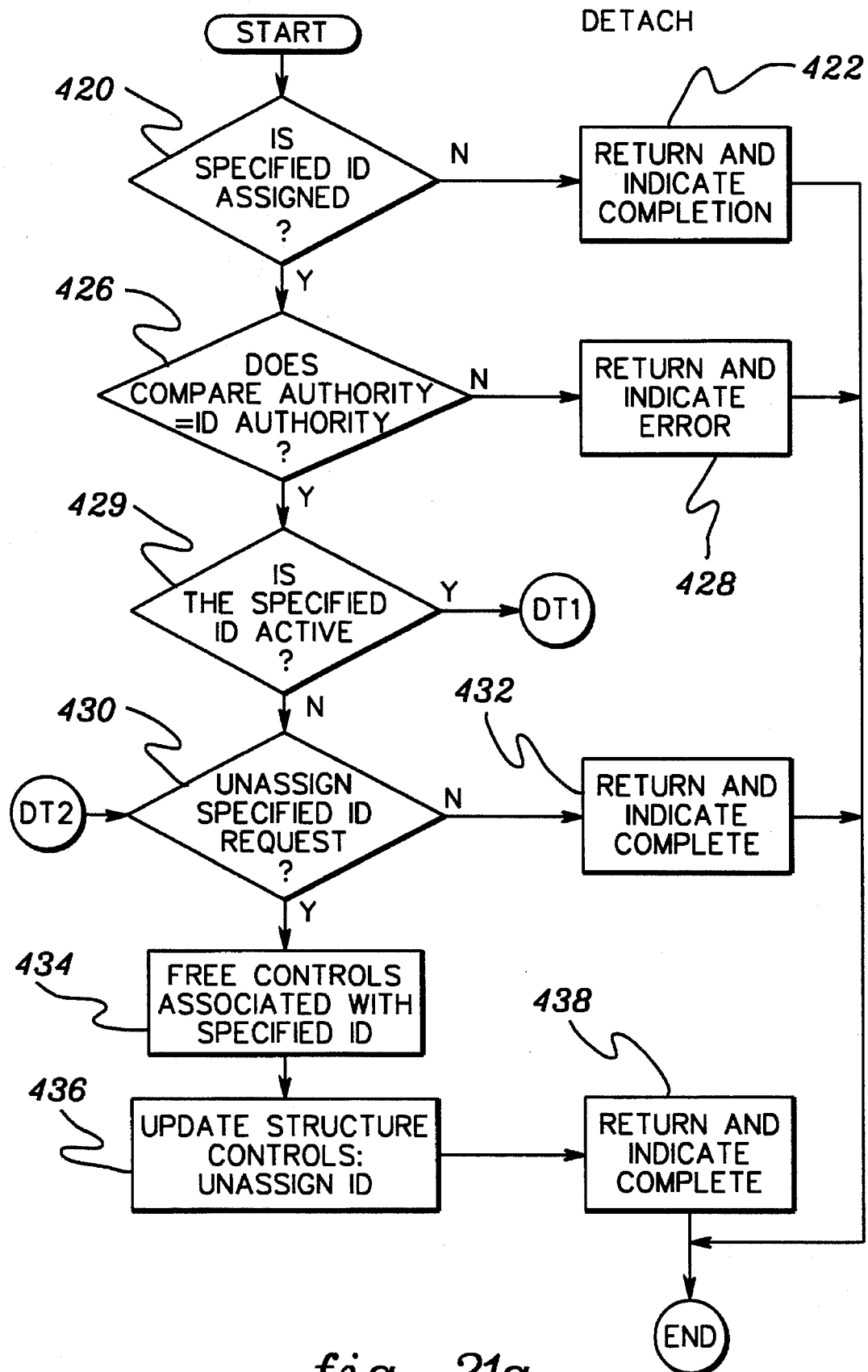
FIGS. 21a–21b depict one embodiment of the logic associated with a detach command, in accordance with the principles of the present invention.
Figure 21B:
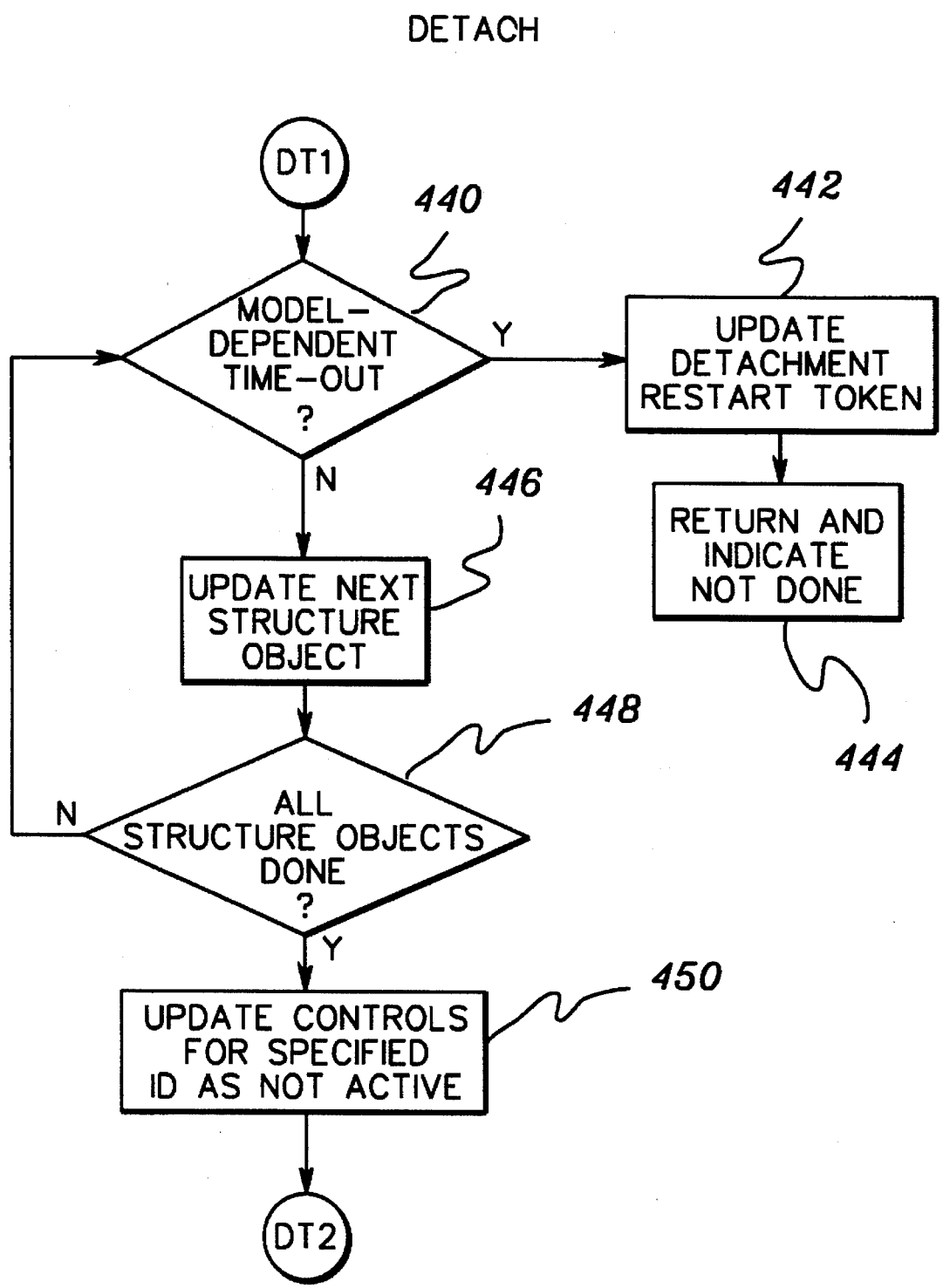

Referring to FIG. 21a, a determination is made as to whether a local cache identifier (FIG. 5) (or a user identifier in FIG. 9 in the case of the detach-list-structure-user command) is assigned, INQUIRY 420 "IS SPECIFIED ID ASSIGNED?" In particular, the LCID (or UID) string, which is indexed by LCID (or UID) is checked to see if the bit is on. If the bit is equal to one, the local identifier (or user identifier) is assigned. When the local cache identifier (or user identifier) is not assigned indicating that detachment has been completed, a completion code is returned, STEP 422 "RETURN AND INDICATE COMPLETION."

Should the local cache identifier (or user identifier) be assigned, an authority comparison takes place, INQUIRY 426 "DOES COMPARE AUTHORITY=ID AUTHORITY?" In particular, comparative local-cache authority (or comparative user authority) (FIG. 13) is compared to local-cache authority (FIG. 5) (or user authority (FIG. 9)). Should the comparison fail, the command is completed and the value of the local-cache authority (or user authority and user-attachment control) (FIG. 13) is returned, as well as an error code, STEP 428 "RETURN AND INDICATE ERROR."

If the comparison is successful, a determination is made as to whether the local cache identifier (or user identifier) is active, INQUIRY 429 "IS THE SPECIFIED ID ACTIVE?" That is, is the local cache identifier (or user identifier) inactive, as designated by the attachment status (FIG. 5) (or user attachment control (FIG.9))? Should the local cache identifier (or user identifier) be inactive, a determination is made as to whether the local cache identifier (or user identifier) is to be unassigned, INQUIRY 430 "UNASSIGN SPECIFIED ID REQUEST?" In particular, the LCID-unassignment control (or the detachment-request type) (FIG. 13) is checked, and if it is zero, no action is taken and a successful response code is returned, STEP 432 "RETURN AND INDICATE COMPLETE."

On the other hand, when the LCID-unassignment control (or detachment-request type) is set to one indicating that the local cache identifier (or user identifier) is to be released, then the local-cache controls in FIG. 5 (or the list-user controls in FIG. 9) and the designated bit in the LCID vector (or the user identifier vector) are reset and a successful response code is returned, STEPS 434, 436, and 438.

Returning to INQUIRY 429 "IS THE SPECIFIED ID ACTIVE?", when the local-cache identifier (or user identifier) is active, as designated by the attachment status in FIG. 5 (or user attachment control in FIG. 9) and therefore, attached, an inquiry is made into whether a model-dependent time-out has occurred, INQUIRY 440 (FIG. 21b) "MODEL-DEPENDENT TIME-OUT?" When the model-dependent time-out value is exceeded, the detachment restart token is updated in the local cache controls (for a list structure, list user controls is updated) and an exception response is returned, STEPS 442, 444.

However, when the model-dependent time-out has not been exceeded, the detachment process continues. In particular, for a cache detachment, the directory is searched starting with the directory entry specified by the detachment restart token in the local-cache controls. When the detachment restart token is not zero, detach processing is resumed at the directory entry specified in the token.

Each directory entry is processed as follows: the local-cache register is updated by clearing the row assigned to the local-cache specified by the LCID request operand, STEP 446 "UPDATE NEXT STRUCTURE OBJECT." The cast-out lock is tested. When the first byte of the cast-out lock is set to the value specified in the LCID operand, the cast-out lock is reset to zero, and the change bit in state field 80 is set to indicate the data is changed.

When the entire directory has not been processed, INQUIRY 448 "ALL STRUCTURE OBJECTS DONE?", flow returns to INQUIRY 440 "MODEL-DEPENDENT TIME-OUT? " However, when the entire directory has been processed, INQUIRY 448 "ALL STRUCTURE OBJECTS DONE?", the attachment status control is updated as not active, STEP 450. Further, when the local-cache unassignment control is one, INQUIRY 430 (FIG. 21a), the designated bit in the LCID vector and the local-cache controls are reset and a successful response is returned, STEPS 434, 436 and 438.

In addition, when the entire directory has been processed, the attachment status is reset to inactive, STEP 450 (FIG. 21b), and when the local-cache unassignment control is zero, INQUIRY 430 (FIG. 21a), a successful response code is returned, STEP 432. The remaining local-cache controls and the LCID vector are not changed.

When the model-dependent time-out period has not been exceeded and it is a list structure detachment process, the next list-monitor table entry associated with the list-structure user is updated by resetting the associated list-monitoring-active bit, STEP 446 (FIG. 21b) "UPDATE NEXT STRUCTURE OBJECT." When all of the list-monitoring-active bits of all the list-monitor-table entries associated with the list-structure user are reset, INQUIRY 448 "ALL STRUCTURE OBJECTS DONE?", then the user-attachment control is updated to inactive, STEP 450 "UPDATE CONTROLS FOR SPECIFIED ID AS NOT ACTIVE," and processing continues with INQUIRY 430 (FIG. 21a) "UNASSIGN SPECIFIED ID REQUEST?" Should all the structure objects not be done, INQUIRY 448 (FIG. 21b), flow passes back to INQUIRY 440 "MODEL-DEPENDENT TIME-OUT?"

If a detach-list-structure-user command is reissued until a successful response code is returned and no intervening register-list-monitor commands are received for the same user, then all the list-notification commands issued on behalf of the detached user are complete.

The detach-list-structure user command is an exception to the specification of command-concurrent references. A register-list-monitor command is permitted to complete successfully during execution of a detach-list-structure-user command. The program must serialize the detachment process with the issuance of register-list-monitor commands, if all list-notification commands for a user must be complete when a user is detached.

An assigned user identifier for a detached user may be unassigned by issuing the detach-list-structure-user command with the appropriate detachment-request type.

Returning to FIG. 19f, subsequent to completing the detach user command, a determination is made as to whether the rebuild process is complete, INQUIRY 470 "REBUILD PROCESS COMPLETE?" In particular, a check is made to see if all users have responded with a confirm cleanup. If all users have not responded and the rebuild process is not complete, then processing of the rebuild service ends, STEP 471 "END." However, if rebuild processing is complete, then a deallocate command is processed to completion for the old structure, STEP 472 "ISSUE DEALLOCATE COMMAND TO COMPLETION FOR OLD STRUCTURE."

In particular, the cache or list structure is deallocated. In one embodiment, the logic associated with deallocating a structure is described in detail with reference to FIG. 22. The logic will be discussed with relation to deallocating a cache structure, and the relevant changes in order to deallocate a list structure will be included in parentheses.

Figure 22:
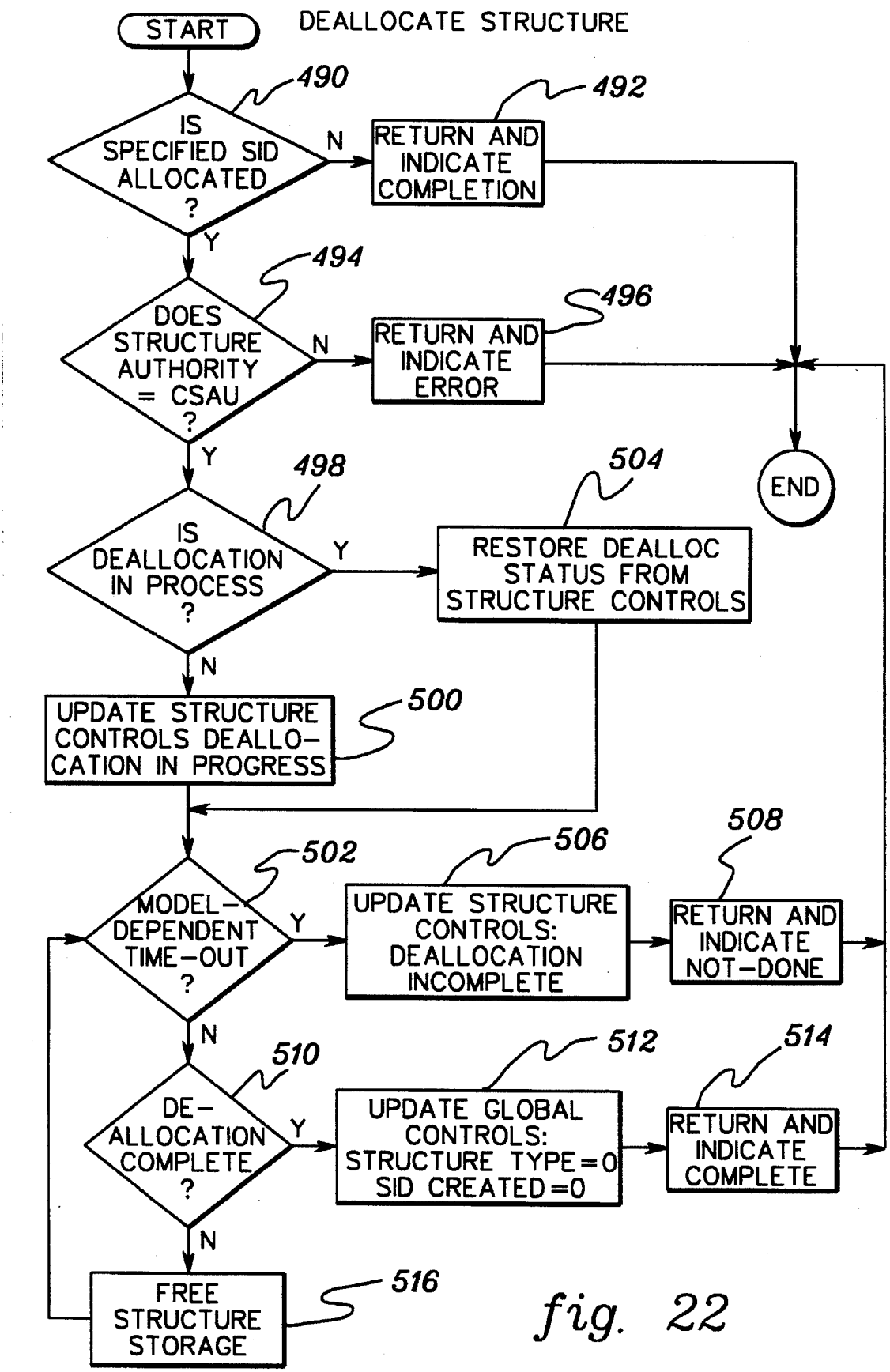

Referring to FIG. 22, a determination is made as to whether the specified structure identifier, SID, is allocated, INQUIRY 490 "IS SPECIFIED SID ALLOCATED?" When the specified created bit of the structure-identifier vector is zero, no processing occurs and a successful response code is returned, STEP 492 "RETURN AND INDICATE COMPLETION".

When the specified bit of the structure identifier vector is one, a structure authority comparison is made, INQUIRY 494 "DOES STRUCTURE AUTHORITY=CSAU?" When the value of the structure authority in cache-structure controls 69 (FIG. 4) (or in list-structure controls 92 (FIG. 8)) is not equal to the comparative structure authority operand in request/response operands (FIG. 13), the value of the structure authority and the user structure control (USC) in the request/response operands (or for a list structure, the structure authority and the user structure control (USC)) and an error response code are returned, STEP 496 "RETURN AND INDICATE ERROR."

When the structure authority comparison is successful, a determination is made as to whether deallocation is already in progress, INQUIRY 498 "IS DEALLOCATION IN PROCESS?" When deallocation is not is progress, as indicated by a deallocation control (not shown) in cache-structure controls (or list structure controls), deallocation is initiated for a cache (or list) structure. In particular, the cache-structure controls (or list-structure controls) are updated to indicate deallocation is in progress, STEP 500 "UPDATE STRUCTURE CONTROLS: DEALLOCATION IN PROGRESS," and flow passes to INQUIRY 502.

Returning to INQUIRY 498, when deallocation is in process, the deallocation control in cache-structure controls (or list-structure controls) is restored, STEP 504 "RESTORE DEALLOC STATUS FROM STRUCTURE CONTROLS," and flow passes to INQUIRY 502 "MODEL-DEPENDENT TIME-OUT."

Should a model-dependent time-out occur before the deallocation process is complete, INQUIRY 502 "MODEL-DEPENDENT TIME-OUT?", the structure is placed in the deallocation incomplete state, the free space and free control space global controls are updated and an exception response code is returned, STEPS 506, 508.

When there is no model-dependent time-out and deallocation is complete, INQUIRY 510 "DEALLOCATION COMPLETE?", the structure type and the created bit in the structure-identifier vector are reset to zero and a successful response code is returned, STEPS 512, 514.

When the response code is successful, the structure is no longer available, and its associated storage is available for a subsequent allocation request.

When deallocation is incomplete, the structure storage is freed and the free-space and free-control-space global controls are updated, STEP 516 "FREE STRUCTURE STORAGE." Thereafter, flow returns to INQUIRY 502 "MODEL-DEPENDENT TIME-OUT?"

When a deallocate-cache-structure command designates a cache structure that has been created but for which allocation is not complete, the structure is deallocated.

The specified created bit of the SID vector is reset on completion of the deallocate command. When deallocation is in progress, all commands except for the read-structure-type, and deallocate-cache-structure command fail with an exception response.

As for a list structure, the specified created bit of the SID vector is reset on completion of the deallocate command. When deallocation is in progress, all commands, except for the read-structure-type, and deallocate-list-structure commands fail with an exception response.

When deallocation is in progress, the read-structure-type command returns the structure type of the structure that is being deallocated. Also, an allocation command specifying the same SID fails with a deallocation-incomplete status condition.

Returning to FIG. 19f, and in particular STEP 472, subsequent to completing the deallocate command, processing of the rebuild service is complete, STEP 471 "END."

Returning to FIG. 19e, and in particular, INQUIRY 402 "REBUILD IMPLICIT ENTRY?", if this is an implicit entry, then a determination is made as to whether the rebuild process is complete, INQUIRY 530 (FIG. 19f) "REBUILD PROCESS COMPLETE?" If rebuild processing is not complete, then processing of the rebuild service ends, STEP 471 "END." Otherwise, an indication of deallocation is made in the active policy for the old structure, STEP 532, and processing of the rebuild service ends, STEP 471 "END."

Returning to INQUIRY 390 (FIG. 19e) "CONFIRM CLEANUP?", if cleanup was not confirmed by a responding user, then a determination is made into whether this is a rebuild stop request, INQUIRY 540 (FIG. 19g) "REBUILD STOP REQUEST?" Should this be a rebuild stop request, then a determination is made into whether the rebuild phase was earlier than the cleanup phase, INQUIRY 542

"REBUILD PHASE EARLIER THAN CLEANUP?" If the rebuild phase is not earlier than the cleanup phase, then processing of the rebuild service is complete, STEP 543 "EXIT." Otherwise, the structure record in the active policy image for rebuild process is updated to indicate that the rebuild process is being ended, STEP 544, and a rebuild stop reason is placed in the structure record of the active policy image, STEP 546. Thereafter, the confirm string, based on active users to respond, is built in the status area of structure record 144, STEP 548, and the rebuild phase is updated, indicating the stop phase, STEP 550 "UPDATE REBUILD PHASE: STOP PHASE." Thereafter, a notification of rebuild stop is initiated via rebuild event notification, described above, STEP 552, and flow passes to INQUIRY 304 "REBUILD IMPLICIT ENTRY?"

Returning to INQUIRY 540, "REBUILD STOP REQUEST," if this is not a rebuild stop request, then a further determination is made as to whether a responding user has confirmed the rebuild stop via an event exit response, INQUIRY 554 "CONFIRM REBUILD STOP?" If a confirmation of rebuild stop has not been made, then the rebuild service is complete, STEP 555 "EXIT." Otherwise, the confirm string entry for the responding user is updated, STEP 556, and a further inquiry is made into whether all active users have responded, INQUIRY 558 "ALL ACTIVE USERS RESPONDED?" If all the active users have responded, then the rebuild status in the structure record in the active policy image is cleaned up, STEP 560, and notification of rebuild stop process complete is initiated, STEP 562. Thereafter, or if all the active users have not responded, INQUIRY 558, an indication is made that detach is needed for user from the new structure, STEP 564 "INDICATE DETACH NEEDED."

Figure 19I:
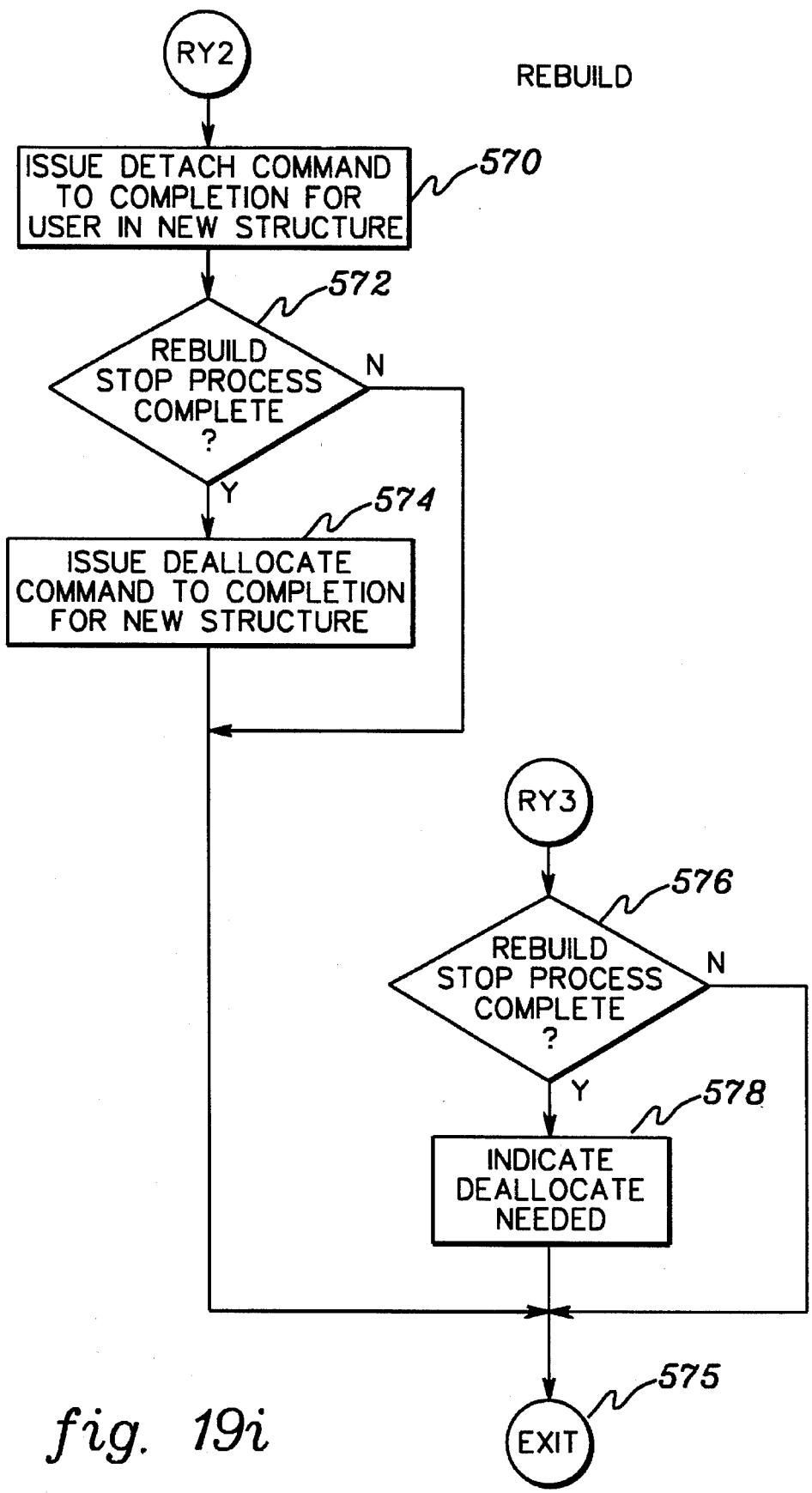

Subsequent to indicating that detach is needed, a determination is made as to whether the rebuild service was entered via an implicit entry, INQUIRY 566 "REBUILD IMPLICIT ENTRY?" Should this not be an implicit entry, then the active policy is written to the function data set and the function data set is unlocked, STEP 568 "WRITE AND UNLOCK AP TO FUNCTION DATA SET." Thereafter, the detach command is processed to completion for the user in the new structure, STEP 570 (FIG. 19*i*). After completing the detach command, which is described above, then a determination is made as to whether the rebuild stop process is complete, INQUIRY 572 "REBUILD STOP PROCESS COMPLETE?"

If the rebuild stop is complete, then a deallocate command is processed to completion for the new structure, as described above, STEP 574. After completing the deallocate command, or if the rebuild stop process is not complete, then processing of the rebuild service is complete, STEP 575 "EXIT."

Returning to INQUIRY 566 (FIG. 19*h*), "REBUILD IMPLICIT ENTRY?", if entry was implicit, then a determination is made as to whether the rebuild stop process is complete, INQUIRY 576 (FIG. 19*i*) "REBUILD STOP PROCESS COMPLETE?" Should the rebuild stop process be complete, then an indication that deallocation is needed is made, STEP 578 "INDICATE DEALLOCATE NEEDED", and processing of the rebuild service is complete, STEP 575 "EXIT." On the other hand, if the rebuild stop process is incomplete, then processing of the rebuild service is complete, STEP 575 "EXIT."

As described above with reference to the rebuild service of FIGS. 19*a*–19*i*, at certain selected times, it is necessary for the active users of the rebuild structure(s) to respond, indicating that they have received a particular event and have complied with any desired procedures. As one example, at STEP 302 of FIG. 19*b*, an event is presented to the connector's event exit, specifying a rebuild quiesce event and at INQUIRY 308 (FIG. 19*c*), a determination is made as to whether the quiesce event was confirmed by the connector.

In order to confirm the quiesce event or other events, in one example, an event exit response is provided. IXLEERSP is one example of a service which is invoked in response to events presented to the event exit. Not all events require a response. The IXLEERSP interface defines the events for which a response is applicable.

If an event exit response can be provided synchronously from the event exit, then a return code can be set in an event exit parameter list (e.g., IXLYEEPL). If the response must be provided asynchronously, then the responding connected XES user invokes the IXLEERSP service to provide the event exit response. In one embodiment, there are some events which require an IXLEERSP response.

A connector responds to an event via the IXLEERSP service after completing all processing for the event. A connected XES user receives events in the event exit in the sequence in which the events were reported. For example, a related connector receives an event indicating that a connection is active (new connection or existing connection event for a given connection), before receiving a disconnect or failed connection event, described below, for that connection. In most cases, each connection to the structure receives the events in the same sequence; however, when a rebuild quiesce event occurs, and then a rebuild stop event occurs before all connectors are told about the rebuild quiesce event, the rebuild quiesce event is filtered and only the rebuild stop event is presented.

One example of the syntax associated with an event exit interface, and in particular, IXLEERSP, is described in detail below.

```
IXLEERSP EVENT = DISCFAILCONN
        ,SUBJCONTOKEN = xsubjcontoken
        ,EVENTSEQ# = xeventseq#
        ,RELEASECONN = {NO|YES}
    ,EVENT = EXISTINGCONN
        ,SUBJCONTOKEN = xsubjcontoken
    ,EVENT = REBLDQUIESCE
    ,EVENT = REBLDSTOP
    ,EVENT = REBLDCLEANUP
    ,EVENT = REBLDCONNFAIL
        ,SUBJCONTOKEN = xsubjcontoken
        ,EVENTSEQ# = xeventseq#
    ,CONTOKEN = xcontoken
```

Where:
EVENT({DISCFAILCONN|
  EXISTINGCONN|REBLDQUIESCE|
  REBLDSTOP|REBLDCLEANUP|REBLDCONNFAIL})
  is a required keyword input which identifies the event the connector's response is for.

EVENT(DISCFAILCONN)—is a disconnected or failed connection event (EEPLDISFAILCONNECTION).
    SUBJCONTOKEN(xsubjcontoken) is the name of a required 16 character input field that specifies the connect token the response is for. The connect token specified should be the value presented to this connection in the event exit parameter list (EEPL, field EEPLSUBJCONTOKEN).
    EVENTSEQ#(xeventseq#) is the name of a required fullword input field that specifies the subject event sequence number. The event sequence number specified should be the value presented to this connection in the event exit parameter list (EEPL, field EEPLEVENTSEQ#).

RELEASECONN({NO|YES}) is a required keyword input which indicates whether the connection should remain persistent or be released.

NO specifies XES should continue processing for the failed connection. The connector issuing IXLEERSP has completed all processing for the failed connection. The persistence attribute of the connection is not affected by this response.

YES specifies XES should continue processing for the failed connection and indicates that this connection is no longer required to be persistent. The connector issuing IXLEERSP has completed all processing for the failed connection.

EVENT(EXISTINGCONN) is an existing failed-persistent connection event (EEPLEXISTINGCONNECTION). This response indicates that a failed-persistent connection no longer needs to be persistent, i.e., can be released.

SUBJCONTOKEN (xsubjcontoken) is described above.

EVENT(REBLDQUIESCE) is a rebuild quiesce event (EEPLREBUILDQUI ESCE).

EVENT(REBLDSTOP) is a rebuild stop event (EEPLREBUILDSTOP).

EVENT(REBLDCLEANUP) is a rebuild cleanup event (EEPLREBUI LDCLEANUP).

EVENT(REBLDCONNFAIL) is a rebuild connect failure event (EEPLREBUILDCONNECTFAILURE).

SUBJCONTOKEN (xsubjcontoken) and EVENTSEQ#(eventseq#) are described above.

CONTOKEN(xcontoken) is the name of a required 16 character field that specifies the connect token of the responding connection.

Figure 23A:
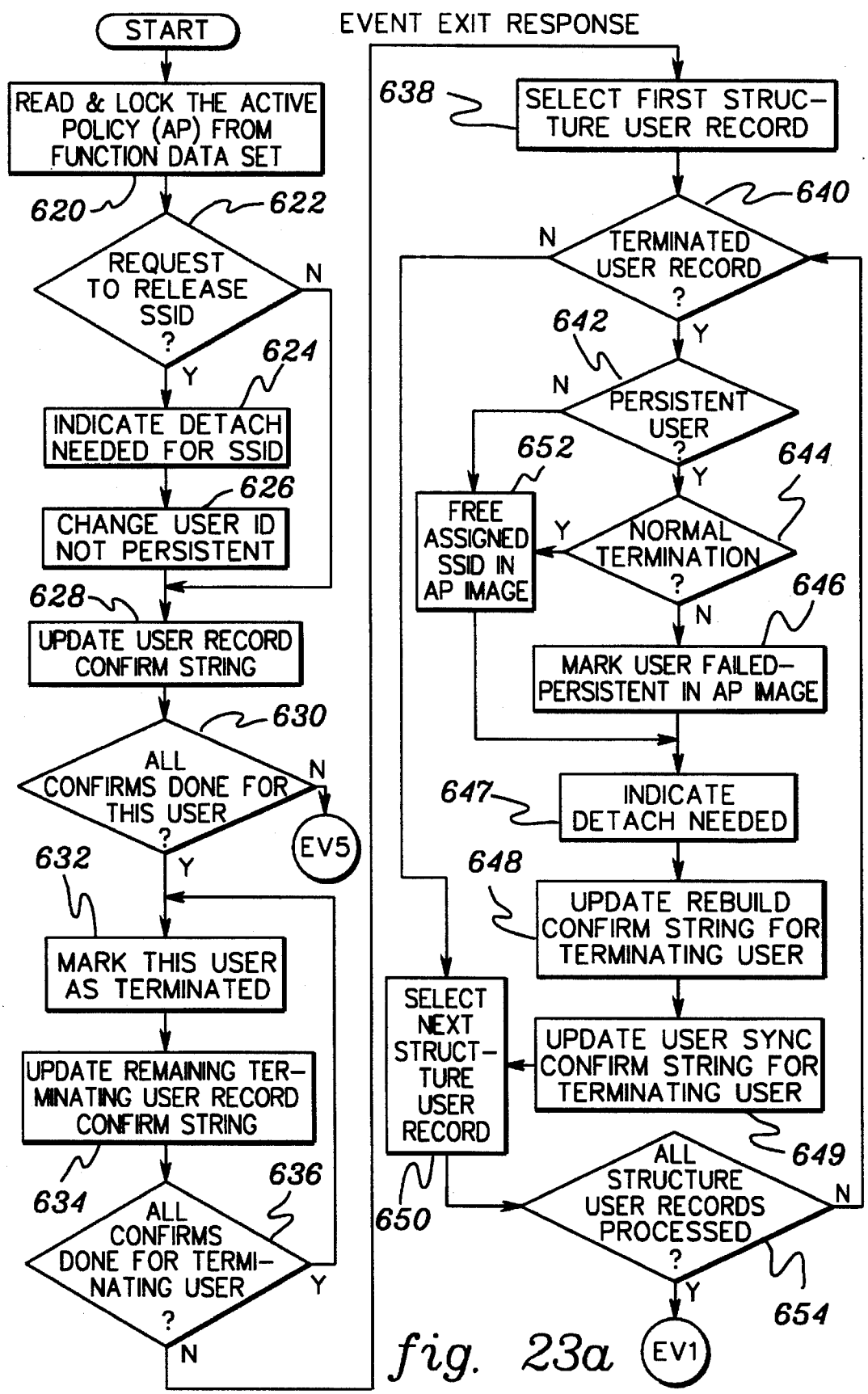
FIGS. 23a–23d depict one embodiment of the logic associated with an event exit response service, in accordance with the principles of the present invention.
Figure 23B:
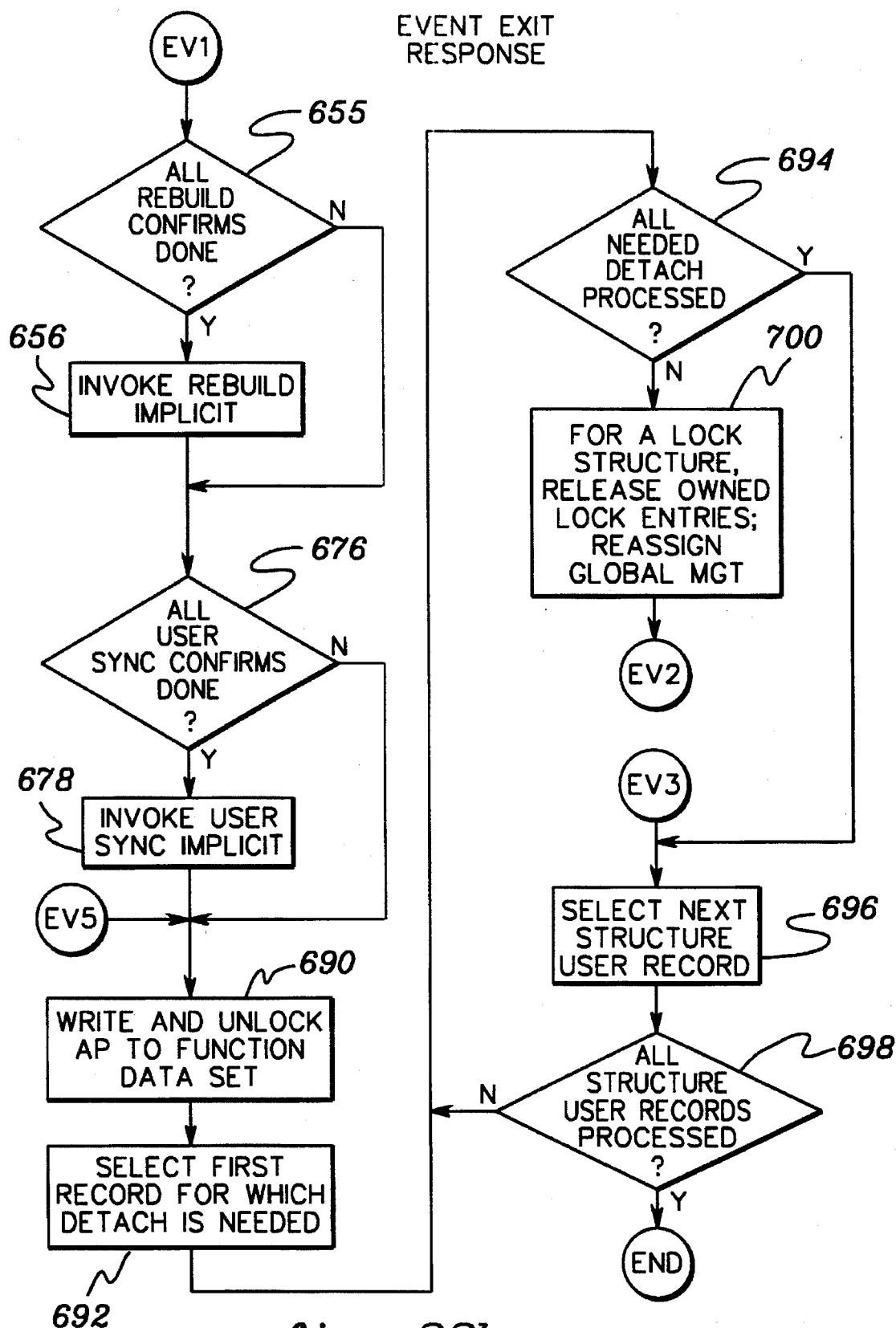
Figure 23C:
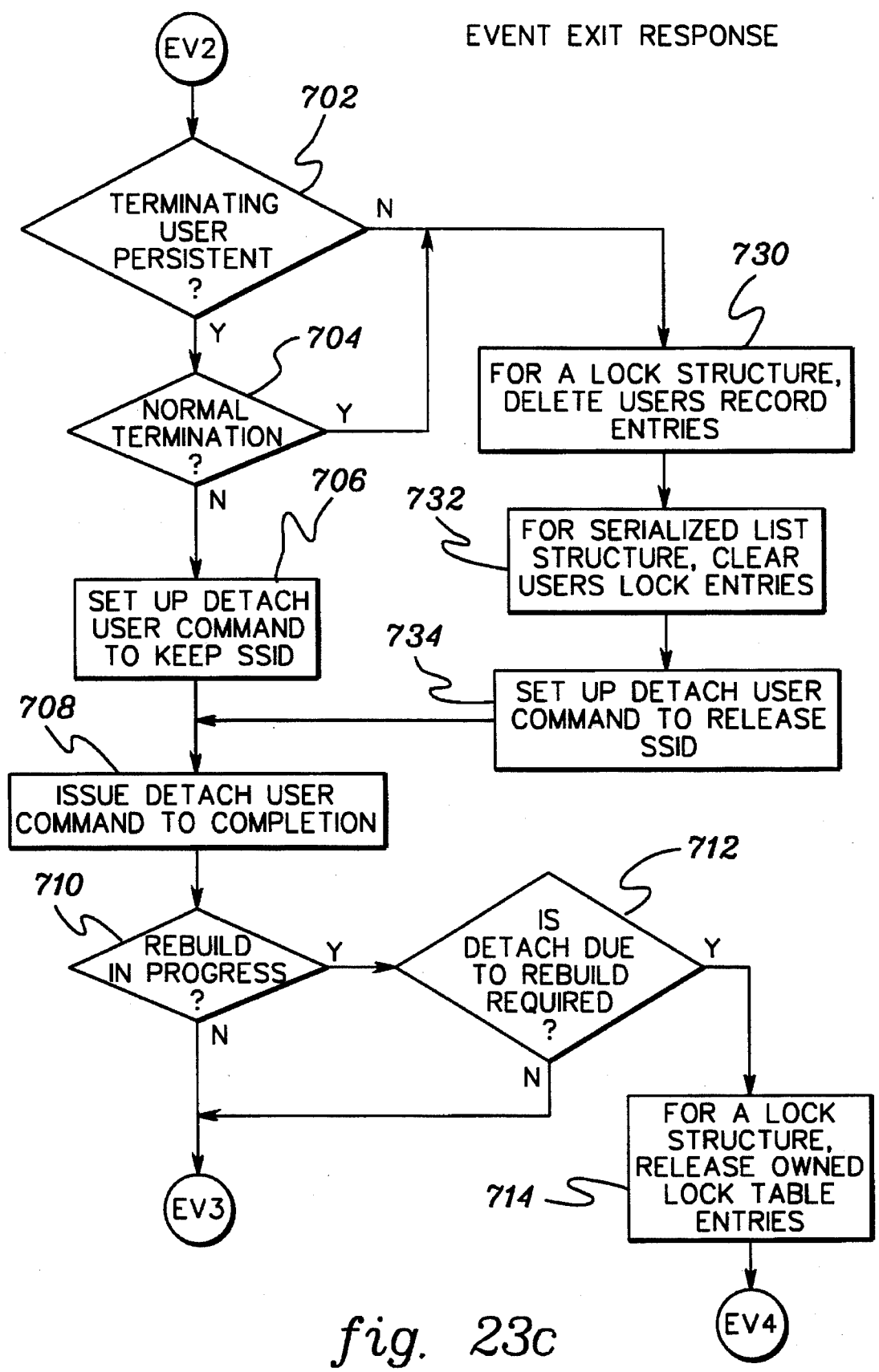
Figure 23D:
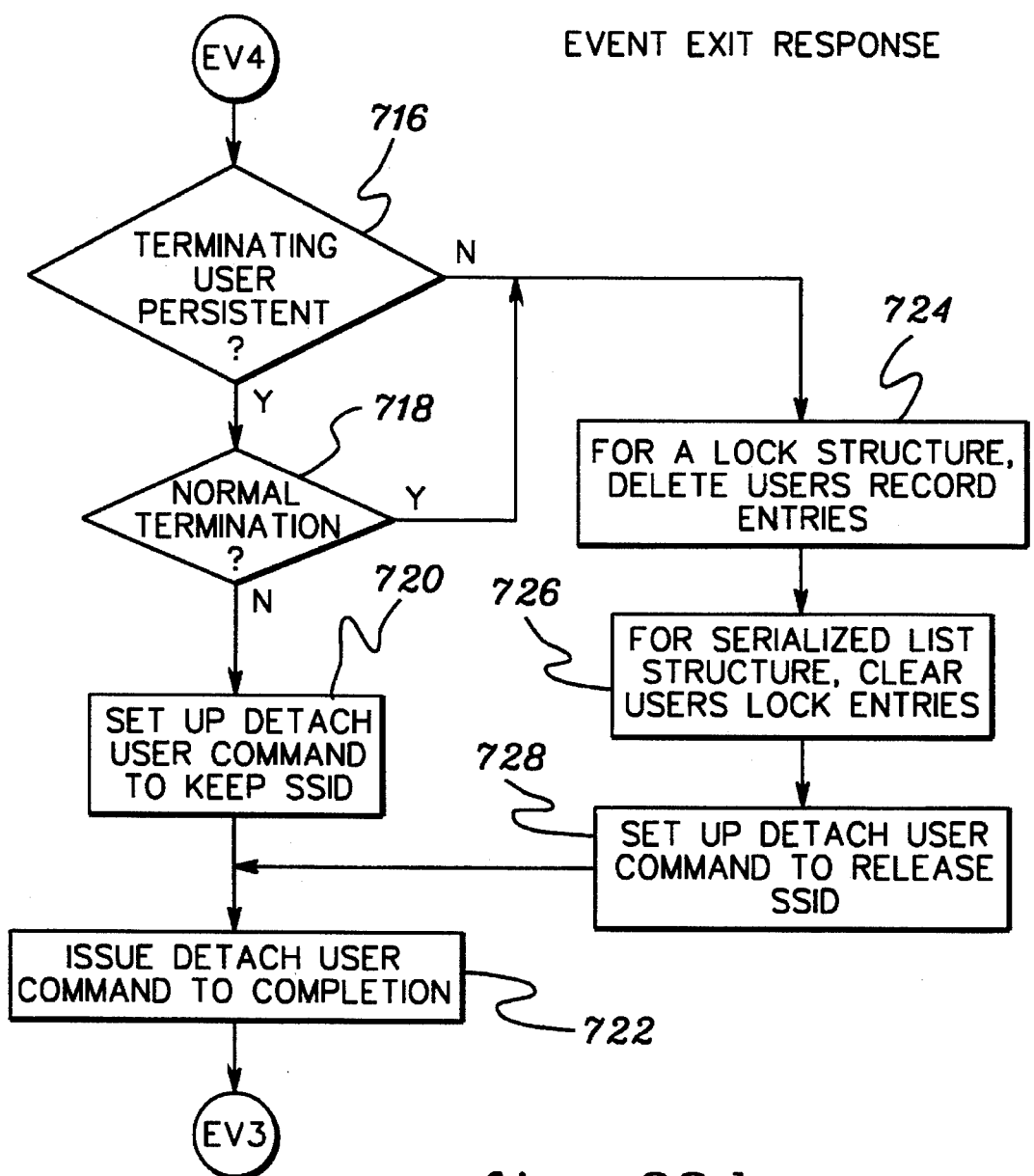

One embodiment of the logic associated with an event exit response, such as the IXLEERSP service, is described in detail with reference to FIGS. 23a–23d. Referring to FIG. 23a, the active policy is read from the function date set and the function data set is locked, STEP 620 "READ AND LOCK THE ACTIVE POLICY (AP) FROM THE FUNCTION DATA SET." Thereafter, a determination is made as to whether there is a request to release the LCID for a cache or UID for a list, INQUIRY 622 "REQUEST TO RELEASE SSID?" (SSID is used herein as a subsystem ID, which is either an LCID or UID.) In particular, RELEASECONN on IXLEERSP will indicate this. Should there be such a request, detach is indicated for the SSID, STEP 624 "INDICATE DETACH NEEDED FOR SSID."

After the indication of detach is made, the identified user's status is changed to not persistent, STEP 626 "CHANGE USER ID NOT PERSISTENT." Subsequent to changing the user ID or if there is no request to release the SSID, the user record confirm string in the active policy is updated, STEP 628 "UPDATE USER RECORD CONFIRM STRING."

Thereafter, if all the confirms are done for this user, INQUIRY 630 "ALL CONFIRMS DONE FOR THIS USER?", the user is marked as terminated in the user record of the active policy, STEP 632, the remaining terminating user record confirm string is updated, STEP 634, and once again, a determination is made as to whether all the confirms are done for the terminating user, INQUIRY 636 "ALL CONFIRMS DONE FOR TERMINATING USER?"

If all the confirms are done, flow pass to STEP 632 "MARK THIS USER AS TERMINATED." However, if all the confirms are not done, the first structure user record is selected, STEP 638 "SELECT FIRST STRUCTURE USER RECORD." Should the user record be terminated, INQUIRY 640 "TERMINATED USER RECORD?", the user be persistent, INQUIRY 642, and abnormal termination occur, INQUIRY 644, the user is marked as failed-persistent in the active policy image in virtual storage, STEP 646 "MARK USER FAILED-PERSISTENT IN AP IMAGE."

Subsequent to marking the user, an indication is made in the active policy that detach is needed, STEP 647 "INDICATE DETACH NEEDED." Thereafter, the rebuild confirm string and the user sync confirm string for the terminating user are updated, STEPS 648, 649. Subsequent to updating the confirm strings, or if the user record is not terminated, INQUIRY 640, the next structure user record is selected, STEP 650 "SELECT NEXT STRUCTURE USER RECORD." Similarly, if the user is not persistent or termination is normal, the assigned SSID in the active policy image in virtual storage is freed, STEP 652 "FREE ASSIGNED SSID IN AP IMAGE," and flow passes to STEP 647 "INDICATE DETACH NEEDED."

After selecting the next structure user record, STEP 650, if all of the structure user records have not been processed, INQUIRY 654, flow passes to INQUIRY 640 "TERMINATED USER RECORD?" and processing continues, as described above. However, when all of the structure user records have been processed, a determination is made as to whether all the rebuild confirms are done, INQUIRY 655 (FIG. 23b) "ALL REBUILD CONFIRMS DONE?" Should all of the confirms be done, a rebuild implicit routine is invoked, as described below, STEP 656 "INVOKE REBUILD IMPLICIT."

Figure 24:
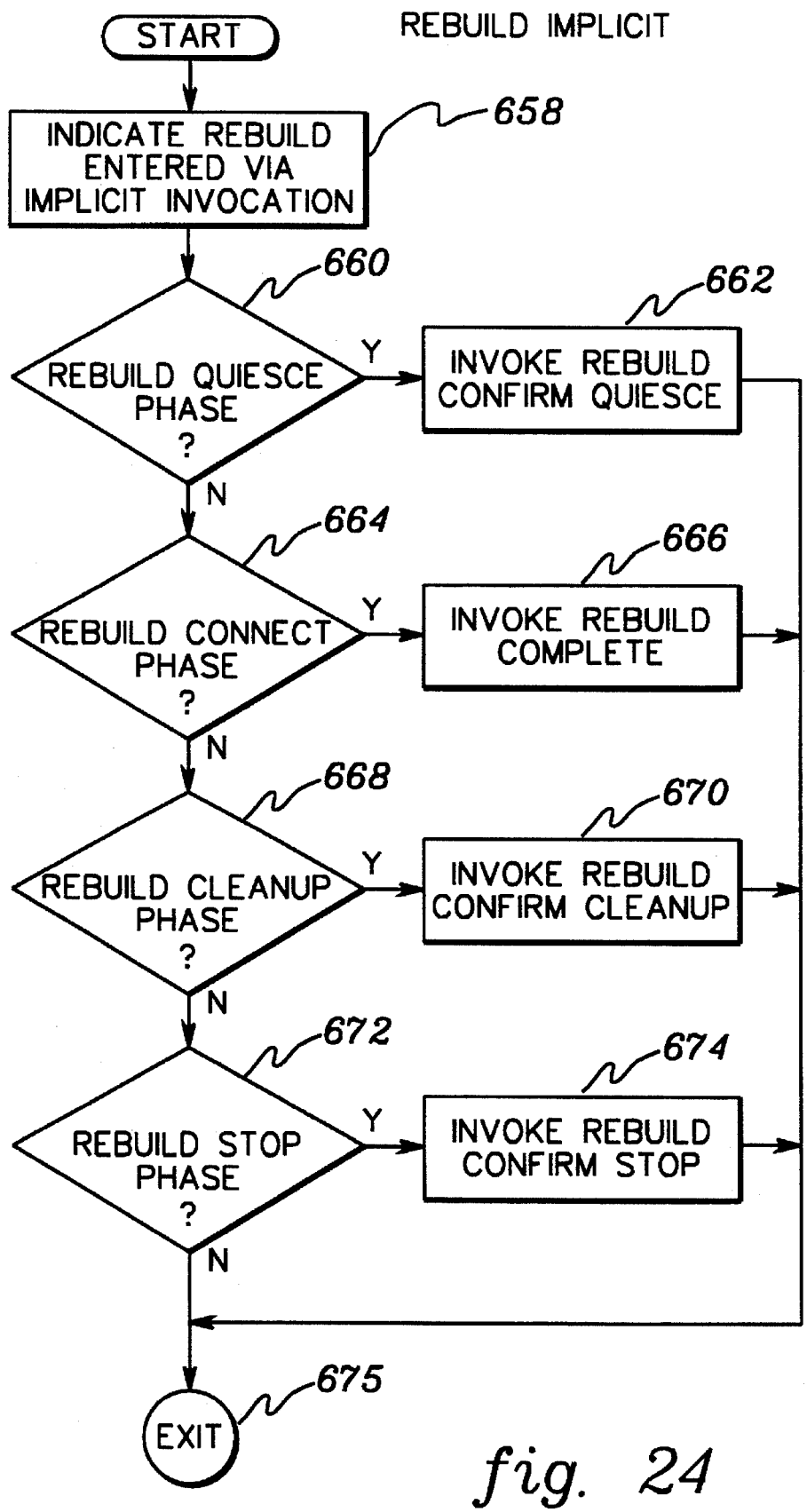
FIG. 24 depicts one embodiment of the logic associated with a rebuild implicit routine, in accordance with the principles of the present invention.

One embodiment of the logic associated with a rebuild implicit routine is described in detail with reference to FIG. 24. Initially, an indication is made that rebuild is entered via an implicit invocation, STEP 658 "INDICATE REBUILD ENTERED VIA IMPLICIT INVOCATION." In one example, this indication may be made in the rebuild parameter list or simply as the entry point to the rebuild module. Subsequently, a determination is made as to whether there is a rebuild quiesce phase, INQUIRY 660 "REBUILD QUIESCE PHASE?" Should there be a rebuild quiesce phase, then rebuild confirm quiesce is invoked, STEP 662. In particular, the rebuild service is invoked specifying confirm quiesce. Thereafter, processing of the rebuild implicit routine is complete.

If there is not a rebuild quiesce phase and there is a rebuild connect phase, INQUIRY 664 "REBUILD CONNECT PHASE?", then rebuild complete is invoked, STEP 666 "INVOKE REBUILD COMPLETE." In one example, this is accomplished by invoking the rebuild service and specifying rebuild complete.

If there is not a rebuild connect phase, but there is a rebuild cleanup phase, INQUIRY 668 "REBUILD CLEANUP PHASE?", then a rebuild confirm cleanup is invoked in a similar manner to rebuild complete, described above, STEP 670 "INVOKE REBUILD CONFIRM CLEANUP." On the other hand, if there is not a rebuild cleanup phase, then a determination is made as to whether there is a rebuild stop phase, INQUIRY 672 "REBUILD STOP PHASE?" Should there be a rebuild stop phase, then rebuild confirm stop is invoked and processing of the rebuild implicit routine is complete. On the other hand, if there is not a rebuild stop phase, then rebuild implicit ends, STEP 675 "EXIT."

Figure 33:
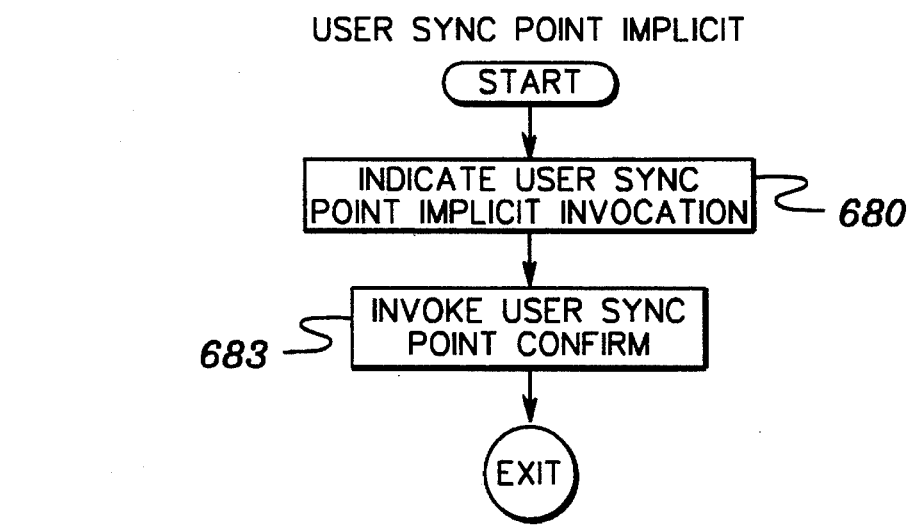
FIG. 33 depicts one embodiment of the logic associated with a user sync point implicit routine, in accordance with the principles of the present invention.

Returning to FIG. 23b and, in particular, STEP 656 "INVOKE REBUILD IMPLICIT," subsequent to invoking rebuild implicit, a determination is made as to whether all of the user sync confirms are done, INQUIRY 676 "ALL USER SYNC CONFIRMS DONE?" If they are done, a user sync implicit routine is invoked, STEP 678 "INVOKE USER SYNC IMPLICIT." One embodiment of the logic associated with a user sync implicit routine is described in detail with reference to FIG. 33.

Initially, an indication is made of the user sync point implicit invocation, STEP 680 and then the user sync point service indicating CONFIRM, which is described below, is invoked, STEP 683 "INVOKE USER SYNC POINT CONFIRM."

Returning to FIG. 23b and, in particular, STEP 678 "INVOKE USER SYNC IMPLICIT," after invoking user sync implicit, the active policy is written to the function data set, which is unlocked, STEP 690 "WRITE AND UNLOCK AP TO FUNCTION DATA SET."

After writing the active policy, the first record for which detach is needed, as indicated in the active policy, is selected, STEP 692, and a determination is made as to whether all needed detach processing is complete, INQUIRY 694 "ALL NEEDED DETACH PROCESSED?" If all of the detach processing is complete, the next structure user record is selected, STEP 696 "SELECT NEXT STRUCTURE USER RECORD" and if all of the structure user records are not processed, INQUIRY 698 "ALL STRUCTURE USER RECORDS PROCESSED?", flow returns to INQUIRY 694 "ALL NEEDED DETACH PROCESSED?"

However, if all of the user structure records are processed, INQUIRY 698, processing of the event exit response is complete.

Returning to INQUIRY 694, if all of the needed detach processing is not complete, the owned lock entries for a lock structure are released and global management is reassigned, STEP 700. Thereafter, a determination is made as to whether the termination is of a persistent user, INQUIRY 702 (FIG. 23c) "TERMINATING USER PERSISTENT?" If it is a persistent user, and termination is abnormal, INQUIRY 704 "NORMAL TERMINATION?" the detach user command is set up to keep the SSID, STEP 706 "SET UP DETACH USER COMMAND TO KEEP SSID." Further, the detach user command is processed to completion, STEP 708 "ISSUE DETACH USER COMMAND TO COMPLETION," as described above.

Subsequently, a determination is made as to whether rebuild is in progress, INQUIRY 710 "REBUILD IN PROGRESS?" If rebuild is in progress, then a further determination is made as to whether detach is needed because of the rebuild process, INQUIRY 712 "IS DETACH DUE TO REBUILD REQUIRED?" If detach is not needed or if rebuild is not in progress, flow passes to STEP 696 (FIG. 23b) "SELECT NEXT STRUCTURE USER RECORD," and processing continues as described above.

Returning to INQUIRY 712 (FIG. 23c) "IS DETACH DUE TO REBUILD REQUIRED?", if detach is needed then the owned lock table entries for a lock structure are released, STEP 714, and a determination is made as to whether the terminating user is persistent, INQUIRY 716 (FIG. 23d) "TERMINATING USER PERSISTENT?" If the terminating user is persistent and termination is abnormal, INQUIRY 718 "NORMAL TERMINATION?", the detach user command is set up to keep the SSID, STEP 720. Subsequently, the detach user command is processed to completion, STEP 722 "ISSUE DETACH USER COMMAND TO COMPLETION" and processing continues with STEP 696 (FIG. 23b) "SELECT NEXT STRUCTURE USER RECORD."

Returning to INQUIRY 716, "TERMINATING USER PERSISTENT?", if the terminating user is not persistent or termination is normal, INQUIRY 718 "NORMAL TERMINATION?", then the users record entries for a lock structure are deleted, the users lock entries for a serialized list structure are cleared and the detach user command to release the SSID is set up, STEPS 724, 726 and 728. Thereafter, the detach user command is processed to completion, STEP 722 and processing continues with STEP 696 (FIG. 23b) "SELECT NEXT STRUCTURE USER RECORD."

Returning to INQUIRY 702 (FIG. 23c) "TERMINATING USER PERSISTENT?", if the termination is not of a persistent user or there is normal termination, INQUIRY 704, the users record entries are deleted for a lock structure, STEP 730, users lock entries are cleared for a list structure, STEP 732, and the detach user command is set up to release the SSID, STEP 734. Thereafter, flow passes to STEP 708 "ISSUE DETACH USER COMMAND TO COMPLETION" and processing continues, as described above.

Returning to INQUIRY 630 (FIG. 23a) "ALL CONFIRMS DONE FOR THIS USER?", if all of the confirms are not done, flow passes to STEP 690 (FIG. 23b) "WRITE AND UNLOCK AP TO FUNCTION DATA SET," as described above.

As part of the structure rebuild process, described above, each user connected to the structure being rebuilt invokes a connect service (e.g., IXLCONN) with a REBUILD keyword. For instance, at STEP 320 of FIG. 19c, notification of rebuild connect is initiated and a rebuild event exit is presented to the connector's event exit. Thereafter, each connector issues IXLCONN REBUILD, described below, to allocate a new structure for rebuild. This special connect request does not define a new connection. A connect request with the REBUILD keyword, allocates a new structure for use in the rebuild process (if a peer connection has not already allocated a structure for rebuild). This special connect request assigns new resources to the original connection identified by the connection name specified as an input to the connect service.

The new structure allocated for rebuild is allocated in the first coupling facility in the preference list which meets the following requirements: the volatility requirements requested; has connectivity to the systems which have connections to their original structure; has available space greater than or equal to the requested structure size; does not contain a structure in the exclusion list (in one example, the exclusion list is located in the active policy and designates if coupling facility structures should occupy different coupling facilities, if possible); and has connectivity to the system trying to allocate the structure.

If there are pending policy changes that affect the structure being rebuilt, the pending policy is used for allocating the new structure. If no facilities in the preference list meet the above-defined requirements, then XES will first try to allocate the structure without the exclusion list requirement, then without the volatility requirement. If a facility is still not suitable, then the structure is allocated in the coupling facility with the most available space and still has full connectivity to the original connectors. If the structure is successfully allocated, the structure size may be smaller than the requested size. Finally, if the structure has not been allocated, XES tries to allocate the structure in a coupling facility that does not have full connectivity to the set of original connectors.

In one embodiment, an IXLCONN macro is the interface through which requests to connect to a new structure during the rebuild process is requested. An IXLCONN request to connect to a new structure during the rebuild process is specified through the REBUILD parameter, as described below. A requester of IXLCONN REBUILD must already be a connector to the structure which is the target of the rebuild, i.e., the connector must specify the same structure name and connection name as the original connection.

In one embodiment, the IXLCONN macro has the following syntax (some of the keywords for IXLCONN and other services described herein are designated as required, but may be optional in another embodiment):

```
IXLCONN STRNAME = xstrname
        [,STRSIZE = {xstrsize|0}]
        [,CONDATA = {xcondata|ALL ZEROES}]
        ,STRDISP = {KEEP|DELETE}
        ,CONDISP = KEEP
        ,CONNAME = xconname
        ,CONDISP = DELETE
        [,CONNAME = {xconname|GENERATED NAME}]
        [,NONVOLREQ = {NO|YES}]
        ,EVENTEXIT = xeventexit
        ,TYPE = CACHE
        [,ELEMCHAR = {xelemchar|0}]
        [,MAXELEMNUM = {xmaxelemnum|16}]
        [,DIRRATIO = {xdirratio|1}]
        [,ELEMENTRATIO = {xelementratio|1}]
        [,ADJUNCT = {NO|YES}]
        ,VECTORLEN = xvectorlen
        ,NUMCOCLASS = xnumcoclass
        ,NUMSTGCLASS = xnumstgclass
        ,TYPE = LIST
        [,ELEMCHAR = {xelemchar|0}]
        [,MAXELEMNUM = {xmaxelemnum|16}]]
        [,ENTRYRATIO = {xentryratio|1}]
        [,ELEMENTRATIO = {xelementratio|1}]
        [,ADJUNCT = {NO|YES}]
        [,LISTCNTRLTYPE = {ENTRY|ELEMENT}]
        [,REFOPTION = {NOKEYNAME|KEY|NAMEY}]
        [,VECTORLEN = {xvectorlen|0}
        [,LISTTRANEXIT = {xlisttranexit|0}]]
        ,LISTHEADERS = xlistheaders
        [,LOCKENTRIES = {xlockentries|0}
        ,NOTIFYEXIT = xnotifyexit]
        ,TYPE = LOCK
        [,RECORD = {NO|YES})
        ,LOCKENTRIES = xlockentries
        ,NUMUSERS = xnumusers
        ,CONTEXIT = xcontexit
        ,NOTIFYEXIT = xnotifyexit
        ,ALLOWREBLD{YES|NO}
        [REBUILD]
        ,ANSAREA = xansarea
        ,ANSLEN = xanslen
```

Where:

STRNAME(xstrname) is the name of a required 16 character input that specifies the structure name the user wishes to connect to. The logical structure name provides the ability to map the request to a physical facility. The name is defined in the active policy. In one example, the structure name must be 16 characters long, padded on the right with blanks if necessary.

[STRSIZE({xstrsize|0})] is the name of an optional fullword input that specifies the structure size. This size will be used to allocate the structure, if the size is smaller than the structure size defined in the active policy. If the size is not smaller than the policy size, the policy size will be used to allocate the structure.

Regardless of whether the connector specified size or the policy size is used, the structure may always be allocated using less than the requested space when there are limited facility resources available. The actual structure size is returned in the connect answer area.

When STRSIZE is 0 (default), the structure size in the active policy is used.

{CONDATA({xcondata|ALL_ZEROES})] is the name of an optional 8 character input that specifies connector data that is provided to this connection's exits and can be used as the invoker wishes. DEFAULT: ALL_ZEROES STRDISP({KEEP|DELETE}) is a required keyword input which defines an attribute of the structure to be allocated. The disposition of a structure defines whether the structure is persistent when there are no longer any defined connection (active or failed-persistent).

KEEP structure always remains allocated.

DELETE structure is deleted when there are no active or failed-persistent connections.

CONDISP ({KEEP|DELETE}) is a required keyword input which defines an attribute of the connection. The disposition of a connection defines whether the connection is persistent, if the connection abnormally terminates.

CONDISP(KEEP) connection is in a failed-persistent state after abnormal termination. There are several ways that a failed-persistent connection can be cleaned up: 1) via the IXLEERSP macro, described herein, after all serving connectors have cleaned up for the terminated connection, 2) by reconnecting as the terminated user (by specifying the same CONNAME on IXL-CONN), or 3) via an IXLFORCE macro, which can be invoked to force deletion of the failed-persistent connection. (IXLFORCE is described in, for example, co-pending commonly assigned U.S. patent application entitled "A METHOD AND SYSTEM FOR MANAGING ONE OR MORE COUPLING FACILITIES IN A DATA PROCESSING SYSTEM," by Allen et. al., Ser. No. 08/148,075 Filed Nov. 1, 1993, which is incorporated herein by reference in its entirety, as noted above.)

CONNAME(xconname) is the name of a required 16 character input that specifies a name by which the user wishes to be identified. The name must be unique within the scope of the given structure.

If the name provided matches the name of another active connection to the same structure, then the connect request is rejected. If the name provided matches the name of a connection in the failed-persistent state and all peer connections have acknowledged via a return code in the event exit parameter list (EEPL) or have issued IXLEERSP, then the connection is re-established (reconnected). Otherwise, the connection is rejected. On a reconnection, a new CONTOKEN is returned to the user in the answer area. For all supported exits, the CONNAME for the subject of the event is presented.

CONDISP(DELETE) connection is not defined after abnormal termination.

[CONNAME({xconname|GENERATED_NAME})] is the name of an optional 16 character input that specifies a name by which the user wishes to be identified. The name must be unique within the scope of a given structure.

If the CONNAME keyword is not specified, then a unique name is generated and returned to the user in the answer area. The attributes and characteristics of CONNAME are described above.

NONVOLREQ({NO|YES})] is an optional keyword input which indicates whether the structure requires that the coupling facility be non-volatile. DEFAULT: NO.

NO The structure may be allocated in any facility regardless of the volatility attribute of the facility.

YES The structure should be allocated in a facility that is non-volatile. The user must check the CONAVOLA- TILE flag in the connect answer area to determine whether the non-volatility requirement was honored.

EVENTEXIT(xeventexit) is a required input. It is the name of the user's event exit. The user's event exit will receive control in SRB mode, enable and unlocked.

TYPE ({CACHE|LIST|LOCK}) is a required keyword input which defines the structure type for the structure to which the user is connecting to.

TYPE(CACHE) specifies a cache structure.

[ELEMCHAR({xelemchar|0})] is the name of an optional byte input that specifies the element characteristic. The element characteristic defines the element size. The element size is specified as the power of two in the following formula:

$$256 * (2^{**} ELEMCHAR).$$

For example: If ELEMCHAR=0, then each data element will be 256 bytes.

The data written to and read from the structure is called a data entry. A data entry can be up to 16 times the data element size.

MAXELEMNUM({xmaxelemnum|16})] is the name of an optional byte input that specifies the maximum number of data elements per data entry. MAXELEMNUM must be in the range of 1 and 16 decimal. The value specified for MAXELEMNUM must be greater than or equal to the ELEMENTRATIO divided by DIRRATIO. This restriction ensures that all possible data elements allocated in a structure can be assigned to directory entries. MAXELEMNUM is ignored if ELEMENTRATIO is zero. DEFAULT: 16

DIRRATIO({xdirratio|1})] is the name of an optional byte input that contains the directory part of the directory-to-element ratio. DIRRATIO must be greater than zero. DEFAULT: 1

ELEMENTRATIO ({xelementratio|1})] is the name of an optional byte input that contains the element part of the directory-to-element ratio.

If the element portion of the directory-to-element ratio is zero, then the cache structure is allocated without data elements. DEFAULT: 1

(ADJUNCT({NO|YES})] is an optional keyword input which indicates whether an adjunct entry for each cache entry is needed. Each adjunct entry is 64 bytes. DEFAULT: NO
    NO Specifies no adjunct entries should be allocated.
    YES Specifies adjunct entries should be allocated.

VECTORLEN(xvectorlen) is the name of a required fullword input that contains the number of local buffers in the user's local cache which require concurrent registration. The value of this field is used to allocate resources which map the local buffers in the user's cache to the named entries in the cache structure.

NUMCOCLASS(xnumcoclass) is the name of a required fullword input that contains the number of cast-out classes.

NUMSTGCLASS(xnumstgclass) is the name of a required fullword input that contains the number of storage classes.

TYPE(LIST) specifies a list structure.

ELEMCHAR({xelemchar|0})] is the name of an optional byte input that specifies the element characteristic, and is described above.

[MAXELEMNUM({xmaxelemnum|16})]] is the name of an optional byte input that specifies the maximum number of data elements per data entry, and is described above.

[ENTRYRATIO({xentryratio|1})] is the name of an optional byte input that contains the entry part of the entry-to-element ratio. DEFAULT: 1

[ELEMENTRATIO ({xelementratio|1})] is the name of an optional byte input that contains the element part of the entry-to-element ratio.

If the element portion of the entry-to-element ratio is zero, then the entry-to-element ratio is IGNORED. The list structure is allocated without data elements. DEFAULT: 1

[ADJUNCT({NO|YES})] is an optional keyword input which indicates whether an adjunct entry for each list entry is needed, and is described above.

[LISTCNTLTYPE=({ENTRY|ELEMENT})] is an optional keyword input which specifies whether list limits should be specified and tracked as data entries or elements. DEFAULT: ENTRY
    ENTRY specifies that the list limits are specified and tracked as limits on data entries.
    ELEMENT specifies that the list limits are specified and tracked as limits on data elements.

[REFOPTION({NOKEYNAME|KEY|NAME})] is an optional keyword input which indicates how the list entry will be referenced. The list entry can be referenced by the LEID in list entry control block 102 or the unkeyed position. The following optional reference options allow the list entry to also be referenced either by KEY or NAME. DEFAULT: NOKEYNAME
    NOKEYNAME indicates no additional reference options are requested.
    KEY indicates key support is requested. Key support allows the user to provide a 16 byte key when creating an entry. Key support is used to keep the list entry in sequence by key.
    NAME indicates name support is requested. Name support allows the user of the list structure to associate a unique 16-byte name with each list entry. This name can be used by direct reference entry by name.

[VECTORLEN({xvectorlen|0}) is the name of an optional fullword input that contains the number of list headers this connection will be monitoring for list transitions. DEFAULT: 0

[LISTTRANEXIT({xlisttranexit|0})]] is an optional input. It is the name of the connected XES-list user's list transition exit. DEFAULT: 0

LISTHEADERS(xlistheaders) is the name of a required fullword input that contains the number of list headers to be allocated for the list structure. The number of list headers must be greater than zero.

[LOCKENTRIES({xlockentries|0}) is the name of an optional fullword input that contains the number of lock entries to be allocated. The number of lock entries will be rounded upward to a power of 2, if it is not already. If this keyword is not specified, then the list structure will not be allocated with serialization support. DEFAULT: 0

NOTIFYEXIT(xnotifyexit)] is a required input. It is the name of the connected XES-list user's notify exit.

TYPE(LOCK) specifies a lock structure.

[RECORD({NO|YES})] is an optional keyword input which indicates whether recording is desired. DEFAULT: NO
    NO Specifies no recording.
    YES Specifies recording.

LOCKENTRIES(xlockentries) is the name of a required fullword input that contains the number of lock entries to be allocated for the lock structure. The number of lock entries will be rounded upward to a power of 2, if it is not already.

NUMUSERS(xnumusers) is the name of a required byte input that contains the maximum number of users that may connect and use the lock structure. When REBUILD is specified, the value for NUMUSERS cannot be smaller than the number of users supported in the old structure.

CONTEXIT(xcontexit) is a required input. It is the name of the connected XES-locking user's contention exit.

NOTIFYEXIT(xnotifyexit) is a required input. It is the name of the connected XES-locking user's notify exit.

ALLOWREBLD ({YES|NO})] is an optional keyword input which indicates whether structure rebuild can be initiated against this structure.

Structure rebuild causes connectors to a structure to allocate another structure with the same name and rebuild data (if applicable) into the new structure. This procedure can be used, for instance, to change the location and/or attributes of the structure. Structure rebuild is also intended for planned reconfiguration and recovery scenarios. DEFAULT: YES YES Structure rebuild is supported for this structure.

NO Structure rebuild is not supported for this structure. If an application chooses not to support structure rebuild, then the application provides its own interfaces for planned reconfiguration either through normal shut down procedures or through a command interface. These procedures provide the operator with the ability to stop an application's use of a structure in a coupling facility.

[REBUILD] is an optional keyword which indicates that this connector is already connected to this structure but is now issuing IXLCONN as part of the rebuild process (rebuild is initiated via IXLREBLD, described above).

If the structure is not already in rebuild, then the connect request will be rejected.

If the new structure for rebuild has not yet been allocated, then IXLCONN will allocate a new structure with the same name and use the attributes specified on connect. This connection will be connected to the new structure allocated for rebuild.

The IXLCONN REBUILD request is issued from the same address space and same system as the original IXLCONN which connected this user to the structure. The IXLCONN REBUILD request can be used from a task other than the connecting task.

The first connector to issue IXLCONN REBUILD will define the attributes of the new structure. The attributes of the new structure will be determined from the attributes specified on IXLCONN and attributes defined by a pending policy change.

The following keywords will be ignored when REBUILD is specified: CONDISP, STRDISP, CONDATA, ALLOWREBLD, EVENTEXIT, CONTEXIT, NOTIFYEXIT, and LISTTRANEXIT. Note that some of these keywords are required in this embodiment, and therefore, are still specified when REBUILD is specified. DEFAULT: NO DEFAULT ANSAREA(xansarea) is a required input. It is the name of the answer area to contain the data being returned by the IXLCONN service routine. The answer area must begin on a double word boundary.

ANSLEN(xanslen) is the name of a required fullword input that contains the length of the ANSAREA.

One embodiment of the logic associated with a connection service, such as IXLCONN, is described in detail with reference to FIGS. 25a–25d. When invoking the IXLCONN service, the connected XES user identifies the coupling facility structure that it wishes to access. This is accomplished by specifying the coupling facility structure name (STRNAME). Further, if rebuild of a structure or connection is needed, this is specified on IXLCONN by the keyword REBUILD, as described above.

Figure 25A:
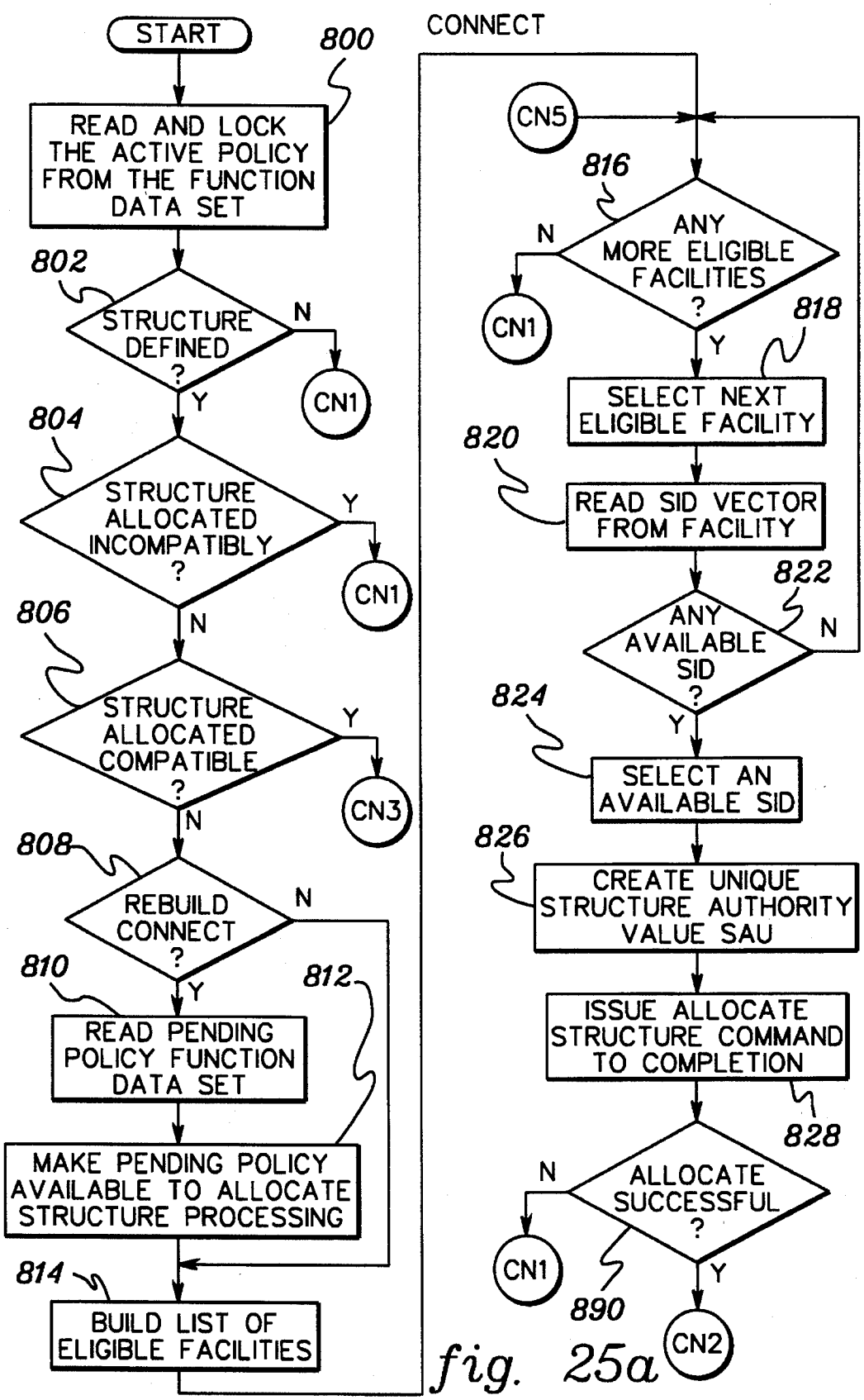
FIGS. 25a–25d depict one embodiment of the logic associated with a connect service, in accordance with the principles of the present invention.
Figure 25B:
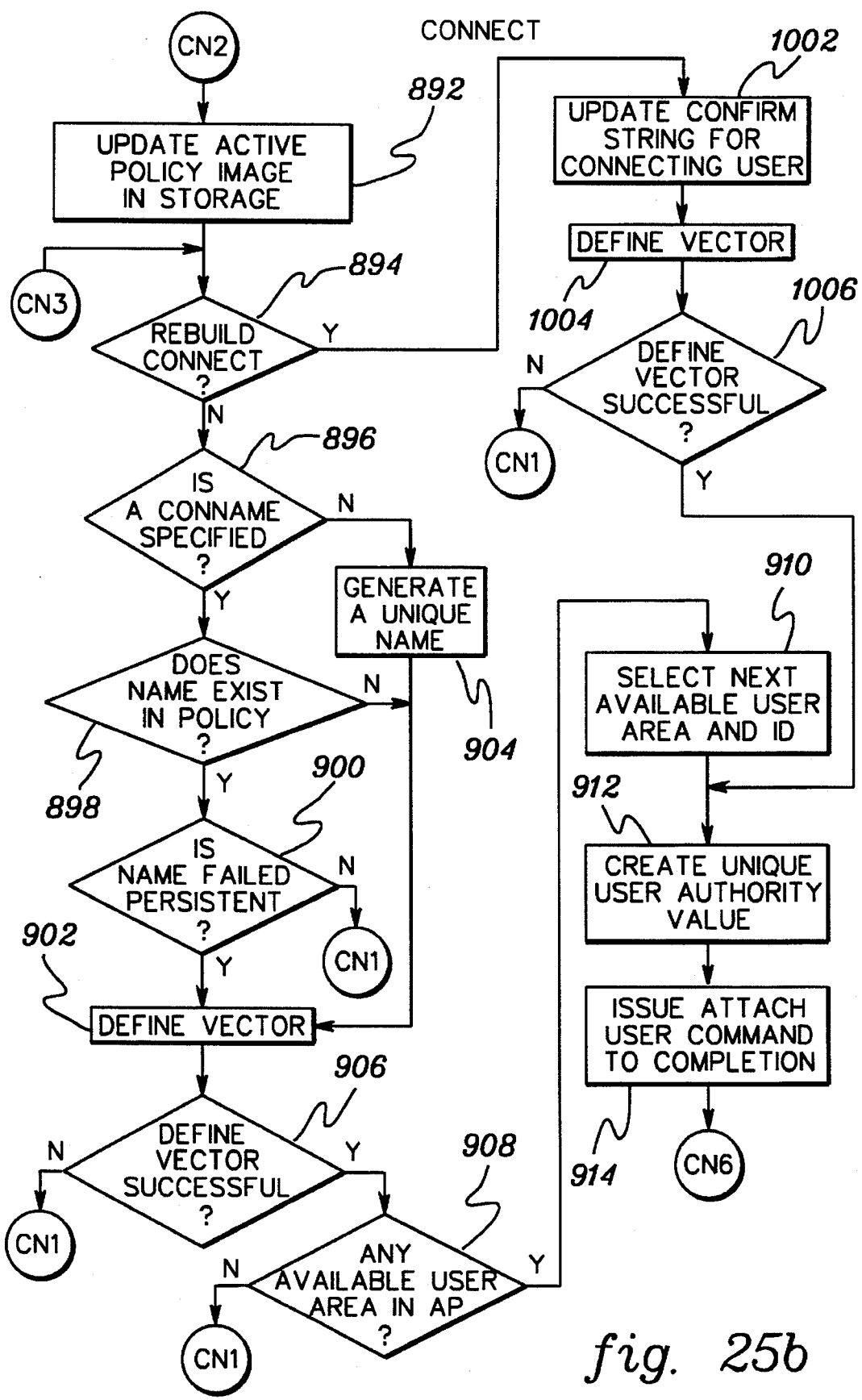

Referring to FIG. 25a, initially, the active policy on the function data set is read and locked, STEP 800 "READ AND LOCK THE ACTIVE POLICY FROM THE FUNCTION DATA SET." Subsequently, a determination is made as to whether the structure name specified on the connect service is defined, INQUIRY 802 "STRUCTURE DEFINED?" In particular, the presence of a structure record in the active policy is checked. Should the structure be defined, a check is made to see if it is allocated incompatibly, INQUIRY 804 "STRUCTURE ALLOCATED INCOMPATIBLY?" This is determined, for instance, by checking the information in the structure controls in the coupling facility.

If a structure is not allocated incompatibly and is not allocated compatibly (i.e., the structure is not allocated), INQUIRY 806 "STRUCTURE ALLOCATED COMPATIBLE?", a determination is made as to whether this is a rebuild connection, INQUIRY 808 "REBUILD CONNECT?" If this is a rebuild connection, then the pending policy is read from the function data set, STEP 810 "READ PENDING POLICY FROM FUNCTION DATA SET," and the pending policy is made available to the allocate structure processing, STEP 812. In particular, pending policy changes, if any, are used in building the list of eligible facilities, as described in the next step.

Subsequent to making the pending policy available or if this is not a rebuild connection, INQUIRY 808, then a list of eligible facilities are built, STEP 814 "BUILD LIST OF ELIGIBLE FACILITIES." In particular, a preference list in structure record 144 of the active policy is utilized to determine which coupling facilities are candidates for the structure. From those facilities, the eligible facilities are selected. Each eligible facility has connectivity to the system trying to allocate the structure; meets the volatility requirement requested by the connector; and has available space greater than or equal to the requested structure size or, if no facility in the policy list has free space greater than or equal to the requested structure size, the facility with the largest amount of free space is chosen.

Subsequent to building the list of eligible facilities, it is ascertained as to whether there are any more eligible facilities, INQUIRY 816 "ANY MORE ELIGIBLE FACILITIES?" If so, the next eligible facility is selected, STEP 818 "SELECT NEXT ELIGIBLE FACILITY." After selecting the next eligible facility, the SID vector is read from global controls 67, STEP 820 "READ SID VECTOR FROM FACILITY."

From the SID vector, a determination is made as to whether any available SID exists in the vector, INQUIRY 822 "ANY AVAILABLE SID?" Should an available SID not exist, flow passes to INQUIRY 816 "ANY MORE ELIGIBLE FACILITIES?" However, should an available SID exist, it is selected, STEP 824 "SELECT AN AVAILABLE SID," and a unique structure authority value (SAU) is created (as described above with reference to FIG. 4), STEP 826 "CREATE UNIQUE STRUCTURE AUTHORITY VALUE SAU." Thereafter, an allocate structure command, described below, is issued to completion, STEP 828 "ISSUE ALLOCATE STRUCTURE COMMAND TO COMPLETION?"

One embodiment of the logic associated with an allocate-cache-structure command is described in detail with reference to FIGS. 26a–26b. As described in detail herein, an allocate-cache-structure command updates the user structure control and (1) creates a cache structure or (2) continues or completes initial allocation of a cache structure. A cache structure is created on the first successful invocation of the allocate-cache-structure command for a structure that does not already exist. A cache structure is initially allocated after one or more successful invocations of the allocate-cache-structure command. These operations are referred to generically as cache-allocation processes.

Initially, a determination is made as to whether the value of the created bit in the structure identifier vector associated with the SID value is equal to zero, INQUIRY 830 "IS CREATED BIT OF SID= 0?" If the value of the created bit associated with the SID is equal to zero, indicating a cache structure has not been created, then another determination is made as to whether the comparative structure authority (CSAU) request operand is equal to zero, INQUIRY 832 "DOES CSAU=0?" When the CSAU is not equal to zero, the structure authority value of zero in request/response operands (FIG. 13) and an error code are returned, STEP 834 "RETURN AND INDICATE ERROR."

Otherwise, if the CSAU is equal to zero, then the amount of storage is checked, INQUIRY 836 "SUFFICIENT STORAGE?" In particular, the free space and free control space objects in the global controls are checked. Should there be insufficient storage, an indication as such is returned, STEP 838 "RETURN AND INDICATE INSUFFICIENT STORAGE."

Should there be sufficient storage and therefore, a cache structure is created, global controls 67 and cache structure controls 69 are updated, STEPS 840, 842. In particular, when the cache structure is created, the created bit in the structure-identifier vector associated with the SID value is set to one and the free-space and free-control-space global objects are updated. In addition, the LCID vector of cache structure controls 69 is initialized to zero; the SAU operand of the request/response operands is placed in the structure authority object of cache structure controls; and the USC operand of the request/response operands is placed in the user-structure control.

Thereafter, there is an indication of whether a model-dependent time-out has occurred, INQUIRY 844 "MODEL-DEPENDENT TIME-OUT?" When a model-dependent time period has elapsed before the allocation processes are completed, the processes are checkpointed, STEP 846 "SET ALLOCATION CHECKPOINT." In particular, the structure size, cache structure controls 69, the free-space and free-control-space global objects are updated. Subsequently, the structure state control (not shown) in the structure controls is set as allocation incomplete, STEP 848 "SET STRUCTURE STATE ALLOCATION INCOMPLETE," and cache structure information and an exception response code are returned, STEP 850 "RETURN AND INDICATE NOT DONE."

Returning to INQUIRY 844, when a model-dependent time-out has not occurred, a determination is made as to whether the allocation process is complete, INQUIRY 852 "ALLOCATION COMPLETE?" In particular, the structure state control is checked and, if it is equal to one, allocation is complete and, if equal to zero, allocation is incomplete. Should allocation be complete, a successful response code is returned, indicating all requested cache-allocation processes are complete, STEP 854 "RETURN AND INDICATE COMPLETION."

Otherwise, when a cache structure is created but not completely allocated, all cache-structure commands issued to the structure except for the allocate-cache-structure, deallocate-cache-structure, and read-cache-structure-information commands are suppressed or terminated with an initial-allocation-incomplete status condition. Further, control and data areas are created, STEP 856 "CREATE CONTROL AND DATA AREAS." In particular, a directory and data areas are created. Thereafter, flow passes to INQUIRY 844 "MODEL-DEPENDENT TIME-OUT?"

Returning to INQUIRY 830, if the created bit of SID is not equal to zero, signifying a structure is created, a structure authority comparison is made, INQUIRY 858 (FIG. 26b) "DOES STRUCTURE AUTHORITY= CSAU?" Should the value of SAU in cache structure controls 69 not be equal to the value of CSAU, the value of the structure authority in the request/response operands and an error code are returned, STEP 860 "RETURN AND INDICATED ERROR." Otherwise, a determination is made as to whether there is a user control update request, as specified as an input to the allocation command, INQUIRY 862 "USER CNTL UPDATE REQUEST?"

Should there be such a request, the user structure control in cache-structure controls 69 is updated, STEP 864 "UPDATE USER STRUCTURE CNTLS." Subsequent to updating the user structure controls or if there is no user control update request, a determination is made as to whether a model-dependent time-out has occurred, INQUIRY 866 "MODEL-DEPENDENT TIME-OUT?"

If a time-out has not occurred, then it is ascertained as to whether the allocation process is complete, INQUIRY 868 "ALLOCATION COMPLETE?" If allocation is incomplete, control and data areas are created, STEP 870 "CREATE CONTROL AND DATA AREAS," as described above, and flow passes to INQUIRY 866 "MODEL-DEPENDENT TIME-OUT?" in order to complete the initial allocation of the cache structure. On the other hand, when allocation is complete, the allocation incomplete state is reset indicating allocation complete, STEP 872 "RESET ALLOCATION INCOMPLETE STATE." The allocation complete indication is then returned, STEP 874 "RETURN AND INDICATE COMPLETION."

Returning to INQUIRY 866, if a time-out has occurred, the allocation checkpoint is set, STEP 876 "SET ALLOCATION CHECKPOINT" and cache structure information and a response code are returned indicating allocation incomplete, STEP 878 "RETURN AND INDICATE NOT-DONE."

After initial allocation is completed, an allocate-cache-structure command is always checkpointed when a successful or incomplete response code is returned. Also, after initial allocation is completed, an allocation process may be checkpointed anytime during the execution of a successful allocate-cache-structure command or when background processing continues as a result of a successful allocate-cache-structure command. Background processing of a successful allocate-structure command stops when a successful response code is returned. As described above, when a cache-allocation process is checkpointed, the structure controls and global controls are updated.

In one embodiment, in order to allocate a list structure, the logic associated with FIGS. 26a–26b may be used, as described in detail below. The allocate-list-structure command updates the user structure control and (1) creates a list structure or (2) continues or completes initial allocation of a list structure. A list structure is created on the first successful invocation of the allocate-list-structure command for a structure that does not already exist.

Figure 26A:
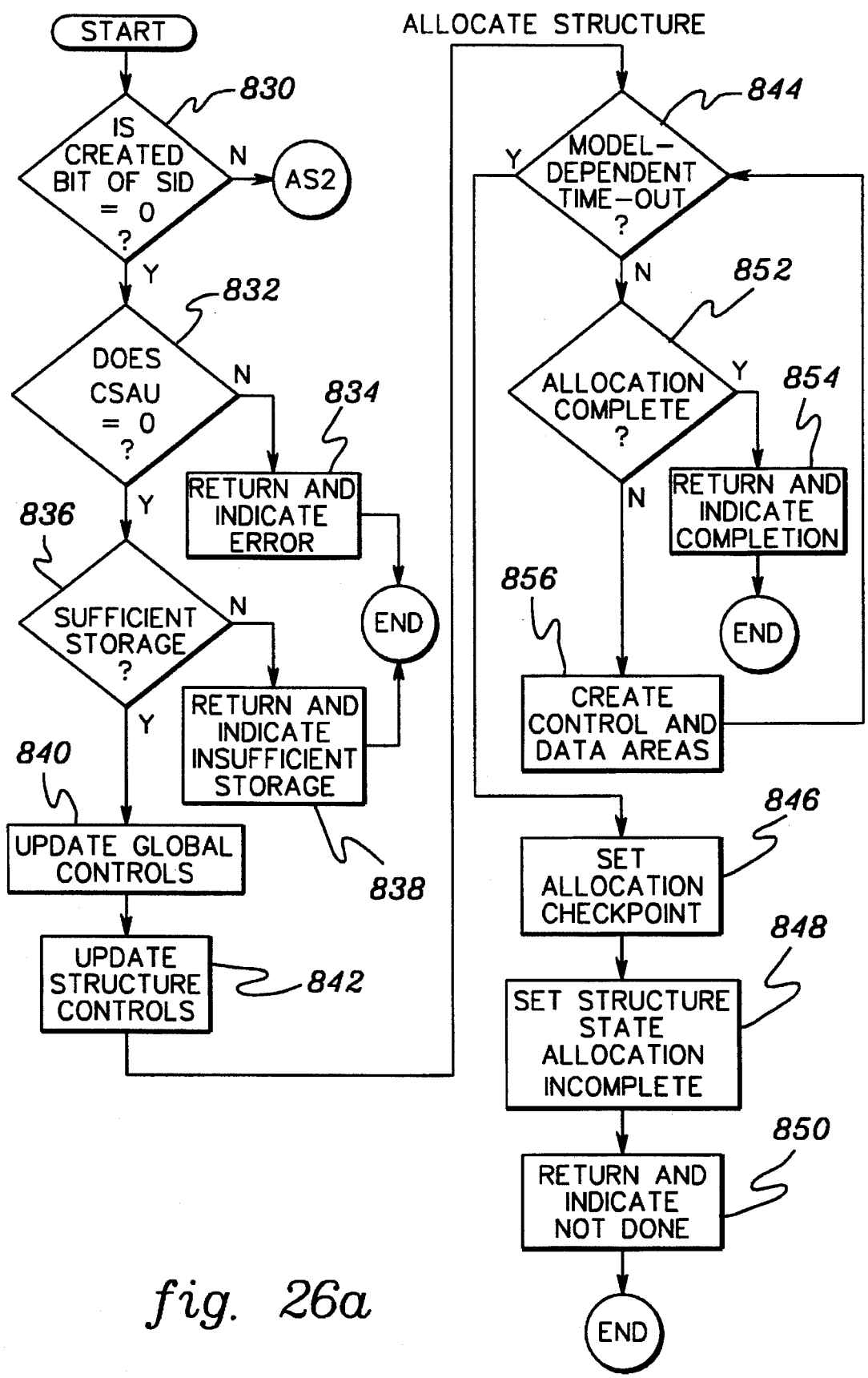
FIGS. 26a–26b depict one embodiment of the logic associated with an allocate structure command, in accordance with the principles of the present invention.
Figure 26B:
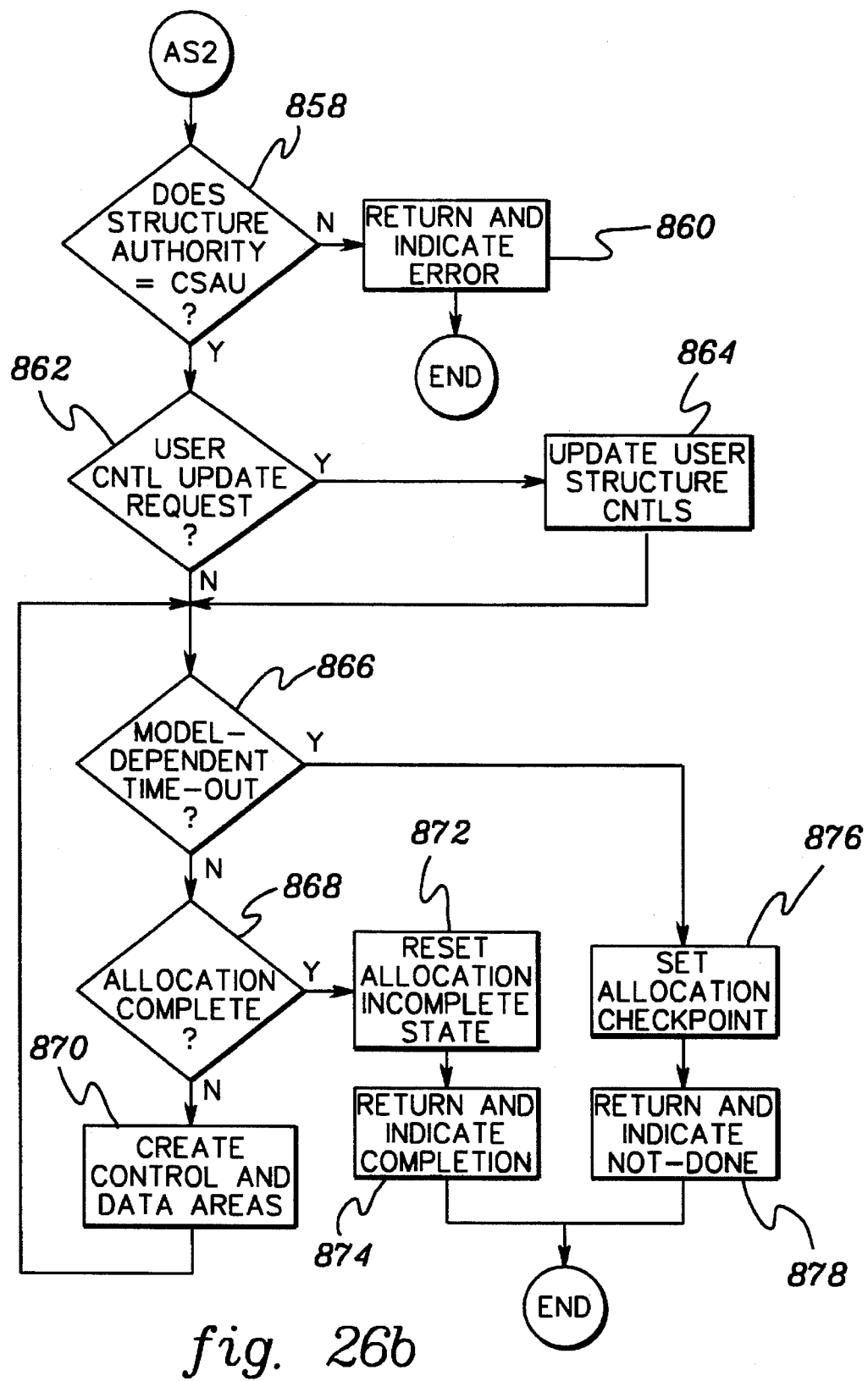

Referring to FIG. 26a, initially, a determination is made as to whether the value of the created bit in the structure identifier vector associated with the SID value is equal to zero, INQUIRY 830 "IS CREATED BIT OF SID=0?" If the value of the created bit associated with the SID is equal to zero, indicating a list structure has not been created, then another determination is made as to whether the comparative structure authority (CSAU) in request/response operands is equal to zero, INQUIRY 832 "DOES CSAU=0?" When the comparative structure authority is not equal to zero, the structure authority value of zero in request/response operands (FIG. 13) and an error code are returned, STEP 834 "RETURN AND INDICATE ERROR."

Otherwise, if the comparative structure authority is equal to zero, then the amount of storage is checked, INQUIRY 836 "SUFFICIENT STORAGE?" Should there be insufficient storage, an indication as such is returned, STEP 838 "RETURN AND INDICATE INSUFFICIENT STORAGE."

Should there be sufficient storage and therefore, a list structure is created, global controls 67 and list structure controls 92 are updated, STEPS 840, 842. In particular, when the list structure is created, the created bit in the structure-identifier vector associated with the SID value is set to one and the free-space and free-control-space global objects are updated. In addition, the UID vector of list structure controls 92 is initialized to zero; the SAU operand of request/response operands is placed in the structure authority object of list structure controls; and the USC operand of the request/response operands is placed in the user-structure control.

Thereafter, there is an indication of whether a model-dependent time-out has occurred, INQUIRY 844 "MODEL-DEPENDENT TIME-OUT?" When a model-dependent time period has elapsed before the allocation processes are completed, the processes are checkpointed, STEP 846 "SET ALLOCATION CHECKPOINT." In particular, the structure size, list structure controls 92, the free-space and free-control-space global objects are updated. Subsequently, the structure state control (not shown) in the structure controls is set as allocation incomplete, STEP 848 "SET STRUCTURE STATE ALLOCATION INCOMPLETE," and list structure information and an exception response code are returned, STEP 850 "RETURN AND INDICATE NOT DONE."

Returning to INQUIRY 844, when a model-dependent time-out has not occurred, a determination is made as to whether the allocation process is complete, as described below, INQUIRY 852 "ALLOCATION COMPLETE?" Should allocation be complete, a successful response code is returned, indicating all requested list-allocation processes are complete, STEP 854 "RETURN AND INDICATE COMPLETION."

Otherwise, when a list structure is created but not completely allocated, all list-structure commands issued to the structure except for the allocate-list-structure, deallocate-list-structure, and read-list-structure-information commands are suppressed or terminated with an initial-allocation-incomplete status condition. Further, control and data areas are created, STEP 856 "CREATE CONTROL AND DATA AREAS." In particular, list controls, list entry controls, data list elements and the lock table are created. Thereafter, flow passes to INQUIRY 844 "MODEL-DEPENDENT TIME-OUT?"

Returning to INQUIRY 830, if the created bit of SID is not equal to zero, signifying a structure is created, a structure authority comparison is made, INQUIRY 858 (FIG. 26b) "DOES STRUCTURE AUTHORITY= CSAU?" Should the value of SAU in list structure controls 69 not be equal to the value of CSAU, the value of the structure authority in the request/response operands and an error code are returned, STEP 860 "RETURN AND INDICATE ERROR." Otherwise, a determination is made as to whether there is a user control update request, as specified as an input to the allocation command, INQUIRY 862 "USER CNTL UPDATE REQUEST?"

Should there be such a request, the user structure control in list-structure controls 92 is updated, STEP 864 "UPDATE USER STRUCTURE CNTLS." Subsequent to updating the user structure controls or if there is no user control update request, a determination is made as to whether a model-dependent time-out has occurred, INQUIRY 866 "MODEL-DEPENDENT TIME-OUT?"

If a time-out has not occurred, then it is ascertained as to whether the allocation process is complete, INQUIRY 868 "ALLOCATION COMPLETE?" If allocation is incomplete, control and data areas are created, STEP 870 "CREATE CONTROL AND DATA AREAS," as described above, and flow passes to INQUIRY 866 "MODEL-DEPENDENT TIME-OUT?" in order to complete the initial allocation of the list structure. On the other hand, when allocation is complete, the allocation incomplete state is reset, indicating allocation complete, STEP 872 "RESET ALLOCATION INCOMPLETE STATE." The allocation complete indication is then returned, STEP 874 "RETURN AND INDICATE COMPLETION."

Returning to INQUIRY 866, if a time-out has occurred, the allocation checkpoint is set, STEP 876 "SET ALLOCATION CHECKPOINT" and list structure information and a response code are returned, indicating allocation incomplete, STEP 878 "RETURN AND INDICATE NOT-DONE."

After initial allocation is complete, an allocate-list-structure command is always checkpointed when a successful response code is returned. Also, after initial allocation is complete, an allocation process may be checkpointed any time during the execution of a successful allocate-list-structure command or when background processing continues as a result of a successful allocate-list-structure command. Background processing of a successful allocate-list-structure command stops when a successful response code is returned. When a list-allocation process is checkpointed, the structure size, list-structure objects, the free-space and free control-space global objects are updated.

Returning to FIG. 25a, and in particular, STEP 828 "ISSUE ALLOCATE STRUCTURE COMMAND TO COMPLETION," once the command completes and it is successful, INQUIRY 890 "ALLOCATE SUCCESSFUL?", the active policy image in virtual storage is updated in order to indicate the successful allocation of a structure, STEP 892 (FIG. 25b) "UPDATE ACTIVE POLICY IMAGE IN STORAGE."

Subsequently, a determination is made as to whether this is a rebuild connection, INQUIRY 894 "REBUILD CONNECT?" Should this not be a rebuild connection, a determination is made as to whether a CONNAME is specified as an input on IXLCONN, INQUIRY 896 "IS A CONNAME SPECIFIED?" Should a CONNAME be specified, a further determination is made to ascertain whether the name exists in the active policy, INQUIRY 898 "DOES NAME EXIST IN POLICY?" If the name exists, it is checked to see if it is failed-persistent, INQUIRY 900 "IS NAME FAILED-PERSISTENT?"

When the name is indicated as failed-persistent, or if the name does not exist in the policy, INQUIRY 898, a vector is defined at the central processing complex where the connector is executing, STEP 902 "DEFINE VECTOR." In particular, a local bit vector is defined for a cache for cache coherency and for a list, a list notification vector is defined for state transitions. In addition to the above, if a CON-NAME is not specified, INQUIRY 896, a unique name is generated, STEP 904, and flow passes to STEP 902 "DEFINE VECTOR."

Should the vector definition be successful, INQUIRY 906 "DEFINE VECTOR SUCCESSFUL?", a further check is made to determine whether there is any available space in the active policy to record user information, INQUIRY 908 "ANY AVAILABLE USER AREA IN AP?"

If there is an available user area (i.e., an unused area for a new connection or reuse of existing area for a re-connect), it is selected along with the next available user id (for a reconnect, the same user id is used), STEP 910 "SELECT NEXT AVAILABLE USER AREA AND ID." Thereafter, a unique user authority request operand is created and an attach user command, described below, is processed to completion, STEPS 912, 914.

In one embodiment, the logic associated with one example of an attach user command is described in detail with reference to FIG. 27. The attach user command is used to attach a user to a structure, such as a list, cache or lock structure. An example of attaching a list user to a structure is described in detail below.

Figure 27:
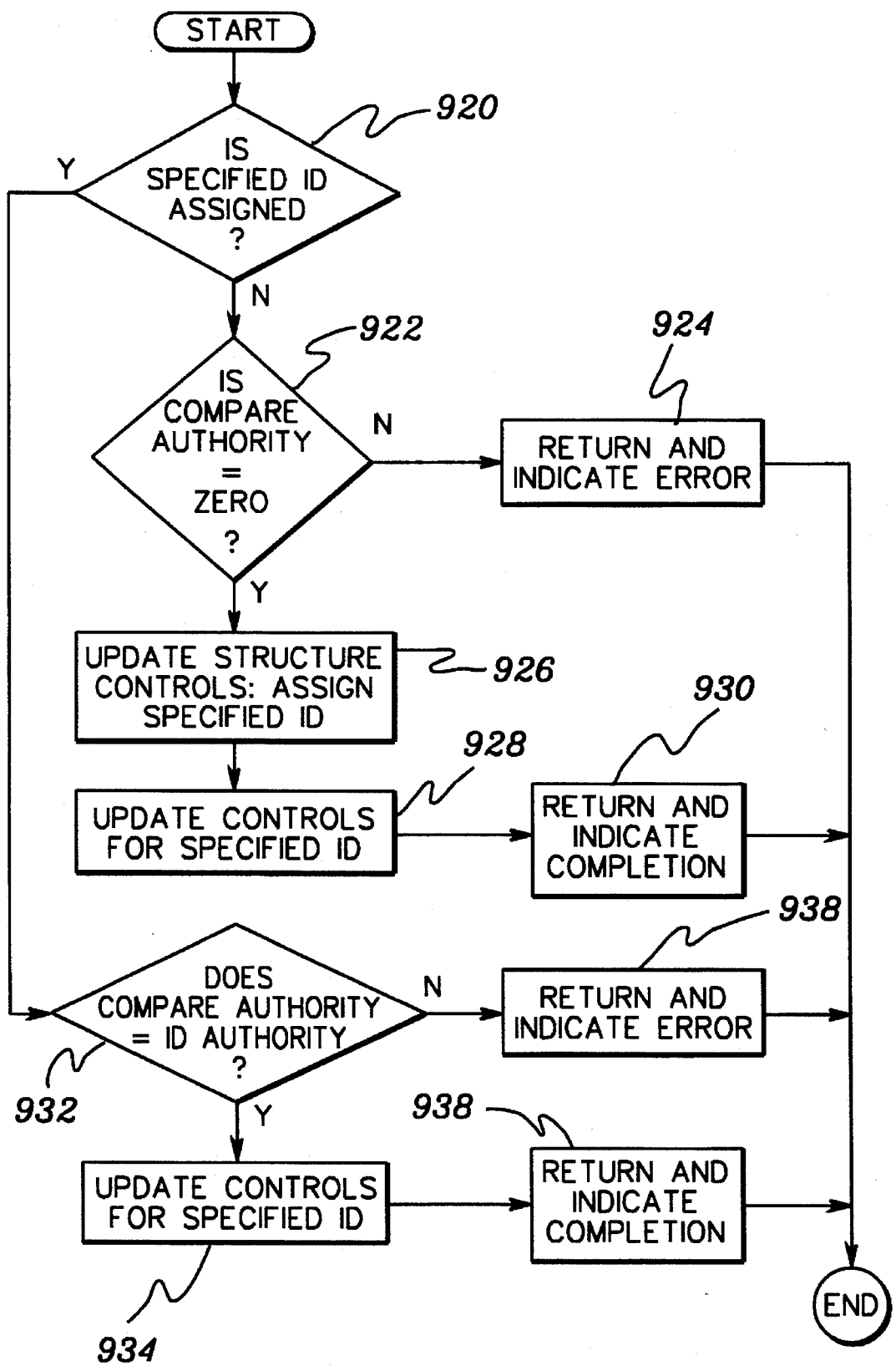
FIG. 27 depicts one embodiment of the logic associated with an attach processing command, in accordance with the principles of the present invention.

Referring to FIG. 27, initially, an inquiry is made as to whether or not the user is already attached to the structure. In particular, a determination is made as to whether the specified user identifier (FIG. 9) is assigned, INQUIRY 920 "IS SPECIFIED ID ASSIGNED?" When the user identifier is not assigned, the comparative user authority value (CUAU) in request/response operands (FIG. 13) is compared to zero, INQUIRY 922 "IS COMPARE AUTHORITY=ZERO?" If the comparative user authority is not zero, the user authority value and the user-attachment control response operands (FIG. 13) are returned, along with an error indication, STEP 924 "RETURN AND INDICATE ERROR.

On the other hand, when the user authority comparison is successful, the structure controls (i.e., list structure controls 92) are updated, STEP 926 "UPDATE STRUCTURE CONTROLS: ASSIGN SPECIFIED ID." In particular, controls, such as the appropriate assigned bit in the user-identifier vector of list-structure controls 92 is set to one, and in list-user control block 94, the user state is set to active, the detachment restart token is set to zero and the user authority and user-attachment controls are updated, STEP 928 "UPDATE CONTROLS FOR SPECIFIED ID." Subsequently, a successful response code indicating completion is returned, STEP 930 "RETURN AND INDICATE COMPLETION." Thereafter, processing of the attach command ends.

Returning to INQUIRY 920 "IS SPECIFIED ID ASSIGNED?", if the user identifier is assigned, then flow passes to INQUIRY 932 "DOES COMPARE AUTHORITY= ID AUTHORITY?" When comparative user authority (FIG. 13) is equal to the user authority (FIG. 9), the user state is set active, and the user authority and user-attachment control objects (FIG. 9) are replaced by the user authority and user-attachment control request operands (FIG. 13), STEP 934 "UPDATE CONTROLS FOR SPECIFIED ID." Thereafter, a successful return code indicating completion is returned, STEP 936, and processing ends.

However, if the user authority comparison fails, INQUIRY 932, the user authority, user-attachment control and an error response are returned in the response operands, STEP 938.

Similar to attaching list structure users, a local cache may be attached. The attach-local-cache command identifies a local cache to an existing coupling facility (SES) cache. In one embodiment, this is accomplished using the same logic as depicted in FIG. 27. In particular, in order to attach a local cache, an inquiry is made as to whether or not the local cache is already assigned. In particular, a determination is made as to whether a specified local cache identifier (FIG. 5) is assigned, INQUIRY 920 "IS SPECIFIED ID ASSIGNED?" When the local cache identifier is not assigned, the comparative local-cache authority value in request/response operands (FIG. 13) is compared to zero, INQUIRY 922 "IS COMPARE AUTHORITY=ZERO?" If the comparative local-cache authority is not zero, the local-cache authority value and the attachment information controls are returned in the request/response operands (FIG. 13), along with an error indication, STEP 924.

On the other hand, when the local-cache authority comparison is successful, the structure controls (i.e., cache structure controls 69) are updated, STEP 926 "UPDATE STRUCTURE CONTROLS: ASSIGN SPECIFIED ID." In particular, the specified local cache identifier is assigned. In addition, controls for the specified local cache identifier are updated, STEP 928. In particular, the attachment status in local-cache control block 70 is placed in the active state, and the local-cache controls, such as local-cache authority, local-cache token, the attachment status, and attachment information in local-cache control block 70 are set, as well as the detachment restart token. Subsequently, a successful response code indicating completion is returned, STEP 930 "RETURN AND INDICATE COMPLETION." Thereafter, processing of the attach command ends.

Returning to INQUIRY 920 "IS SPECIFIED ID ASSIGNED?", if the local-cache identifier is assigned, then flow passes to INQUIRY 932 "DOES COMPARE AUTHORITY=ID AUTHORITY?" When the comparative local-cache authority (FIG. 13) is equal to the local-cache authority (FIG. 5), the attachment status is set to active, and the attachment information and local-cache authority controls (FIG. 5) are replaced by the attachment information and local-cache authority request operands (FIG. 13), STEP 934 "UPDATE CONTROLS FOR SPECIFIED ID." Thereafter, a successful return code indicating completion is returned, STEP 936, and processing ends.

However, if the local-cache authority comparison fails, INQUIRY 932, the local-cache authority and attachment information controls of the response operands are returned, along with an exception response code, STEP 938.

Returning to FIG. 25b, and in particular STEP 914 "ISSUE ATTACH USER COMMAND TO COMPLETION", when there is a successful attach, INQUIRY 950 (FIG. 25c) "ATTACH SUCCESSFUL?", the active policy image is updated in virtual storage to indicate such, STEP 952 "UPDATE AP FOR ATTACH USER," and notification of the connect is initiated, as described below, STEP 954 "INITIATE NOTIFICATION OF CONNECT."

Figure 28:
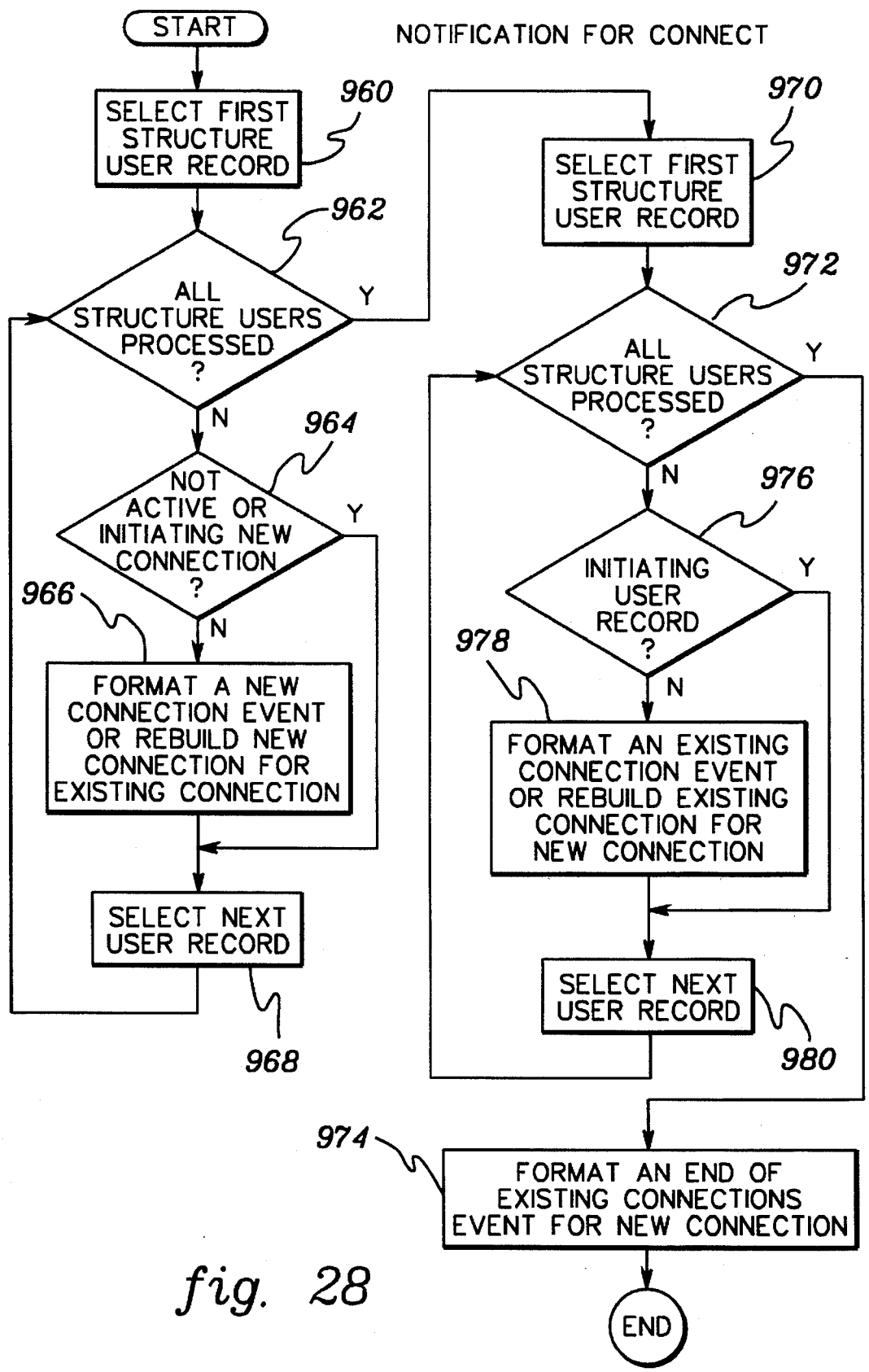
FIG. 28 illustrates one embodiment of the logic associated with a notification for a connect command, in accordance with the principles of the present invention.

Referring to FIG. 28, one example of the logic associated with the notification process is described in detail. Initially, the first structure user record is selected from the active policy, STEP 960 "SELECT FIRST STRUCTURE USER RECORD." Subsequently, a determination is made as to whether all structure users have been processed, INQUIRY 962 "ALL STRUCTURE USERS PROCESSED?"

If all of the users have not been processed, and the user is active and the user is not the one initiating the new connection, INQUIRY 964 "NOT ACTIVE OR INITIATING NEW CONNECTION", a new connection event for the existing connection (described above) is formatted or a new rebuild connection event for the existing connection is formatted, STEP 966 "FORMAT A NEW CONNECTION EVENT OR REBUILD NEW CONNECTION FOR EXISTING CONNECTION." After the event is formatted or if the user is inactive or the user is the one initiating the new connection, the next user record in the active policy is selected, STEP 968 "SELECT NEXT USER RECORD," and flow passes to INQUIRY 962 "ALL STRUCTURE USERS PROCESSED?"

Returning to INQUIRY 962, if all of the structure users have been processed, then the first structure user record is selected from the active policy, STEP 970 "SELECT FIRST STRUCTURE USER RECORD." If all of the users are processed, INQUIRY 972 "ALL STRUCTURE USERS PROCESSED," then an end of existing connections event (described above) is formatted for the new connection, STEP 974 "FORMAT AN END OF EXISTING CONNECTIONS EVENT FOR NEW CONNECTION."

On the other hand, if all of the structure users have not been processed, INQUIRY 972, a determination is made as to whether the user record is being initiated, INQUIRY 976 "INITIATING USER RECORD?" Should the user record not be for the new connection, an existing connection event for the new connection is formatted or a rebuild existing connection event for the new connection is formatted, STEP 978 "FORMAT AN EXISTING CONNECTION EVENT OR REBUILD EXISTING CONNECTION FOR NEW CONNECTION." Subsequent to formatting the connection event or if the user record is for the new connection, the next user record is selected, STEP 980 "SELECT NEXT USER RECORD," and flow passes to INQUIRY 972 "ALL STRUCTURE USERS PROCESSED?"

Returning to FIG. 25c, after initiating notification of the connect, a determination is made as to whether this is a rebuild connection, INQUIRY 990 "REBUILD CONNECT?" If this is not a rebuild connection, the active policy is written from virtual storage to the function data set and the active policy in the function data set is unlocked, STEP 992 "WRITE AND UNLOCK AP TO FUNCTION DATA SET" and the connect process is complete.

On the other hand, if this is a rebuild connection, then a further inquiry is made to determine if all the active users have initiated a connect rebuild, INQUIRY 994 "ALL ACTIVE USERS CONNECT REBUILD?" This is determined by the set bits in the confirm string of the users record. If all of the active users have not requested connect rebuild, then flow passes to STEP 992 "WRITE AND UNLOCK AP TO FUNCTION DATA SET." Otherwise, a string of those users successfully connected to the new structure is built such that notification can be made, STEP 996 "BUILD STRING OF USERS SUCCESSFULLY CONNECTED TO NEW STRUCTURE FOR NOTIFICATION."

Thereafter, notification is initiated by the connect notification routine indicating completion of rebuild connects, STEP 998 "INITIATE NOTIFICATION OF REBUILD CONNECTS COMPLETE." Subsequently, a confirm string is built in the structure record of the active policy based on active users to respond with IXLREBLD complete, STEP 1000, and flow pass to STEP 992 "WRITE AND UNLOCK AP TO FUNCTION DATA SET."

Returning to INQUIRY 894 (FIG. 25b), should this be a rebuild connection, the confirm string for the connecting user is updated, STEP 1002. Thereafter, a vector is defined, STEP 1004 "DEFINE VECTOR." In particular, a local bit vector is defined for a cache for cache coherency and for a list, a list notification vector is defined for state transitions.

Should the vector definition be successful, INQUIRY 1006, flow passes to STEP 912 "CREATE UNIQUE USER AUTHORITY VALUE," and processing continues, as described herein. However, if the vector is defined unsuccessfully, flow passes to STEP 1008 (FIG. 25d) "SET ERROR INDICATOR", as described below Returning to INQUIRY 950 (FIG. 25c), if the attach is unsuccessful, a determination is made as to whether the vector was defined successfully, INQUIRY 1010 (FIG. 25d) "DEFINE VECTOR SUCCESSFUL?" When the vector is defined successfully, the vector is released, STEP 1012 "RELEASE VECTOR." After releasing the vector or if the vector definition is unsuccessful, a determination is made as to whether the attach was successful, INQUIRY 1014 "ATTACH SUCCESSFUL?"

Figure 25C:
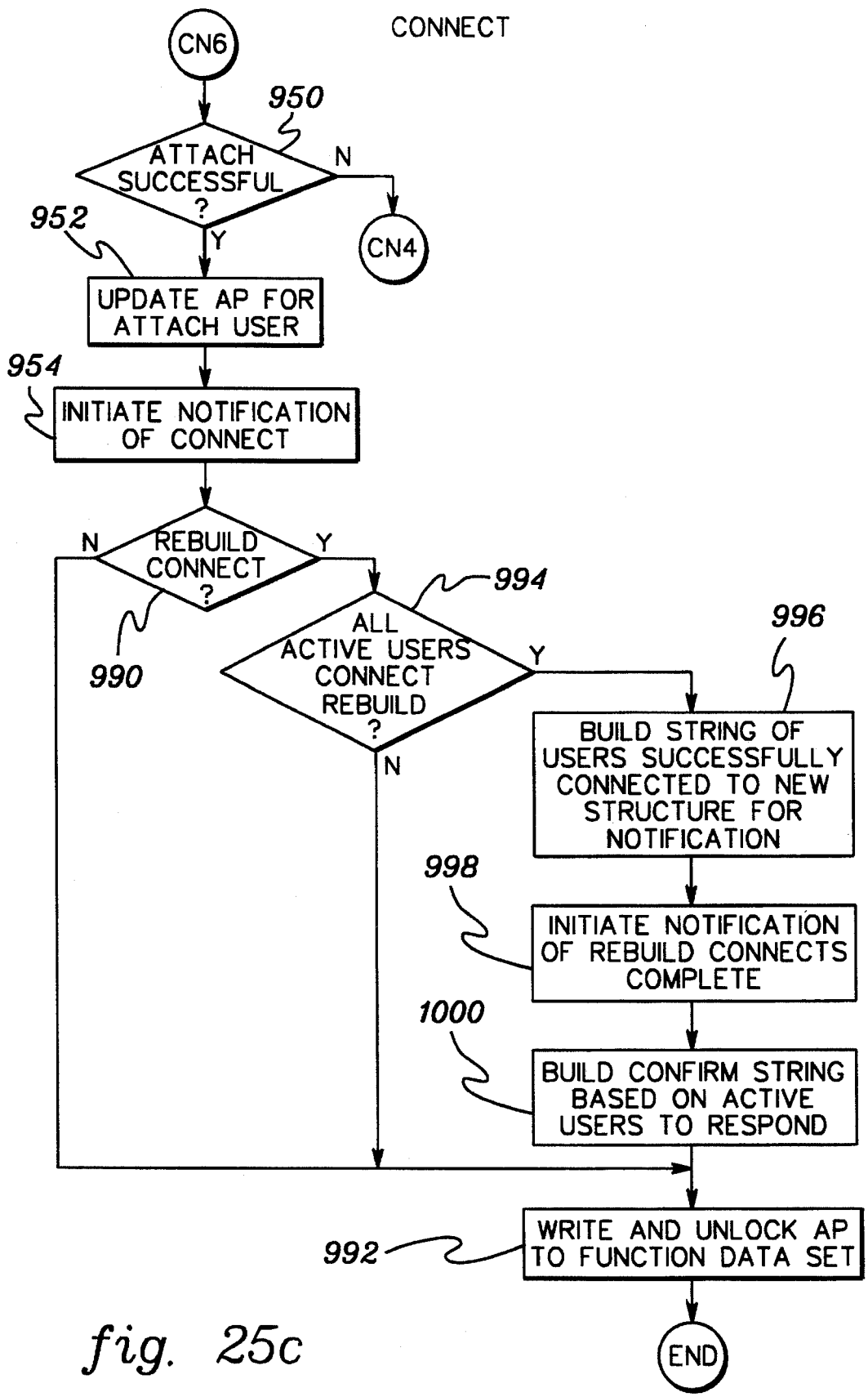
Figure 25D:
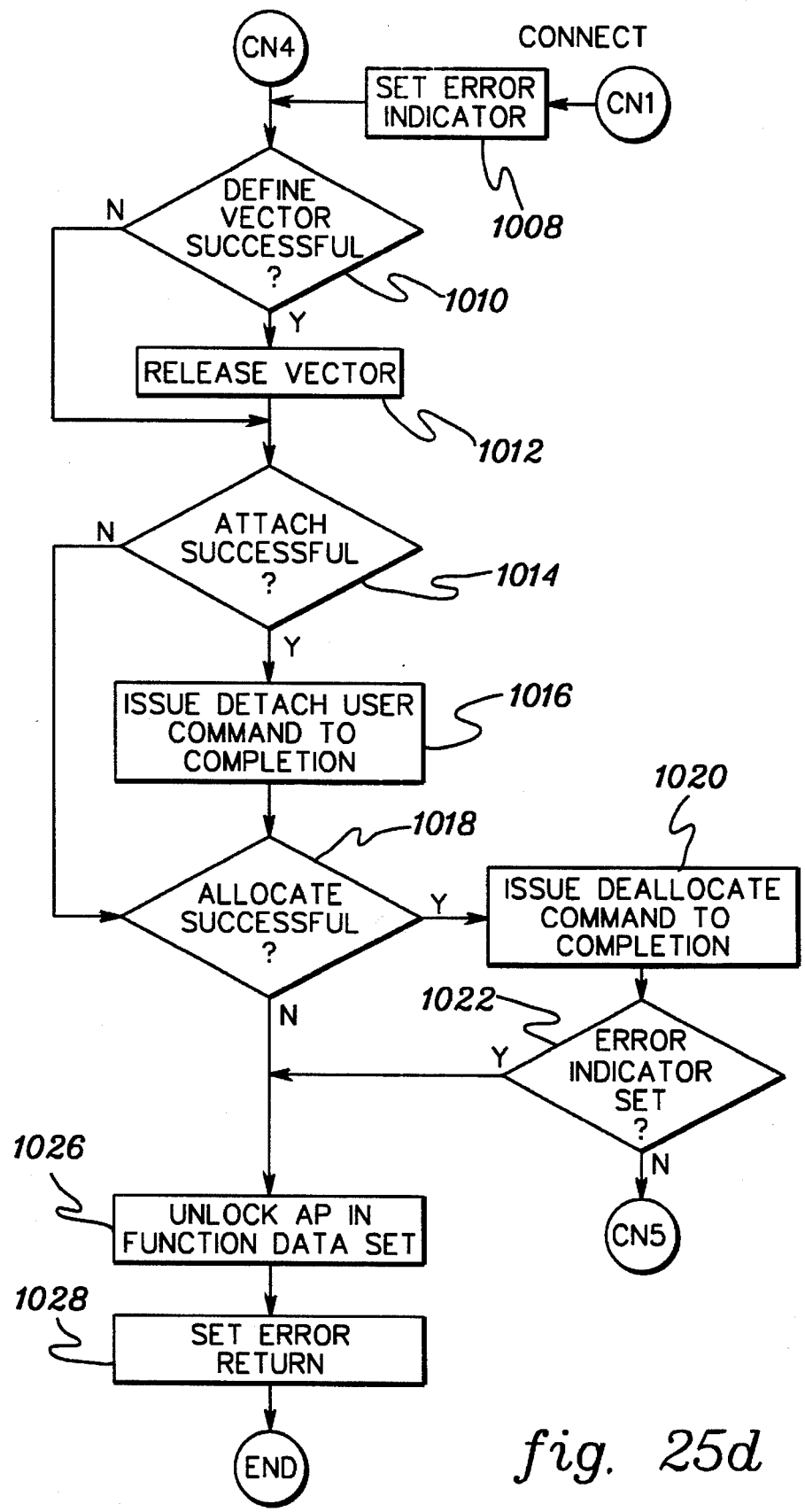

In particular, this inquiry is made to enable back-out of connect processing for failures which occur after the ATTACH successful condition at INQUIRY 950 of FIG. 25c. Specific failure conditions are not discussed, since they are not pertinent to the present invention.

Should the attach be successful, a detach user command, described above, is processed to completion, STEP 1016 "ISSUE DETACH USER COMMAND TO COMPLETION."

After the detach user command or if the attach was unsuccessful, a determination is made as to whether the allocate was successful, INQUIRY 1018 "ALLOCATE SUCCESSFUL?" Should the allocate be successful, a deallocate command, described above, is processed to completion, STEP 1020 "ISSUE DEALLOCATE COMMAND TO COMPLETION."

Subsequent to processing the deallocate command to completion, STEP 1020, a check of the error indicator is made, INQUIRY 1022. Should the error indicator not be set, flow returns to INQUIRY 816 (FIG. 25a) "ANY MORE ELIGIBLE FACILITIES." Otherwise, if the error indicator is set, INQUIRY 1022, or if allocate is unsuccessful, INQUIRY 1018, the active policy in the function data set is unlocked, STEP 1026 "UNLOCK AP IN FUNCTION DATA SET," and an error code is returned, STEP 1028 "SET ERROR RETURN."

Returning to INQUIRIES 802, 804, 816, 890, 900, 906 and 1006, and 908, if the structure is undefined, or the structure allocation is incompatible, or there are no more eligible facilities or the allocate is unsuccessful or the name is not failed persistent or the vector definition is unsuccessful or there are not any available user area in the active policy, flow passes to STEP 1008 (FIG. 25d) "SET ERROR INDICATOR." Thereafter, processing continues with INQUIRY 1010 "DEFINE VECTOR SUCCESSFUL?", as described above.

Returning to INQUIRY 806, should the structure allocation be compatible, flow passes to INQUIRY 894 (FIG. 25b) "REBUILD CONNECT?" and processing continues, as described above.

On successful completion of the IXLCONN service routine, the requesting connected XES user is returned data in the connect answer area specified by the connected XES user through the ANSAREA keyword on the IXLCONN macro. The connect answer area returns a temporary connect token which can only be used on the mainline services used to access the new structure as part of the rebuild process. The original contoken is used with other interfaces, such as IXLDISC, IXLEERSP and IXLREBLD, described herein. The temporary contoken is only presented to IXLCONN, the requestor.

For connections to structures other than lock structures, the connector's original connect token is re-validated, permitting the connector to access the old structure, provided that the old structure is still accessible. The original contoken will not be re-validated when the connection has lost connectivity to the original structure, or the original structure has failed.

The connect answer area contains an indication of whether the structure the user is connected to is in a special state such as rebuild in progress, rebuild stop in progress, or a user sync point event is set. Information that the connector would have received in the event exit for a rebuild start, rebuild stop, or user sync point event if the user had been connected at the time the event occurred is provided in the connect answer area.

In addition, the connect answer area contains a connection and structure version number. A structure version number is unique within the scope of a structure name. The structure version number changes (ascending) each time a new structure is allocated for the same structure name. For example, when a new structure is allocated for rebuild, the structure version number will be greater than the structure version number assigned to the original structure. A connection version number is unique within the scope of the structure name. The connection version number changes (ascending) for each new connection. For example, if a failed-persistent connection is reconnected, the new connection version number will be greater than the connection version number assigned to the previous instance of the connection. However, when a user invokes the connect service with the REBUILD keyword, the connection version number is equivalent to the original connection's version number because a rebuild connect request does not define a new connection. A rebuild connect request only defines additional resources to be owned by the original connection.

The connect answer area also contains information about the rules used to allocate the structure. There are flags in the connect answer area which indicate whether the exclusion list could be used for allocating the structure and whether the structure was allocated in a facility which had full connectivity to the original set of connections. The actual structure size and maximum structure size are returned in the connect answer area. The maximum size is the policy structure size at the time the structure was allocated. A zero return code will be set in the cases where the structure is allocated with less space, not according to the exclusion list, or not with full connectivity to the original set of connections.

In addition to the above, the connect answer area includes a user sync point event if one was defined by an existing connector using an IXLUSYNC service, described below. The new connection is expected to perform the processing required for the event and then provide a confirmation using the IXLUSYNC service.

Further, in the answer area, a connection identifier is presented. This connection identifier will be equal to the connection identifier assigned to the original connection. Additionally, attribute information for the coupling facility structure to which the connected XES user is connected is provided. The connected XES user is responsible for verifying that the attributes of the coupling facility structure are acceptable. If the attributes are unacceptable, the user may release its connection by issuing IXLDISC, described below, or stop rebuild processing by issuing IXLREBLD.

Yet further, a vector token and vector length for those connections to a list structure with list monitoring or a cache structure is provided. This token is needed for accessing the new structure and continues to be needed when rebuild is complete. This token should only be discarded if the rebuild is stopped.

Further, upon successful completion of IXLCONN REBUILD request, the requesting connected user is connected to the requested coupling facility structure. If the connected XES User is the first to allocate the new coupling facility structure, it is connected to the coupling facility structure in the initialized state. A flag in the connect answer area indicates whether the connection allocated the coupling facility structure or not.

If the connected XES user is not the first to allocate the new coupling facility structure (i.e., it is or was in use by other connections) the requesting connected XES user is connected to a coupling facility structure that may reflect requests previously issued by other connections to the structure.

In addition, upon successful completion, the requests may request all other supported XES functions that are valid for the type of structure to which the user is connected, and the requestor is notified about all connections connected to the new structure through its event exit. All active connections to the new structure are also notified of the new connection through their event exits. Information about a new connection is presented by the rebuild new connection event.

The new connection may receive events describing existing connections before the rebuild connect request completes. The set of existing connections presented to the new connection is a snap shot of all active and failed-persistent connections defined at the instant the new connection was allocated.

If the rebuild connect request fails due to task termination before returning to the requestor, the rebuild connect failure event is sent to all peer connections. This is the only case where rebuild connect termination is separate from connection termination.

For connections to a lock or serialized list structure, the IXLCONN service is complete when all other XES instances that are connected to the new rebuild structure acknowledge the new connections. This acknowledgement is internal to XES and is not related to event exit responses. This acknowledgement ensures that all connectors have received the rebuild new connection event before IXLCONN completes. XES does not require an acknowledgement for connections to a cache or list structure without lock entries; therefore, the connection may complete before all existing connections have recognized the new connection.

If the user connects after the rebuild process has been initiated, IXLCONN sets a return and reason code indicating that additional status information is available about the connection and/or structure. There are two bits in the connect answer area which indicate whether the structure is in rebuild or rebuild stop processing. Both of these states require the connector to participate in the rebuild process. If the connector does not wish to participate in the rebuild process, then the connector should disconnect. If the connector does not wish rebuild processing to continue for the structure, the connector can stop rebuild processing.

The connect service may return a return code indicating that new connections are not permitted while rebuild is in process. This return code will be set when new connections occur after connections have started accessing the new structure as part of the rebuild process.

Figure 29:
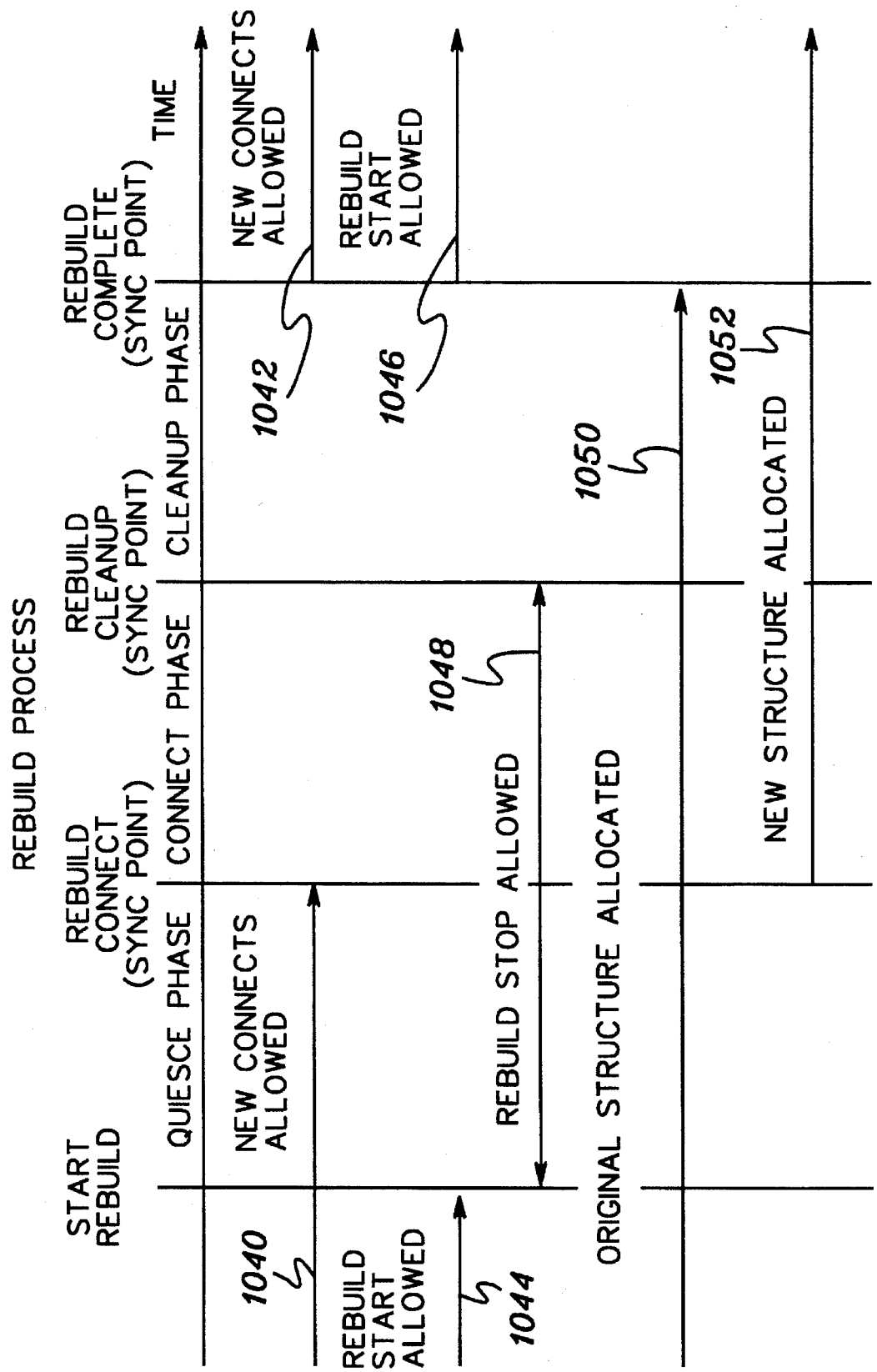
FIG. 29 depicts one embodiment of an overview chart illustrating the synchronization points for the rebuild process, in accordance with the principles of the present invention.

One embodiment of rebuild processing is described in detail above, in accordance with the principles of the present invention. As described herein, during rebuild processing, there are a number of synchronization points. A summary of these points is depicted in FIG. 29. As shown in FIG. 29, there are three phases of rebuild processing following start rebuild: the quiesce phase, connect phase and cleanup phase.

Additionally, there are three synchronization points, which include rebuild connect, rebuild cleanup and rebuild complete. Prior to the rebuild start and the rebuild connect synchronization point, new connections are allowed (reference numeral 1040). Similarly, after rebuild is complete, new connects are also allowed (reference numeral 1042). Prior to the start rebuild request or subsequent to the rebuild complete sync point, rebuild start is allowed (reference numerals 1044 and 1046). After the rebuild start and before the rebuild cleanup sync point, a rebuild stop, described below, is allowed (reference numeral 1048). In addition, prior to the rebuild complete sync point, the original structure is still allocated (reference numeral 1050). A new structure is allocated after the rebuild connect sync point (reference numeral 1052).

In accordance with the principles of the present invention, after initiating the rebuild processing, the rebuild processing may be halted. A stop rebuild request can be initiated for a number of reasons, including loss of connectivity to the new structure, loss of connectivity to the old structure, structure failure for the old structure, structure or facility failure of new structures, user failure, insufficient connectivity, insufficient structure size, change in plan, operator request, or a connector specific reason with a user code. XES will implicitly stop the rebuild when the new structure allocated for rebuild fails before the rebuild cleanup phase has been reached. The reason for stopping a rebuild is provided as input on the IXLREBLD interface using the REASON keyword. The reason provided is presented to all the connectors when they are notified of the stop rebuild request.

Figure 30:
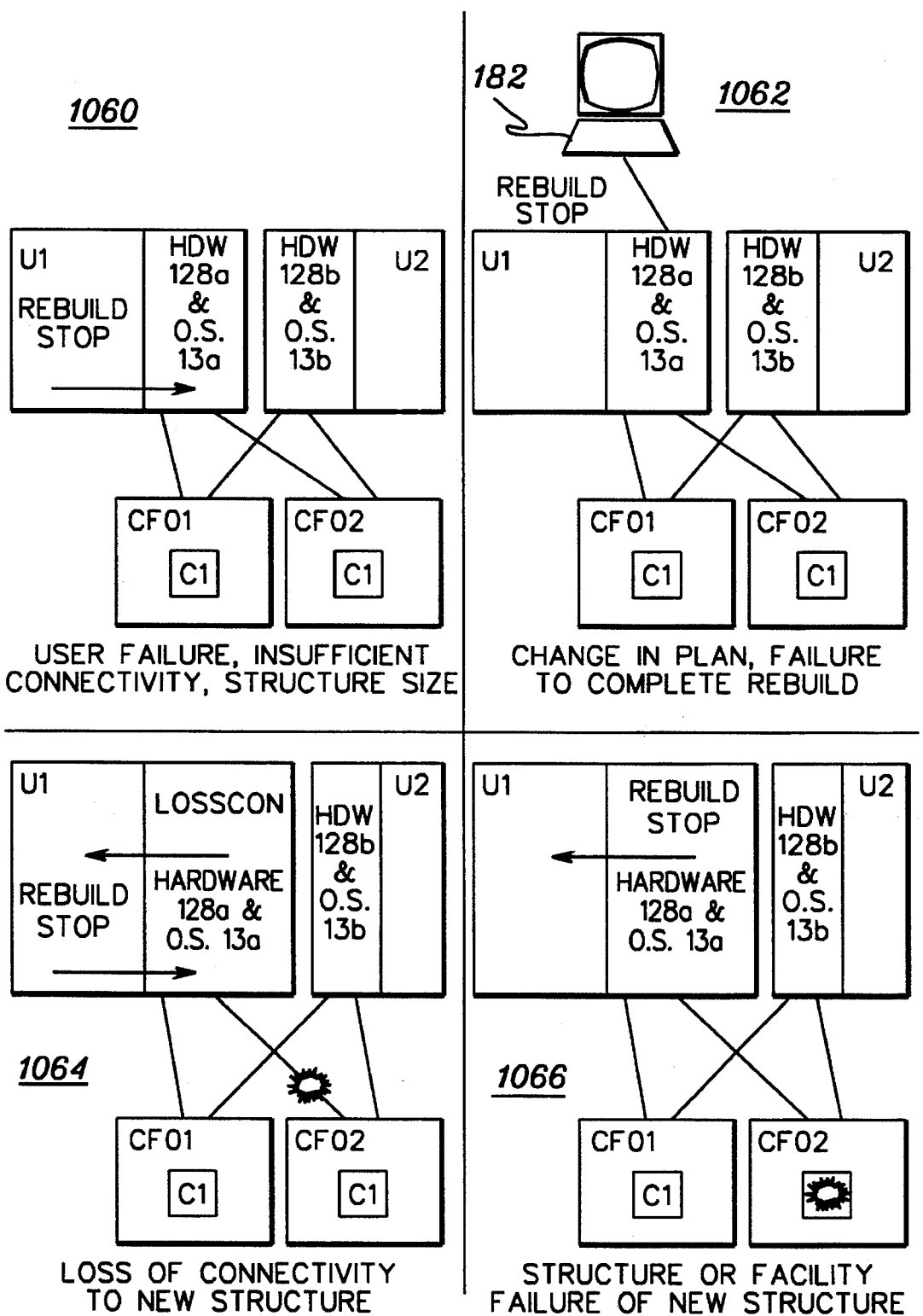
FIG. 30 depicts an overview diagram illustrating a number of situations in which rebuild stop may be initiated, in accordance with the principles of the present invention.

Some of the above causes for initiation are depicted in FIG. 30. As shown, in quadrant 1060, rebuild stop can be initiated due to user failure, insufficient connectivity and insufficient structure size. Two users (U1 and U2) are connected via hardware 128a, 128b, respectively, to coupling facility (CF01) and coupling facility (CF02), each of which include a structure C1. Should, for instance, a rebuild structure in coupling facility CF02 be insufficient in size, user U1 can issue a rebuild stop.

Referring to quadrant 1062, it is shown that a rebuild stop command may be issued by an operator at console 182, which is coupled to operating system 13a via hardware 128a. (The configuration in quadrant 1062, 1064 and 1066 are similar to that of quadrant 1060 and, therefore, are not explained in detail again.) The operator may issue the stop command due to a change in plan or a failure to complete rebuild.

Referring to quadrant 1064, if operating system 13a detects a loss of connectivity to the new structure, e.g., C1 of CF02, then user U1 may issue a rebuild stop program request.

Similarly, in quadrant 1066, if operating system 13a detects the failure of a new structure, such as C1 in CF02 or of the facility itself, the operating system initiates a rebuild stop operation and notifies connected users.

In one embodiment, as described above, a stop request may be initiated by an operator command, such as SETXCF STOP REBUILD. In one example, the stop command has the following syntax:

---
SETXCF STOP, REBUILD
 ,STRNAME = (strname[,strname] . . .)
 ,CFNAME = (cfname[,cfname] . . .)
---

Where:
STRNAME=(strname[,strname]. . .) indicates one or more coupling facility structures for which rebuild processing is to be stopped. Strname specifies the name of the coupling facility structure for which rebuild is to be terminated. If only one strname is specified, the surrounding parentheses are not needed. If the STRNAME keyword is specified, at least one strname must be provided.

CFNAME=(cfname[,cfname]. . .) specifies one or more coupling facilities for which rebuild stop should be requested for all structures. Cfname specifies the coupling facility name. If only one cfname is specified, the surrounding parentheses are not needed. If the CFNAME keyword is specified, at least one cfname must be provided.

The logic associated with the stop command is described above with reference to the rebuild service of FIGS. 19a–19i.

In order for a stop rebuild request to be successful, the structure must be in rebuild and prior to the rebuild cleanup sync point and there must still be active connections to the structure. Note that if all connections terminate, the rebuild process will automatically be stopped or completed based on the phase rebuild processing is in.

Once a stop rebuild request has completed successfully, all connectors are notified via the rebuild stop event. This event is presented to each connector's event exit. This event requires that the connector stop rebuilding into the new structure and stop accessing the old structure. The connector should discard the temporary contoken and the new vector token (if applicable).

In accordance with the principles of the present invention, during rebuild, the connectors may need to synchronize their rebuild processing. An IXLUSYNC service, described below, can be used to notify all related connections when all connections have reached a user defined sync point (as opposed to an operating system synchronization point, described above with reference to FIG. 29). When all connections have confirmed a particular user defined event, the connector's event exits are driven.

The IXLUSYNC service enables synchronization of processing between connectors through the event exit interface. The IXLUSYNC service can be used to set a user event. Each connector is notified of the user event through the event exit. Whenever a user event is set, a user defined user state can also be provided. Each connector performs processing associated with the event according to application protocol and then invokes the IXLUSYNC service to confirm the user event.

When a connector confirms a user event, the connector can optionally specify what the next event will be. The last connector to confirm a user event is the connector who defines the next user event and the next user state.

When all connectors have provided a confirmation for the user event, the sync point has been reached. Each connector's event exit is driven with the user sync point event. This event indicates the user event completed and its associated user state. If the next user sync point event provided in the event exit parameter list is non-zero, then another sync point event was specified by the last connector to confirm the event just completed. The next user state is also provided in the event exit parameter list.

If a user connects after a user sync point event has been set, IXLCONN will set a return and reason code indicating that additional status information is available about the connection and/or structure. There is a bit in the connect answer area which indicates that a user sync point event has been set. The connect answer area also tells the new connector what the next user sync point event is and the user state associated with the event. The connector is expected to do whatever processing is required by the user defined event and to provide a confirmation for the event using the IXLUSYNC service.

If a connection terminates while a user event is set, all connections to the structure are notified in their event exit of the disconnect or failed connection event. When all connections to the structure have provided an event exit response for the disconnect or failed connection event, outstanding user event confirmations are cleaned up.

At the time the connection terminated, the failed user may not have completed his processing for the user event. Peer connections have an opportunity to handle this situation before they provide an event exit response for the disconnect or failed connection event. This is especially important when the CONFIRMSET option, described below, is used because if the failed connection would have been the last user to issue IXLUSYNC with CONFIRMSET, and therefore, set the next event, then next user event will not get set.

If all connections terminate the user event will be reset.

The IXLUSYNC service routine is given control from the IXLUSYNC macro, described below. In order to use this service, the requestor must be a connector to a structure and provide its contoken as input. In one example, the following functions are supported: set a user event, confirm a user event, or confirm a user event and set the next user, if no more confirmations are expected.

Setting a user event and the confirmation of a user event by all connections (i.e., a sync point) are communicated to connectors through the event exit. The user sync point event is presented to the event exits of each connector in two cases: when a new user sync point event is set, or when all confirmations are received for a user sync point, i.e., a sync point has been reached.

One embodiment of the syntax associated with the IXLUSYNC macro is described below:

```
IXLUSYNC CONTOKEN = xcontoken
    ,USEREVENT = xuserevent
    ,REQUEST = SET
    [,USERSTATE = {xuserstate|ALL ZEROES}]
    ,REQUEST = CONFIRM
    ,REQUEST = CONFIRMSET
    ,NEXTUSEREVENT = xnextuserevent
    [,USERSTATE = {xuserstate|ALL ZEROES}]
```

Where:
CONTOKEN(xcontoken) is the name of a required 16 character input field that specifies the connect token of the responding connection.
USEREVENT(xuserevent) is the name of a required fullword input that specifies the user event associated with this request. The user event must be non-zero.
REQUEST({SET|CONFIRM|CONFIRMSET}) is a required keyword input which identifies the type of user sync point request.
   REQUEST(SET)—set the user event. Only one user sync point event can be set at a time. When setting an event, a previous event, if there was one, must have been confirmed by all connectors and all connectors must have been told about the completion of the user sync point through their event exit. If the user event is successfully set, the user sync point event is presented to the event exit of each connector, notifying each connector of the user event. The following data is presented to each connector in the event exit parameter list: EeplCompletedUserEvent will be zero; EeplNextUserEvent will be set to the value specified by the USEREVENT keyword; and EeplNextUserState will be set to the value specified by the USERSTATE keyword or zero, if USERSTATE is not specified.
   [USERSTATE({xuserstate|ALL_ZEROS})] is the name of an optional 32 character input that specifies a user defined value to be presented to the event exit. If this value is not provided, zeros will be presented. The user state presented to the event exit is from the connector that successfully set the user event. DEFAULT: ALL ZEROS
   REQUEST (CONFIRM)—confirm the user event specified by the USEREVENT keyword. When all confirmations have been received, the user sync point event is presented to the event exit of each connector notifying each connector that a sync point has been reached. The following data is presented to each connector in the event exit parameter list: EeplCompletedUserEvent will be set to the value specified by the USEREVENT keyword; EeplNextUserEvent will be set to zero; EeplCompleteUserState will be set to the value specified when the event was set; and EeplNextUserState will be set to zero.
   REQUEST(CONFIRMSET)—confirms the user event specified by the USEREVENT keyword and, if this confirmation is the last, set the userevent to the value specified by the
      NEXTUSEREVENT keyword. When all confirmations have been received, the user sync point event is presented to the event exit of each connector, notifying each connector that a sync point has been reached. The next user event is also presented to the connectors. The following data will be presented to each connector in the event exit parameter list: EeplCompletedUserEvent will be set to the value specified by the USEREVENT keyword; EeplNextUserEvent will be set to the value specified by the NEXTUSEREVENT; EeplCompletedUserState will be set to the value specified by the connector that set the event; and EeplNextUserState will be set to the value specified by the USERSTATE keyword or zero, if the USERSTATE is not specified.
   NEXTUSEREVENT (xnextuserevent) is the name of a required fullword input that specifies the next user event to be set. The user event is non-zero.
   [USERSTATE({xuserstate|ALL_ZEROS})] is the name of an optional 32 character input that specifies a user defined value to be presented to the event exit. If this value is not provided, zeros are presented. The user state presented to the event exit is from the connector that successfully set the user event. DEFAULT: ALL_ZEROS One embodiment of the logic associated with a user sync point routine is described in detail with reference to FIGS. 31a–31d. Initially, a determination is made as to whether the user sync point routine was invoked via an implicit entry, INQUIRY 1100 "USER SYNC POINT IMPLICIT ENTRY?" In particular, this may be determined by an indication in the parameter list associated with the user sync point entry and/or by the manner in which the user sync point routine is called. Should this not be an implicit entry, then the active policy is read from the function data set and the function data set is locked, STEP 1102. Thereafter, or if this was an implicit entry, INQUIRY 1100, the active policy is checked to determine if the structure is specified in the active policy, INQUIRY 1104 "STRUCTURE SPECIFIED IN AP?" If the structure is not specified in the active policy, then processing of the user sync point routine is complete, STEP 1105 "END." However, if the structure is specified in the active policy, then a further determination is made as to whether the connector is valid, INQUIRY 1106 "VALID CONNECTOR?"

A connector is invalid if the address space that invoked IXLUSYNC does not have any active structure user, as indicated in the structure record of the active policy. Should the connector be invalid, then processing of the user sync point routine is complete, STEP 1105 "EXIT." However, if the connector is valid, then a determination is made as to whether this is a SET request, INQUIRY 1108 "SET REQUEST?" If this is a SET request, as indicated by the IXLUSYNC macro, then the user sync point is checked to see if it is active, INQUIRY 1110 "USER SYNC POINT ACTIVE?" Referring to the structure record status area, if the user sync point is active, then processing of the user sync point routine is complete, STEP 1105 "EXIT." However, if the user sync point is inactive, then the confirm string based on active users to respond is built, STEP 1112.

After building the confirm string in the structure record of the active policy, an indication is made in the active policy image and specifically, the structure record status area, that the user sync point is active, STEP 1114 "INDICATE USER SYNC POINT ACTIVE IN AP IMAGE." Thereafter, the user event is saved in the active policy image, STEP 1116 "SAVE USER EVENT IN AP IMAGE."

Subsequently, notification of the user sync point set is initiated, STEP 1118. In one embodiment, in order to initiate notification, a user sync point event notification routine is used. The logic for this routine would be the same as for the rebuild event notification in FIG. 20; however, STEP 356 would read "FORMAT A USER SYNC POINT EVENT BASED ON INPUT REQUEST FOR ACTIVE CONNECTION."

After initiating notification, a determination is made as to whether the user sync point entry was an implicit entry, INQUIRY 1120 "USER SYNC POINT IMPLICIT ENTRY?" If this was an implicit entry, then processing of the user sync point routine is complete, STEP 1121 "EXIT." However, if this was not an implicit entry, then the active policy is written to the function data set and the function data set is unlocked, STEP 1122 "WRITE AND UNLOCK AP TO FUNCTION DATA SET." Thereafter, processing of the user sync point routine is complete, STEP 1121 "EXIT."

Returning to FIG. 31a and, in particular, INQUIRY 1108 "SET REQUEST?", if this is not a SET request, then a determination is made as to whether the user sync point was confirmed by the user, INQUIRY 1124 "CONFIRM REQUEST?"

If the request was confirmed, then the confirm string entry for the responding user is updated, STEP 1126. Subsequently, a determination is made as to whether all active users responded, INQUIRY 1128 "ALL ACTIVE USERS RESPONDED?" If all of the active users have responded, then an indication is made in the active policy image that user sync point is not active, STEP 1130. Thereafter, the user event in the active policy image is cleared, STEP 1132, and notification of user sync point confirmed is initiated, STEP 1134. Subsequent to initiating notification of user sync point confirmed, or if all active users have not responded, INQUIRY 1128, then flow passes to INQUIRY 1120 (FIG. 31b) "USER SYNC POINT IMPLICIT ENTRY?", and processing continues, as described above.

Returning to FIG. 31c and, in particular, INQUIRY 1124 "CONFIRM REQUEST?" if the request was not a user sync point confirmation, then a determination is made as to whether the request was to confirm and SET, INQUIRY 1136 "CONFIRM SET REQUEST?" If the request was not a confirm and SET, then processing of the user sync point routine is complete, STEP 1137 "EXIT." However, if the request was confirm and SET, then the confirm string entry for the responding user is updated, STEP 1138 "UPDATE CONFIRM STRING FOR RESPONDING USER." Thereafter, a determination is made as to whether all active users have responded, INQUIRY 1140. If all of the active users have not responded then flow passes to INQUIRY 1120 (FIG. 31b) "USER SYNC POINT IMPLICIT ENTRY?" However, if all of the active users have responded, then a confirm string, based on the active users to respond is built in the user record, STEP 1142, and the next user event is saved in the active policy image, STEP 1144 "SAVE NEXTUSEREVENT IN AP IMAGE." Thereafter, notification of user sync point confirm set is initiated, STEP 1146, and processing continues with INQUIRY 1120 (FIG. 31b) "USER SYNC POINT IMPLICIT ENTRY?"

In accordance with the principles of the present invention, when a connector disconnects in the middle of the rebuild process, the user's connection to the old and potentially the new structure are cleaned up. Disconnect processing cleans up the connector's connections to the new structure, if the connector had successfully completed an IXLCONN REBUILD request. Peer connections receive a disconnected or failed connection event in their event exit as usual.

If a connection terminates during rebuild processing, all connections to the structure are notified in their event exit of the disconnect or failed connection event. It is the responsibility of the remaining connections to determine whether the rebuild process should be continued or stopped because of the terminated connection. When all connections have provided an event exit response for the terminated connection event, outstanding event exit responses for rebuild related events and user sync point events are cleaned up.

If all connections terminate during rebuild processing, the rebuild is automatically terminated or completed based on the phase of rebuild processing. Any resources allocated to support the rebuild process are cleaned up.

A connection that abnormally terminates during the rebuild process is put into a failed persistent state if the connection specified a connection disposition of KEEP at connect time. However, the connection cannot reconnect between the point where the rebuild connect event is presented up until the rebuild process completes. After the rebuild process is complete, the connection may or may not be reconnected depending on the following: 1) whether at the time of failure the rebuild connect had been successful or not and 2) whether the rebuild process completed successfully or was stopped.

If the rebuild connect was not successful at the time of failure and the rebuild process completed successfully, then the connection would not be reconnected because the user was never connected to the new structure.

If the rebuild connect was not successful and the rebuild process was stopped, then the connection would be reconnected because the connection was once connected to the structure.

If the rebuild connect was successful, the connection is reconnected regardless of whether the rebuild process completed successfully or was stopped. The connection is connected to both the original and new structure; therefore, the connection would be reconnected to the structure that exists based on whether the rebuild completed or terminated.

An IXLDISC service is the vehicle by which a connected XES user releases its access to XES services and the coupling facility structure. Upon return from XES, the requesting connected XES user is denied any further access to XES-supported functions. To re-establish access authorization, it is necessary for the connected XES user to issue an IXLCONN request. A connected XES user may request IXLDISC services either because it is terminating due to failure or because it no longer requires access to a coupling facility structure.

One embodiment of the syntax associated with an IXL-DISC macro is described in detail below. The IXLDISC service routine is given control from the IXLDISC macro to disconnect a user from an XES structure. The IXLDISC service only supports disconnection from a single structure per invocation. If a user wishes to disconnect multiple connections, it issues the IXLDISC macro once for each connection. One example of the syntax is as follows:

```
IXLDISC CONTOKEN = xcontoken
        [,DISCDATA = xdiscdata|ALL_ZEROES]
        [,REASON = {NORMAL|FAILURE}]
        [,RETCODE = xretcode]
        [,RSNCODE = xrsncode]
```

Where:

CONTOKEN(xcontoken) is the name of a required 16 character input field that specifies the connect token returned to the invoking user in the answer area when it requested the IXLCONN service.

DISCDATA is the name of an optional 8 character input that specifies connector data that will be provided to other connection's event exits, and can be used as the invoker wishes. DEFAULT: ALL_ZEROES REASON({NORMAL|FAILURE})] is an optional keyword input which identifies the reason for disconnecting from a structure. The disconnect reason is presented to all surviving connected XES users in the event exit parameter list. The reason in conjunction with the connection disposition affects the state of the connection upon completion of the disconnect. DEFAULT: NORMAL NORMAL—Normal termination. The connection disposition specified on IXLCONN does not apply. A disconnect specifying normal termination is considered a normal connection termination; therefore, the connection is not persistent, even if persistence is specified to the IXLCONN service. The connection disposition attribute is applicable only in abnormal terminations such as a disconnect specifying failure, system failure, task termination, and address space termination.

There is one exception which causes the connection disposition to be applicable on a normal disconnect. The exception occurs when a connection disconnects for a lock structure while holding resources shared or exclusive. If the connection disposition was KEEP, the connection will be put into a failed-persistent state. If the lock structure contains a record substructure, then record list entries will remain associated with the failed connection until the failed-persistent connection is released.

If a connection to a lock structure, which owns locking resources, disconnects with REASON=NORMAL, then the disconnect requests are treated as if the user had specified REASON=FAILURE.

FAILURE—Termination due to a failure. The connection disposition specified on IXLCONN does apply. The connection is placed in a failed-persistent state, if the connection disposition is KEEP.

RETCODE(xretcode)] is the name of an optional fullword output variable into which the return code is to be copied from GPR 15.

RSNCODE(xrsncode)] is the name of an optional fullword output variable into which the reason code is to be copied from GPR 0.

Figure 31A:
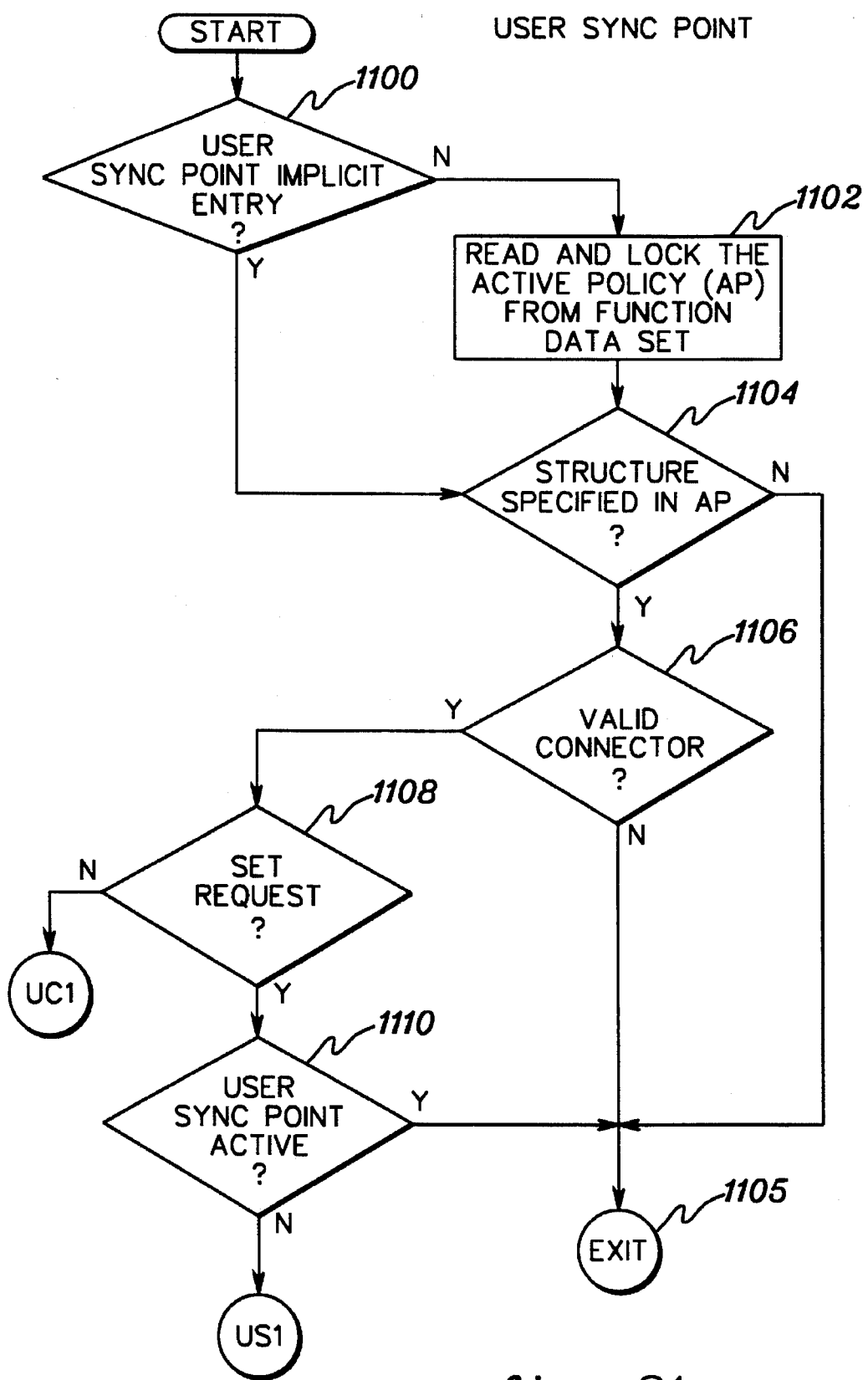
FIGS. 31a–31d depict one embodiment of the logic associated with a user sync point routine, in accordance with the principles of the present invention.
Figure 31B:
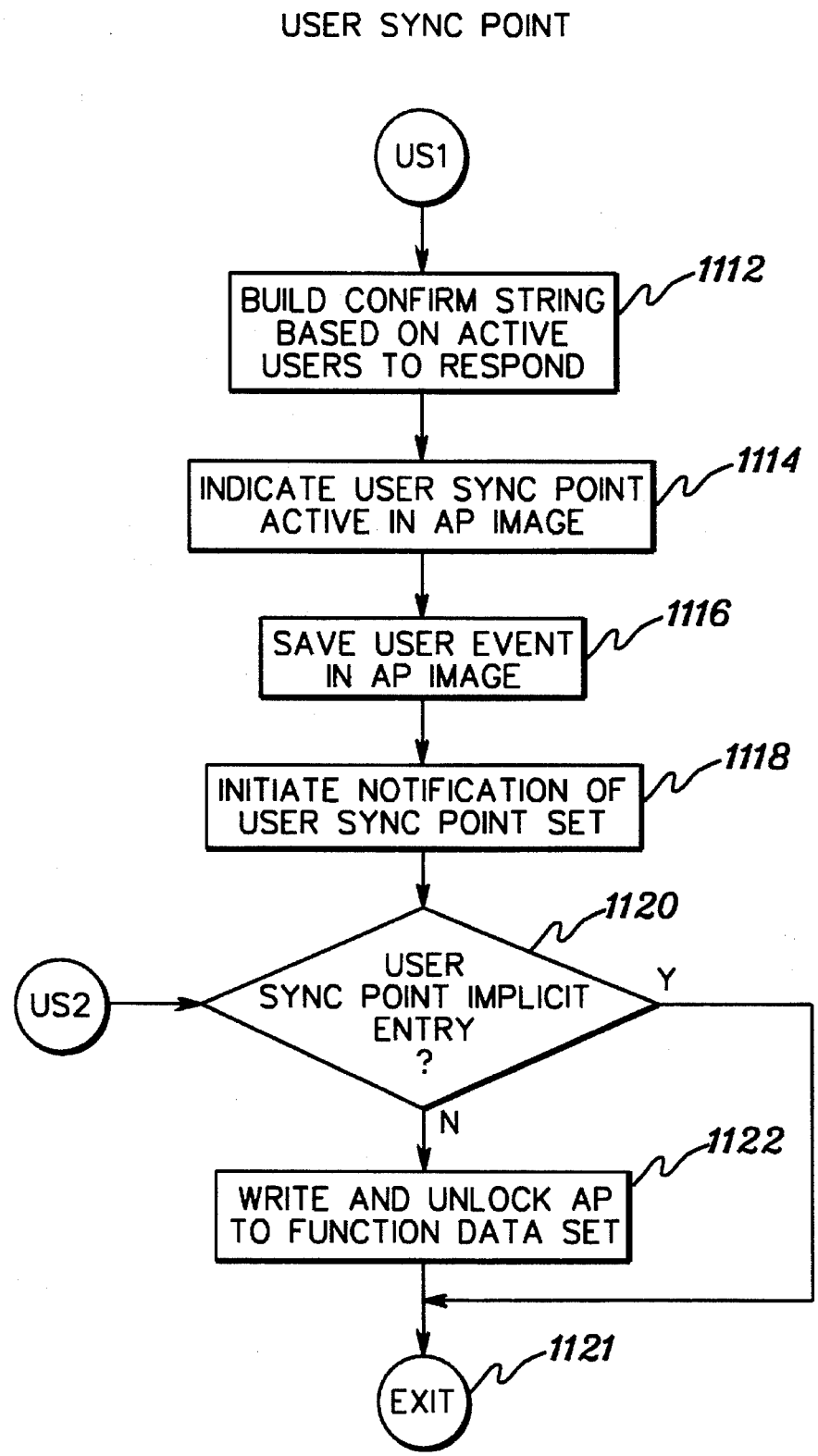
Figure 31C:
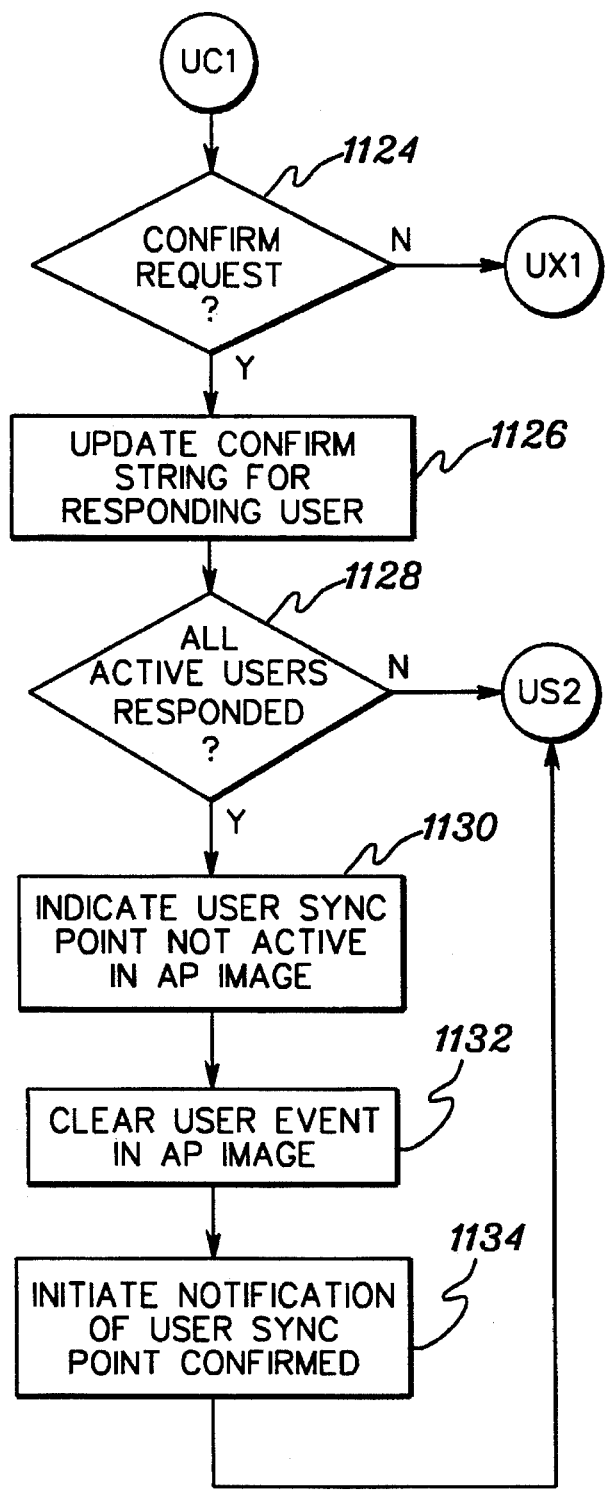
Figures 31D, 32:
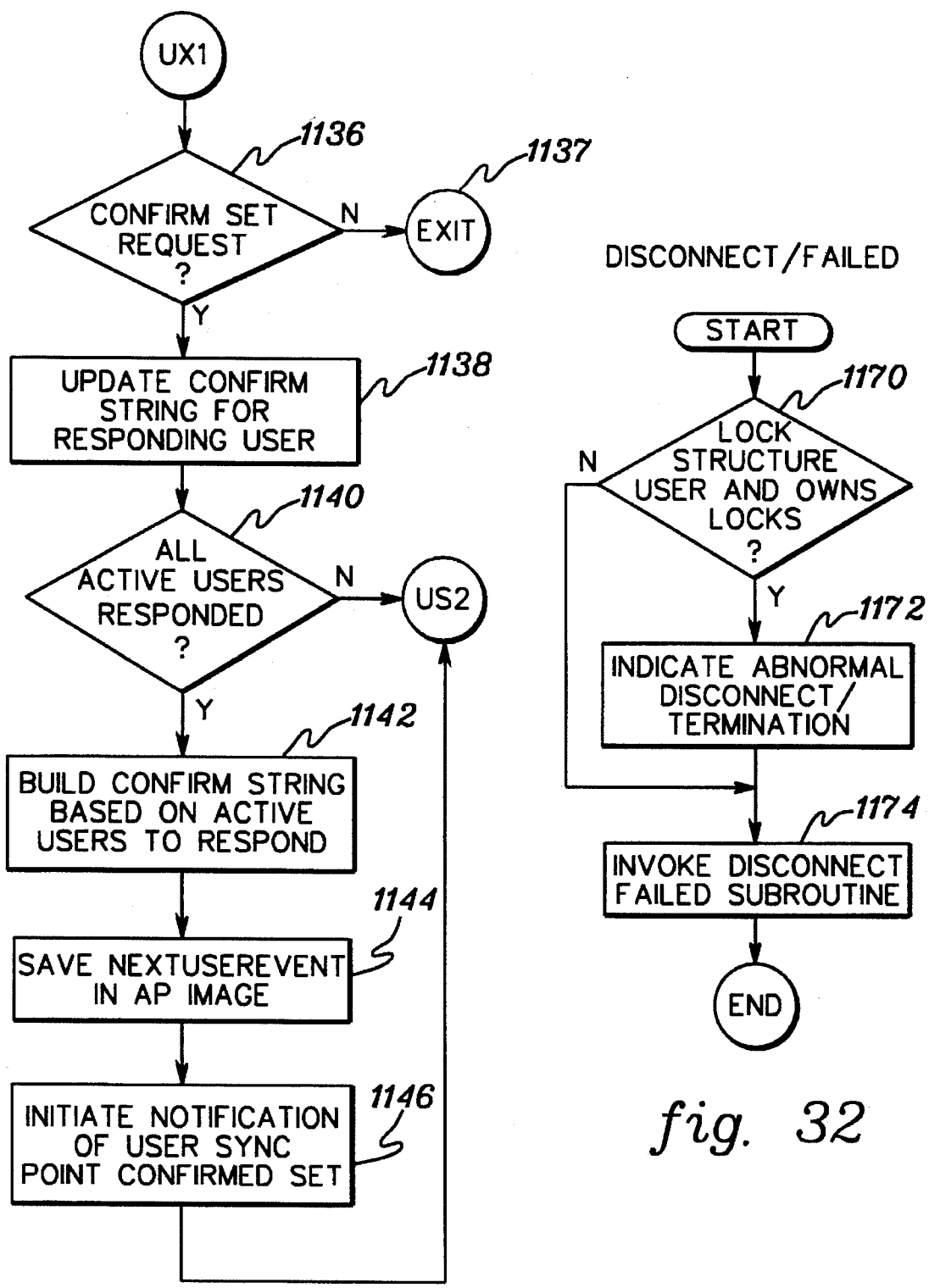
FIGS. 32, 32a–32f depict one embodiment of the logic associated with a disconnect/failed routine, in accordance with the principles of the present invention.
Figure 32A:
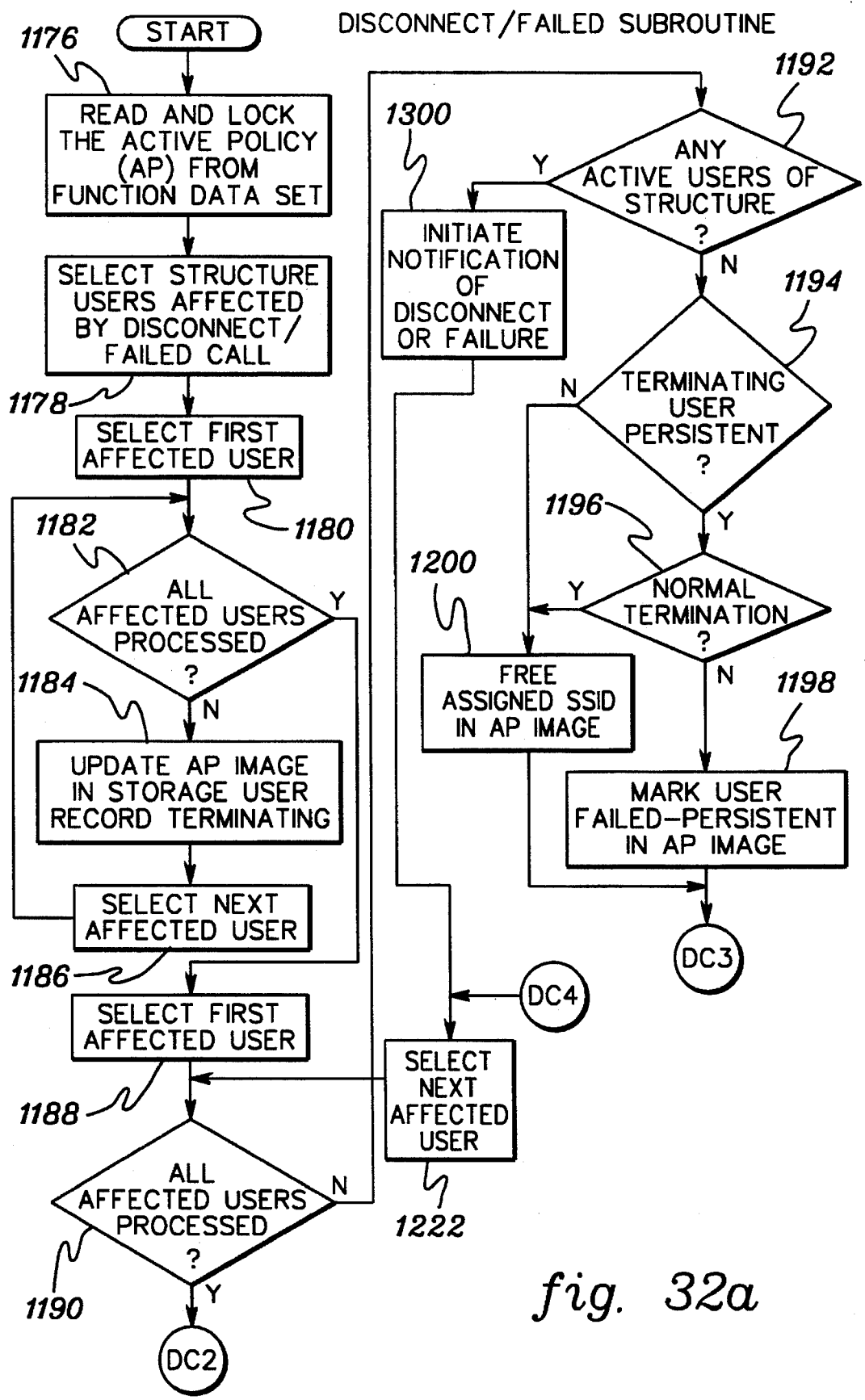
Figure 32B:
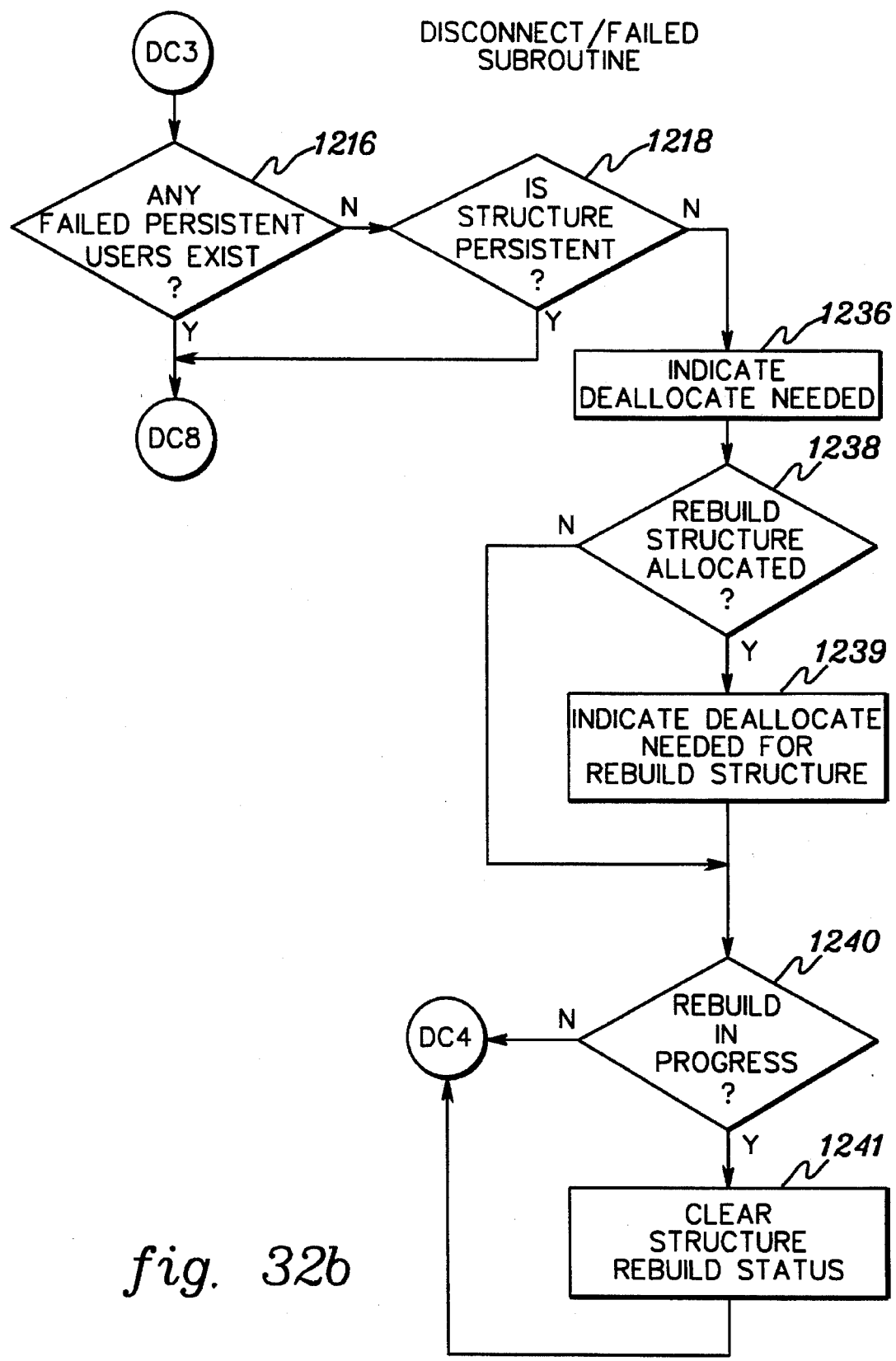
Figure 32C:
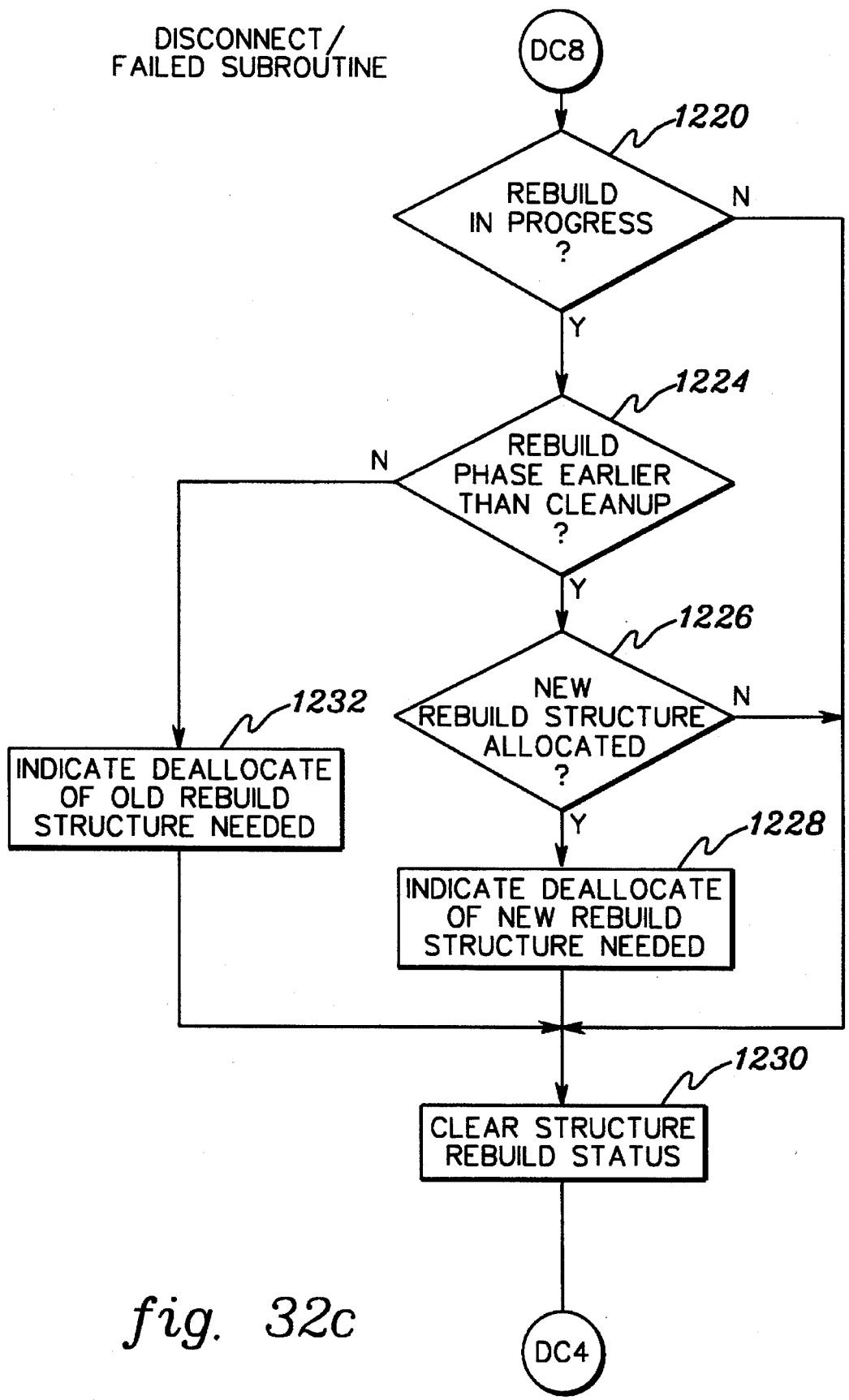
Figure 32D:
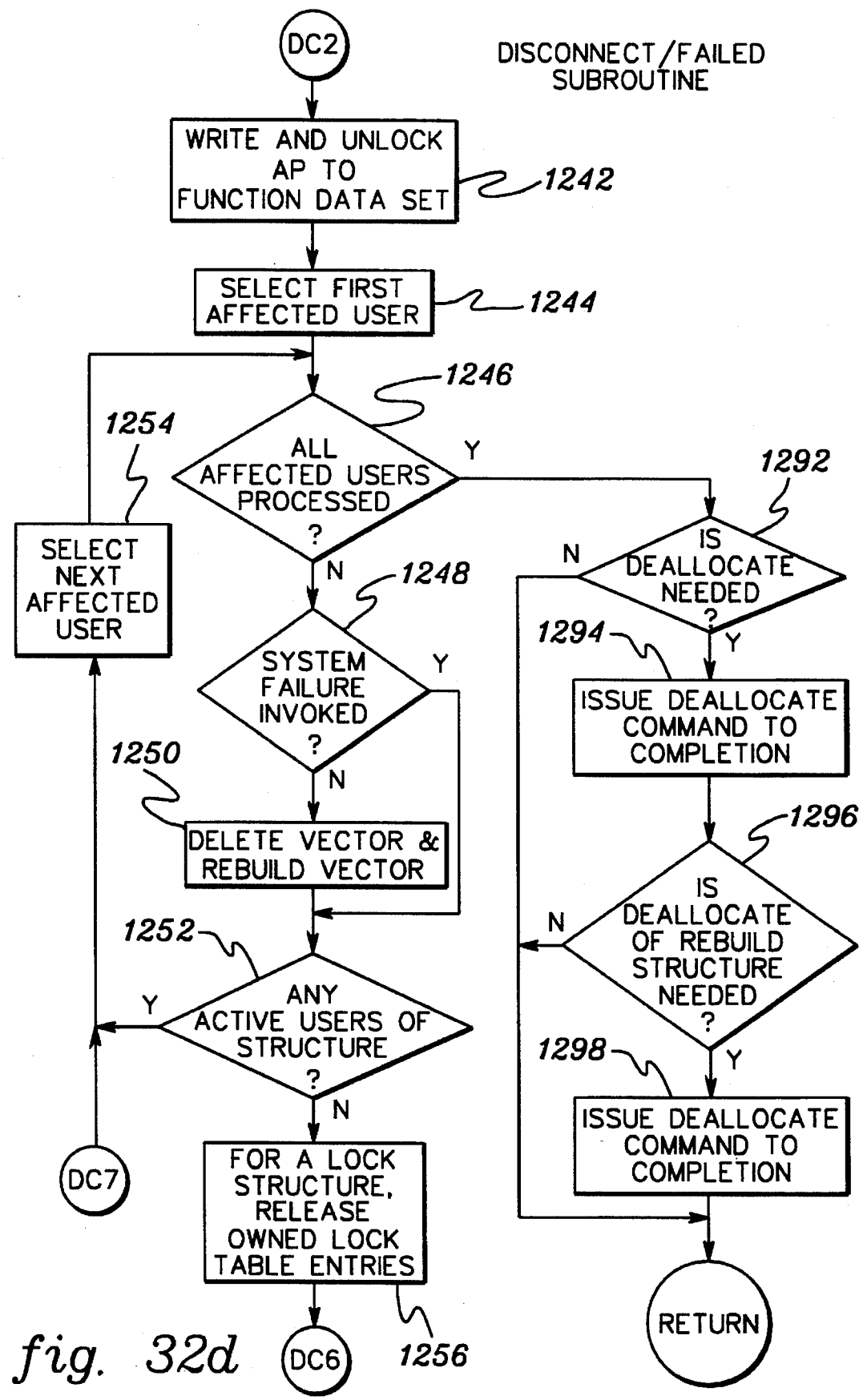
Figure 32E:
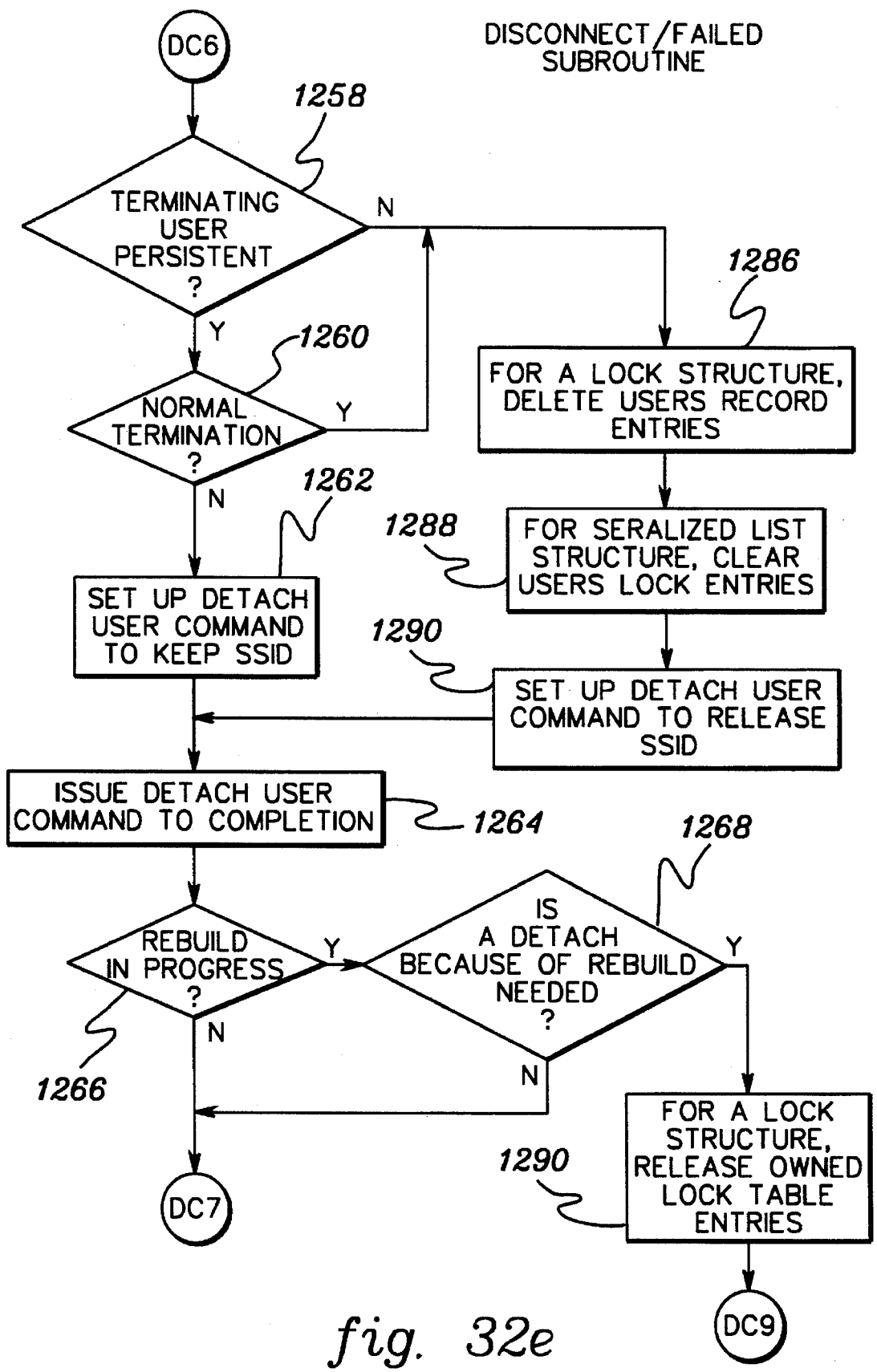
Figure 32F:
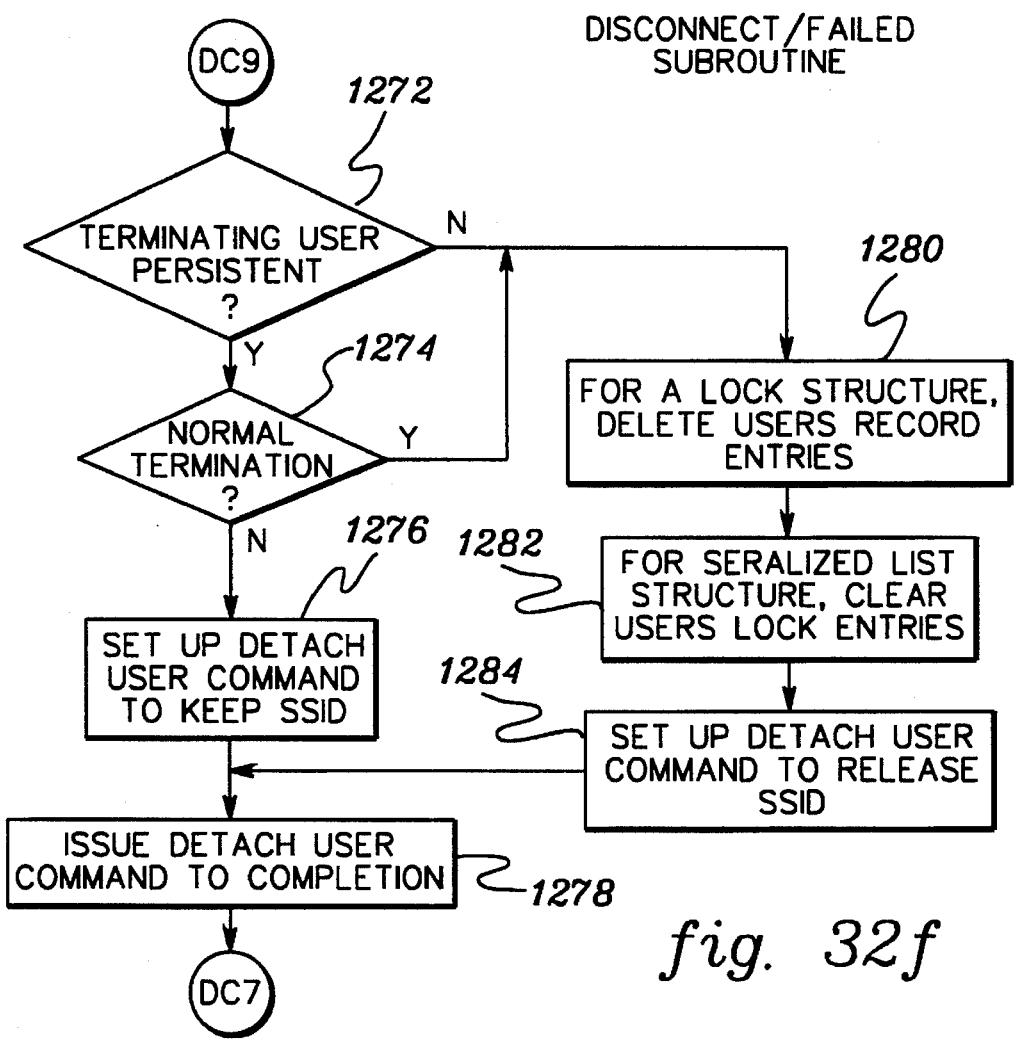

With reference to FIGS. 32–32f, one embodiment of the logic associated with the IXLDISC service is described in detail. Initially, a determination is made as to whether the structure user is a lock user and whether the user owns locks, INQUIRY 1170 "LOCK STRUCTURE USER AND OWNS ANY LOCKS." Should the user be a lock structure user and the lock structure user owns locks, abnormal disconnection/termination is indicated, STEP 1172 "INDICATE ABNORMAL DISCONNECT/TERMINATION." After such indication or if it is not a lock structure user that owns locks, a disconnect failed subroutine is invoked, STEP 1174 "INVOKE DISCONNECT FAILED SUBROUTINE," as described in detail below.

During the disconnect/failed subroutine, the active policy is read from the function data set and a lock (using, for example, the procedure described in co-pending U.S. patent application Ser. No. 07/548,516 for "Shared Data Access Serialization Method and Apparatus" by Insalaco et al. (Attorney Docket No. PO9-88-007), filed on Jul. 2, 1990, which is incorporated herein by reference in its entirety), is placed in the active policy, STEP 1176 "READ AND LOCK THE ACTIVE POLICY (AP) FROM FUNCTION DATA SET." The structure users affected by the disconnect/failed call are then selected, STEP 1178 "SELECT STRUCTURE USERS AFFECTED BY DISCONNECT/FAILED CALL." Further, the first affected user is selected, STEP 1180 "SELECT FIRST AFFECTED USER."

If all of the affected users have not been processed, INQUIRY 1182 "ALL AFFECTED USERS PROCESSED?", then the active policy image in virtual storage is updated to reflect the user record as terminating, STEP 1184 "UPDATE AP IMAGE IN STORAGE USER RECORD TERMINATING." Thereafter, the next affected user is selected, STEP 1186 "SELECT NEXT AFFECTED USER" and processing passes to INQUIRY 1182 "ALL AFFECTED USERS PROCESSED?"

When all of the affected users have been processed, the first affected user is selected, STEP 1188 "SELECT FIRST AFFECTED USER." If all of the affected users have not been processed, INQUIRY 1190 "ALL AFFECTED USERS PROCESSED," then a determination is made as to whether there are any active users of the structure, INQUIRY 1192 "ANY ACTIVE USERS OF STRUCTURE?" Should there be no active users of the structure, and the terminating user is persistent, INQUIRY 1194, and termination is not normal, INQUIRY 1196, the user record is marked in the image copy of the active policy as failed-persistent, STEP 1198 "MARK USER FAILED-PERSISTENT IN AP IMAGE," and processing continues, as described herein.

Should the terminating user not be persistent, INQUIRY 1194, or there is normal termination, INQUIRY 1196, then the assigned SSID in the active policy image is freed, STEP 1200 "FREE ASSIGNED SSID IN AP IMAGE." (As used herein, SSID refers to a subsystem ID, which is either an LCID for a cache structure or an UID for a list structure.)

Subsequent to marking the user as failed-persistent or after freeing the assigned SSID, a determination is made as to whether any failed persistent users exist, INQUIRY 1216 "ANY FAILED PERSISTENT USERS EXIST?" If failed persistent users do not exist and if the structure is persistent, INQUIRY 1218 "IS STRUCTURE PERSISTENT?" or if failed persistent users exist, then a determination is made as to whether rebuild is in progress, INQUIRY 1220 "REBUILD IN PROGRESS?" If rebuild is not in progress, then flow passes to STEP 1230 "CLEAR STRUCTURE REBUILD STATUS," and the rebuild confirm string and user sync confirm string are cleared. Subsequent to clearing the status, flow passes to STEP 1222 (FIG. 32a) "SELECT NEXT AFFECTED USER," and the next affected user is selected. Thereafter, flow passes to INQUIRY 1190 "ALL AFFECTED USERS PROCESSED?" and processing continues, as described herein.

Returning to INQUIRY 1220 (FIG. 32c) "REBUILD IN PROGRESS?", if rebuild is in progress, then a further determination is made as to whether the rebuild phase is earlier than the cleanup phase, INQUIRY 1224 "REBUILD PHASE EARLIER THAN CLEANUP." If the rebuild phase is earlier than the cleanup phase, and the new rebuild structure is allocated, INQUIRY 1226 "NEW REBUILD STRUCTURE ALLOCATED?", then an indication is made that deallocation of the new rebuild structure is needed, STEP 1228 "INDICATE DEALLOCATE OF NEW REBUILD STRUCTURE NEEDED." Subsequently, the structure rebuild status in the structure record is cleared, STEP 1230. In particular, the rebuild confirm string and user sync confirm string are cleared. Thereafter, processing continues with STEP 1222 (FIG. 32a) "SELECT NEXT AFFECTED USER."

Returning to INQUIRY 1226, if the rebuild structure is not allocated, processing continues with STEP 1222 (FIG. 32a) "SELECT NEXT AFFECTED USER."

Returning to INQUIRY 1224 (FIG. 32c) "REBUILD PHASE EARLIER THAN CLEANUP?", if the rebuild phase is not earlier than cleanup, then an indication is made that deallocation of the old rebuild structure is needed, STEP 1232. Subsequently, the structure rebuild status is cleared, STEP 1230, and processing continues with STEP 1222 (FIG. 32a) "SELECT NEXT AFFECTED USER."

Returning to INQUIRY 1218 (FIG. 32b) "IS STRUCTURE PERSISTENT?", if the structure is not persistent, then an indication is made in the active policy that deallocation is needed, STEP 1236 "INDICATE DEALLOCATE NEEDED." Thereafter, a determination is made as to whether the rebuild structure is allocated, INQUIRY 1238 "REBUILD STRUCTURE ALLOCATED." Should the rebuild structure be allocated, an indication is made that deallocation is needed for the rebuild structure, STEP 1239. Thereafter, or if the rebuild structure is not allocated, INQUIRY 1238, a determination is made as to whether rebuild is in progress, INQUIRY 1240 "REBUILD IN PROGRESS?" If rebuild is in progress, the structure rebuild status is cleared, STEP 1241 "CLEAR STRUCTURE REBUILD STATUS." In particular, the rebuild confirm string and the user sync confirm strings are cleared. Subsequent to clearing the rebuild status or if rebuild is not in progress, INQUIRY 1240, processing continues with STEP 1222 (FIG. 32a) "SELECT NEXT AFFECTED USER," as described herein.

If all of the affected users are processed, INQUIRY 1190, then the information located in the virtual storage image of the active policy is written to the function data set and the function data set is unlocked, STEP 1242 (FIG. 32d) "WRITE AND UNLOCK AP TO FUNCTION DATA SET."

Thereafter, the first affected user is selected, STEP 1244 "SELECT FIRST AFFECTED USER," and if all of the affected users have not been processed, INQUIRY 1246 "ALL AFFECTED USERS PROCESSED?", a check is made to determine if the disconnect/failed subroutine was invoked due to a system failure, INQUIRY 1248 "SYSTEM FAILURE INVOKED?" If not invoked by a system failure, then the vector and the rebuild vector are deleted, STEP 1250 "DELETE VECTOR AND REBUILD VECTOR." (The rebuild vector is created in the same manner as the vector, as described above.)

Subsequent to deleting the vectors, or if invoked by a system failure, a determination is made as to whether there exists any active users of the structure, INQUIRY 1252 "ANY ACTIVE USERS 0F STRUCTURE?" Should there be active users of the structure, the next affected user is selected, STEP 1254 "SELECT NEXT AFFECTED USER" and flow passes to INQUIRY 1246 "ALL AFFECTED USERS PROCESSED?"

If there are no active users of the structure, owned lock table entries of a lock structure are released, STEP 1256 "FOR A LOCK STRUCTURE, RELEASE OWNED LOCK TABLE ENTRIES." Thereafter, if a persistent user is being terminated, INQUIRY 1258, and there is an abnormal termination, INQUIRY 1260, a detach user command is set up in order to keep the SSID, STEP 1262 "SET UP DETACH USER COMMAND TO KEEP SSID." Subsequent to setting up the detach user command, it is processed to completion, STEP 1264 "ISSUE DETACH USER COMMAND TO COMPLETION."

After completing the detach user command, a determination is made as to whether rebuild is in progress, INQUIRY 1266 "REBUILD IN PROGRESS?" If rebuild is in progress, another inquiry is made to determine if a detach is needed because of rebuild, INQUIRY 1268 "IS A DETACH BECAUSE OF REBUILD NEEDED?" Should a detach not be needed or if rebuild is not in progress, flow passes to STEP 1254 (FIG. 32d) and the next affected user is selected, STEP 1254 (FIG. 32d) "SELECT NEXT AFFECTED USER." Thereafter, flow passes to INQUIRY 1246 "ALL AFFECTED USERS PROCESSED?" and processing continues as described herein.

Returning to INQUIRY 1268 (FIG. 32e) "IS A DETACH BECAUSE OF REBUILD NEEDED?", if a detach is needed because of rebuild, then the owned lock table entries for a lock structure are released, STEP 1270. Further, if the terminating user is persistent, INQUIRY 1272 (FIG. 32f), and termination is not normal, INQUIRY 1274, then the detach user command is set up to keep the SSID, STEP 1276 and processed to completion, STEP 1278 "ISSUE DETACH USER COMMAND TO COMPLETION." Subsequently, processing continues with STEP 1254 (FIG. 32d) "SELECT NEXT AFFECTED USER."

Returning to INQUIRY 1272 (FIG. 32f) "TERMINATING USER PERSISTENT?", if the terminating user is not persistent, or termination of the persistent user is normal, INQUIRY 1274, the users records for a lock structure are deleted, the users lock entries for a serialized list structure are cleared and the detach user command is set up to release the SSID, STEPS 1280, 1282 and 1284. Subsequently, the detach user command is processed to completion, STEP 1278, and flow passes to STEP 1254 (FIG. 32d) "SELECT NEXT AFFECTED USER."

Returning to INQUIRY 1258 (FIG. 32e) "TERMINATING USER PERSISTENT?", if a persistent user is not being terminated, or if a persistent user is terminating normally, INQUIRY 1260, the user record entries for a lock structure are deleted, STEP 1286, and user lock entries for a serialized list structure are cleared, STEP 1288. Thereafter, the detach user command is set up to release the SSID, STEP 1290, and the detach user command is processed to completion, STEP 1264. Subsequent to processing the detach user command, processing continues with STEP 1266, as described above.

Returning to INQUIRY 1246 (FIG. 32*d*) "ALL AFFECTED USERS PROCESSED?", if all of the affected users are processed, then a check is made to see if deallocation is needed, INQUIRY 1292 "IS DEALLOCATE NEEDED?" If it is needed, the deallocate command is processed to completion, STEP 1294 "ISSUE DEALLOCATE COMMAND TO COMPLETION." After issuing the deallocate command, a determination is made as to whether deallocation of the rebuild structure is needed, INQUIRY 1296. Should deallocation be necessary, then the deallocate command is processed to completion, STEP 1298, and processing of the disconnect/failed subroutine is complete.

Returning to INQUIRY 1292, if deallocate is not needed, or if deallocate of the rebuild structure is not needed, INQUIRY 1296, then processing of the disconnect/failed subroutine is complete.

Returning to INQUIRY 1192 (FIG. 32*a*) "ANY ACTIVE USERS OF STRUCTURE?", should there be any active users, notification of disconnect or failure is initiated, STEP 1300 "INITIATE NOTIFICATION OF DISCONNECT OR FAILURE." In one embodiment, the logic associated with notification of a disconnect or failure is described in detail with reference to FIG. 34.

Figure 34:
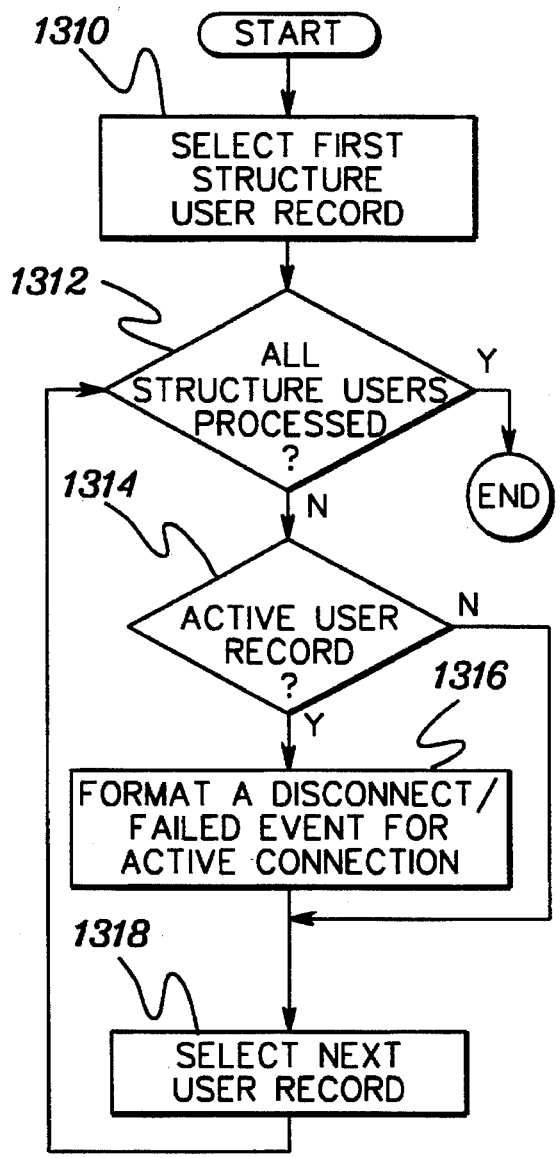
FIG. 34 illustrates one example of the logic associated with a notification for disconnect/failed routine, in accordance with the present invention.

Referring to FIG. 34, the first structure user record is selected, STEP 1310 "SELECT FIRST STRUCTURE USER RECORD" and if all of the structure users have been processed, INQUIRY 1312 "ALL STRUCTURE USERS PROCESSED?", processing of the notification logic is complete. Otherwise, if all of the structure users are not processed, and the selected structure user is an active user record, INQUIRY 1314 "ACTIVE USER RECORD?", a disconnect/failed event for active connection is formatted, STEP 1316. Subsequent to formatting the disconnect/failed event or if the selected structure user is not an active user record, the next user record is selected, STEP 1318 "SELECT NEXT USER RECORD" and flow passes to INQUIRY 1312 "ALL STRUCTURE USERS PROCESSED?"

Returning to FIG. 32*a* and, in particular, STEP 1300, after notification is initiated, the next affected user is selected, STEP 1222 "SELECT NEXT AFFECTED USER" and processing passes to INQUIRY 1190 "ALL AFFECTED USERS PROCESSED?" Processing continues as described above.

When a connection is terminated normally or abnormally, either via disconnect or a failure, a set of resources are cleaned up by XES on behalf of the connector. The set of resources cleaned up is different based on the type of failure (abnormal or normal), the connection and structure disposition, and the type of structure.

For all types of connections, the connection is placed in an available state on normal connection termination which makes the connection identifier available for reuse. The connection is placed in a failed-persistent state on abnormal termination of a connection having specified a connect disposition of KEEP, which does not permit the connection identifier to be reused.

The following summarizes the resources cleaned up for a connection termination by structure type:

Cache Structure—For normal termination or abnormal termination regardless of the connection disposition the following resources are cleaned up: local cache vector; cast-out locks held by the terminating connection; and registered interest in named directory entries.

List Structure—For a list structure, the list notification vector is released if allocated, regardless of the type of termination or the connection disposition.

Lock Structure—For normal termination of a connection to a lock structure with no locks held, the record list is released, if allocated. Management responsibilities of resources managed by the terminated connection are assigned to a surviving connected XES user.

For abnormal termination of a connection with a connection disposition of delete, the lock entries associated with the failed connection are cleared. Management responsibilities of resources managed by the terminated connection are assigned to a surviving connected XES user. The record list is released, if allocated.

For abnormal termination of a connection with a connection disposition of KEEP, the lock entries associated with the failed connection are cleared. Management responsibilities of resources managed by the terminated connection are assigned to a surviving connected XES user. The record list remains intact for recovery use.

Serialized List Structure—For all terminations, normal or abnormal, the list notification vector is released, if allocated.

For normal termination of a connection to a serialized list structure or abnormal termination of a serialized list user, which is not persistent, the lock entries containing the terminated user's connection identifier are cleared. Requests pending because of a lock held by the failed connection are redriven. The redriven requests race in order to obtain the lock associated with the request, and a new list of waiting requests is built for the requests that lose the race.

For abnormal termination of a serialized list user which is persistent, lock table entries owned by the terminating user are not cleared.

Requests for a lock owned by a failed-persistent user are rejected.

When a connected XES user issues an IXLDISC request, the IXLDISC service is considered complete when all connections to the structure have acknowledged the disconnect request. Surviving connectors acknowledge a disconnect by responding to an event reported to their event exit, as described in detail above.

Figure 35:
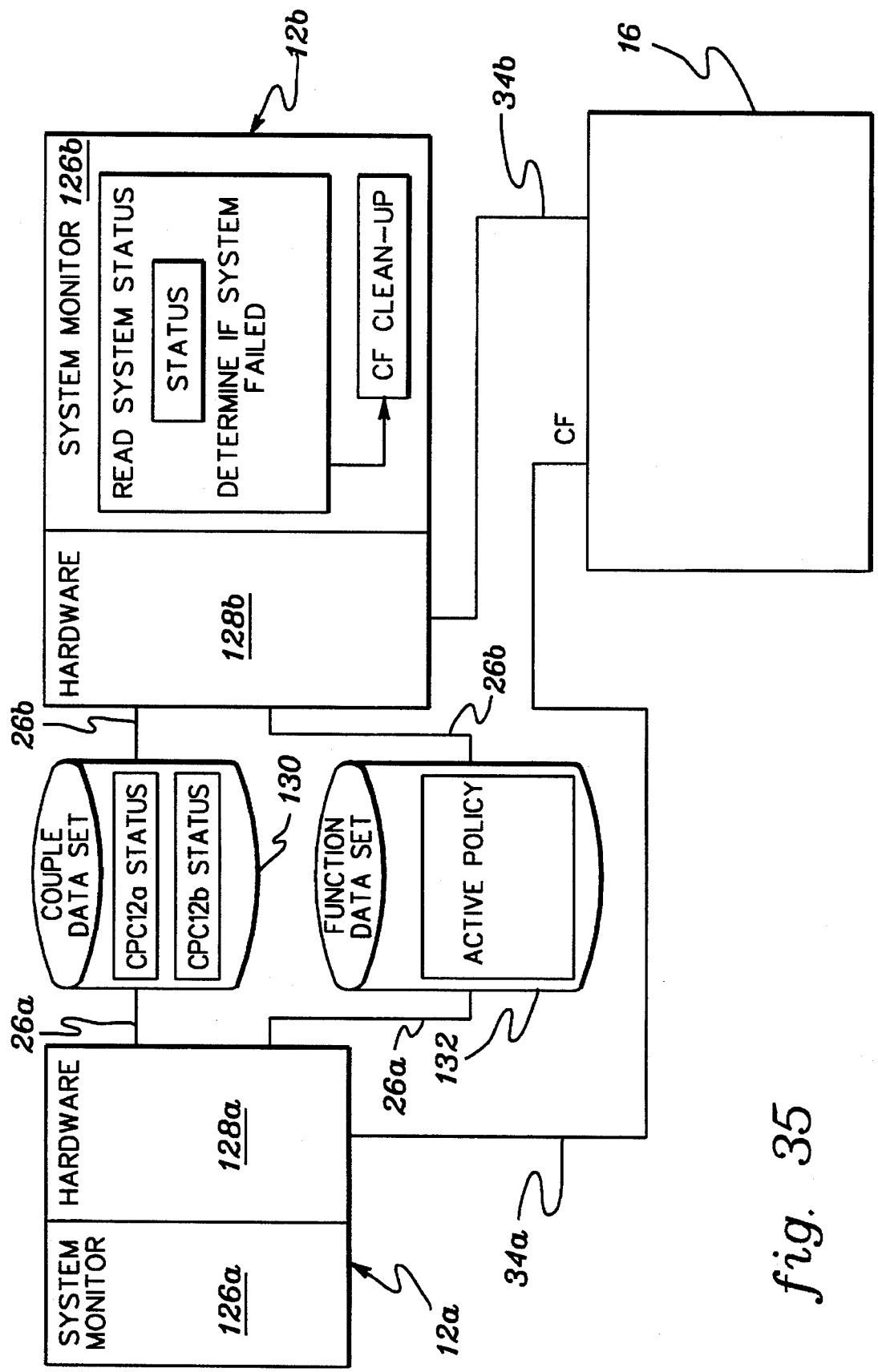
FIG. 35 depicts an overview diagram of a system monitor determining that a system has failed and invoking the coupling facility cleanup routine, in accordance with the principles of the present invention.

In addition to IXLDISC, a disconnect or failed event may be initiated by a coupling facility cleanup service. As shown in FIG. 35, when a system monitor has detected failure of a system, the coupling facility cleanup service is given control. In particular, CPC 12*a* and CPC 12*b* each include a system monitor 126*a*, 126*b*, respectively. The system monitors are located within an operating system (not shown) of its respective CPC and each system monitor monitors the status of CPC 12*a* and CPC 12*b*. When a system monitor, such as system monitor 126*b* detects a failure within coupling facility 16, control is given to a cleanup service. As described above with FIG. 14, each CPC is coupled to coupling facility 16 and the couple and function data sets, via hardware 128*a*, 128*b*, respectively.

Figure 36:
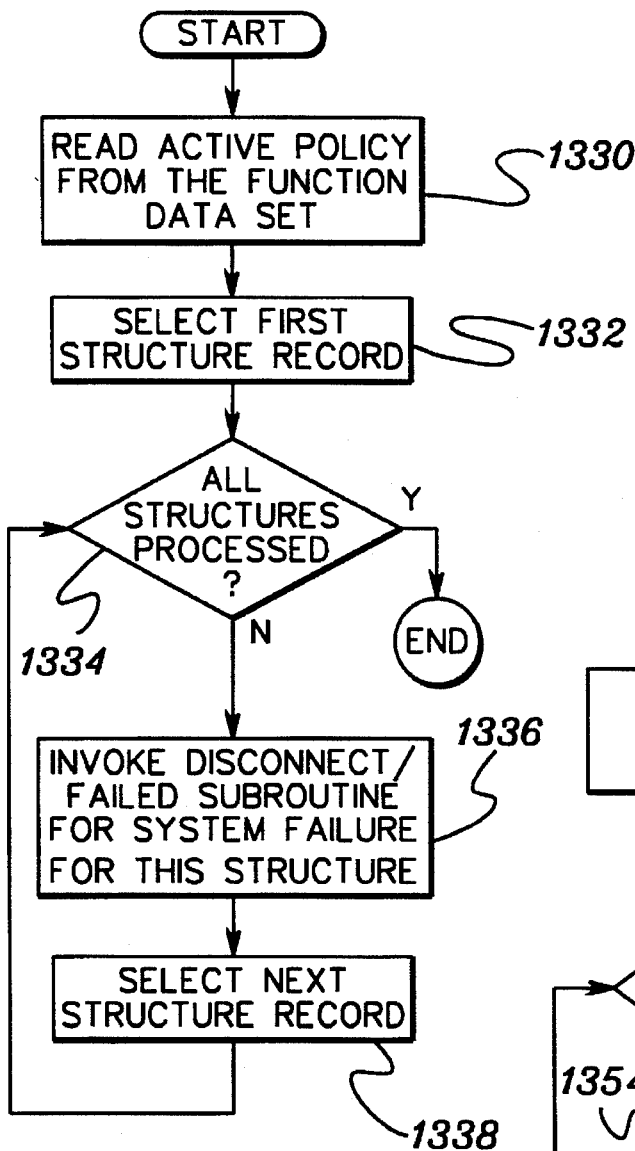
FIG. 36 depicts one embodiment of the logic associated with a coupling facility cleanup routine, in accordance with the principles of the present invention.

One embodiment of the logic associated with a cleanup service is described in detail with reference to FIG. 36. Referring to FIG. 36, the active policy is read from the function data set, STEP 1330 "READ ACTIVE POLICY (AP) FROM FUNCTION DATA SET." From the active policy, the first structure record is selected, STEP 1332 "SELECT FIRST STRUCTURE RECORD." When all of the structures are processed, INQUIRY 1334 "ALL STRUCTURES PROCESSED?", processing of the cleanup service is complete.

However, if there are structures to be processed, the disconnect/failed subroutine for system failure, described above with reference to FIGS. 32*a*–32*f* is invoked for this structure, STEP 1336. Thereafter, the next structure record is selected, STEP 1338 "SELECT NEXT STRUCTURE RECORD" and flow passes to INQUIRY 1334 "ALL STRUCTURES PROCESSED."

In addition to IXLDISC and the coupling facility cleanup service, an end of task service is available for initiating a disconnect/failed event. One embodiment of an end of task service is described in detail with reference to FIG. 37.

Figure 37:
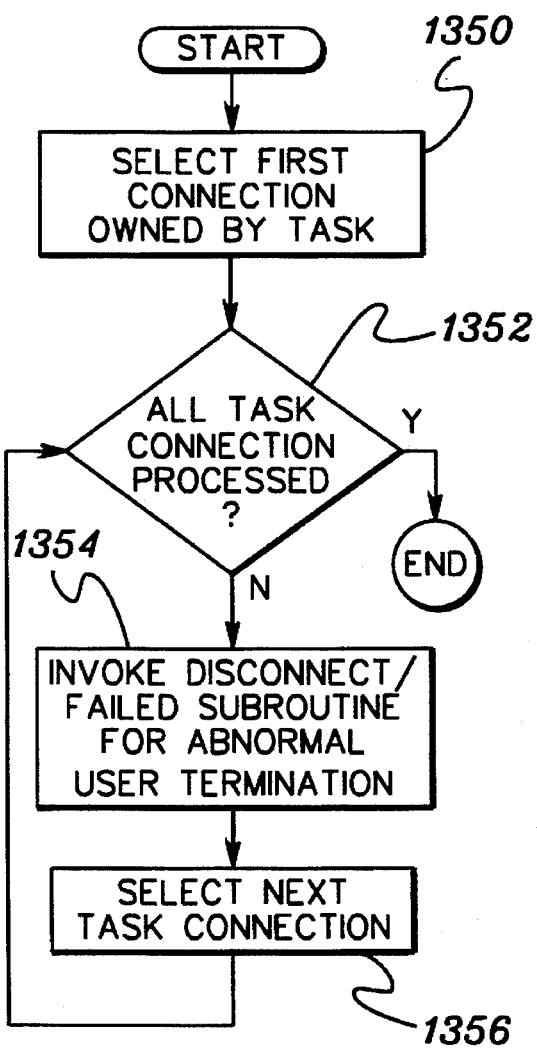
FIG. 37 depicts one embodiment of the logic associated with an end-of-task routine, in accordance with the principles of the present invention.

Referring to FIG. 37, the first connection owned by the ending task is selected, STEP 1350 "SELECT FIRST CONNECTION OWNED BY TASK." If all of the task connections are processed, INQUIRY 1352 "ALL TASK CONNECTIONS PROCESSED?", processing of the end of task service is complete. Otherwise, if there are task connections to be processed, the disconnect/failed subroutine for abnormal user termination is invoked, as described above with reference to FIGS. 32*a*–32*f*, STEP 1354. Subsequently, the next task connection is selected, STEP 1356 "SELECT NEXT TASK CONNECTION", and flow returns to INQUIRY 1352 "ALL TASK CONNECTIONS PROCESSED?"

Figure 38:
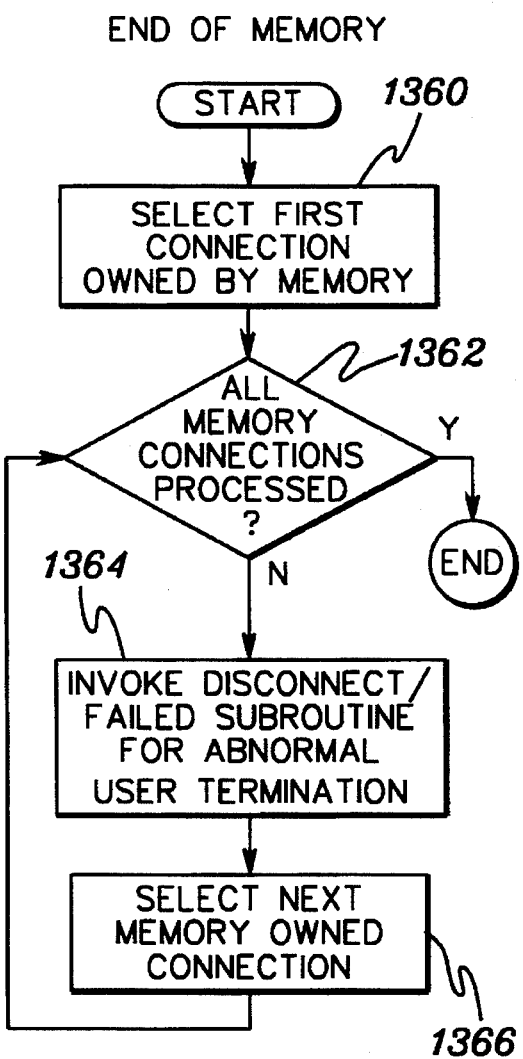
FIG. 38 depicts one embodiment of the logic associated with an end-of-memory routine, in accordance with the principles of the present invention.

In addition to the above, a disconnect/failed event may be initiated by an end of memory service, one example of which is described below with reference to FIG. 38.

The first connection owned by the memory is selected, STEP 1360 "SELECT FIRST CONNECTION OWNED BY MEMORY," and if all the memory connections are processed, INQUIRY 1362 "ALL MEMORY CONNECTIONS PROCESSED?", processing of the end of memory service is complete. Should there be memory connections to be processed, INQUIRY 1362, the disconnect/failed subroutine for abnormal user termination, described above with reference to FIGS. 32*a*–32*f* is invoked, STEP 1364. Thereafter, the next memory owned connection is selected, STEP 1366, and processing flows to INQUIRY 1362 "ALL MEMORY CONNECTIONS PROCESSED?"

Described above is one embodiment of a rebuild process in which two instances of a structure are created with the same name. In accordance with the principles of the present invention, the two instances do not need to be duplicates of one another but, instead, may contain different characteristics. In particular, in one example, the characteristics include: the second structure may be of a different size than the first structure or it can be located in a different coupling facility; or other attributes unique to the type of coupling facility structure may be different for each structure. In one example, these different attributes are specified on IXLCONN.

Notification of phases of the rebuild processing are communicated to all active users of the structure. An operating system defined set of synchronization points are reported to all active users of the structure. A facility is provided through which users of a structure can define synchronization events which are then made visible to all active users through operating system services.

The rebuild process may be stopped by a program interface or an operator command.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

We claim:

1. A method by which one or more programs rebuild a storage structure in a data processing system comprising one or more processors coupled to one or more Structured External Storage (SES) facilities, each SES controlled by an associated SES processor, and each said storage structure located within a SES, said method comprising the steps of:

allocating the first storage structure in the first SES, the first storage structure having one or more program defined characteristics, said program defined characteristics including controls for accessing, serializing, and requesting manipulation of information stored within said first storage structure by the SES processor in the first SES;

connecting the one or more programs executing in the one or more processors to said first storage structure in the first SES and utilizing a name for identifying the first storage structure to allow use of said first storage structure by the one or more programs;

initiating a rebuilding process for said first storage structure, including the steps of:

maintaining the connecting step for continuing the shared access of the first storage structure in the first SES by the one or more programs during the rebuilding process;

allocating a second storage structure distinct from said first storage structure in any SES, said second storage structure having one or more program defined characteristics different from said first storage structure for which the program defined characteristics include controls for accessing, serializing, and requesting manipulation of information stored in said second storage structure by a SES processor in said any SES;

connecting said one or more programs to said second storage structure with the second storage structure utilizing the name of the first storage structure to allow use of said second storage structure by said one or more programs while the first storage structure and data contained therein remain on-line, building said second storage structure while said one or more programs share access of said second storage structure, while continuing to have on-line shared access to the first storage structure; and establishing said second storage structure as a replacement for said first storage structure by operation of said one or more programs regardless of whether the first and second storage structures are different.

2. The method of claim 1, said building step further comprising:

building information in said second storage structure by commands from said one or more programs to the SES processor of the SES containing the second storage structure.

3. The method of claim 2, further comprising the step of:

building information from processor storage by said one or more programs.

4. The method of claim 2, further comprising a process for copying information into said second storage structure by said one or more programs issuing commands to the SES processor in the first SES and to the SES processor in said any SES containing the second storage structure, and if the first and second storage structures are in the same SES issuing the commands to the SES processor of the SES containing both the first and second storage structures.

5. The method of claim 1, further comprising the step of said initiating step initiated by a program or by an operator command to begin the rebuild process.

6. The method of claim 5, further comprising the steps of said rebuild process having a number of phases, and controlling said phases by said one or more programs.

7. The method of claim 6, further comprising the step of responding to each of said phases by said one or more programs.

8. The method of claim 7, further comprising progressing to a next phase by said one or more programs after a response from said one or more programs is received for a previous phase.

9. The method of claim 8, further comprising determining when responses are received by all of said one or more programs before progressing to said next phase.

10. The method of claim 6, further comprising notifying said one or more of said programs said notification comprising identification of said one or more programs and identification of said phase.

11. The method of claim 5, further comprising stopping said rebuild process after said initiating step has commenced, said stopping step comprises using a program or an operator command to end a rebuild process.

12. The method of claim 5, further comprising terminating execution of any of said one or more programs connected to said first storage structure or to said second storage structure after initiating said rebuild process.

13. The method of claim 12, further comprising:
   removing connection of said terminated program to said first storage structure and said second storage structure; and
   deallocating said first storage structure and said second storage structure.

14. A method by which one or more programs rebuild a storage structure in a data processing system comprising one or more processors, each of said one or more processors coupled to one or more Structured External Storage (SES) processors, said storage structure within a SES, said method comprising the steps of:
   enabling on-line use of a first storage structure by allocating in a SES said first storage structure with one or more program defined characteristics, said program defined characteristics including controls for SES accessing, serializing, and requesting manipulation of information stored within said storage structure, said first storage structure having a name;
   connecting one or more programs executing on one or more processors to said first storage structure, and said one or more programs sharing access of said first storage structure;
   initiating rebuilding of said first storage structure;
   continuing execution of said one or more connected programs during rebuilding of said first storage structure on-line;
   enabling use of a newly allocated second storage structure distinct from said first storage structure by allocating in any SES said second storage structure with one or more program defined characteristics different from said first storage structure;
   connecting said one or more programs to said second storage structure with shared on-line access; and
   establishing said second storage structure by said one or more programs as a replacement for said first storage structure.

15. The method of claim 14, wherein said establishing step comprises said one or more connected programs building information into said second storage structure.

16. The method of claim 15, further comprising the step of building information from processor storage by said one or more connected programs.

17. The method of claim 15, further comprising the step of accessing said first storage structure to copy information into said second storage structure.

18. The method of claim 14, wherein said initiating step comprises using a program or an operator command to begin a rebuild process.

19. The method of claim 18, wherein said rebuild process has a number of phases, and further comprising control of said phases by said one or more connected programs.

20. The method of claim 19, further comprising the step of responding to each of said one or more phases by said one or more programs.

21. The method of claim 20, further comprising the step of progressing to a next phase after a response is received for a previous phase.

22. The method of claim 21, wherein said response is received from all programs of said first storage structure.

23. The method of claim 19, further comprising notification to one or more of said programs, said notification comprising identification of said one or more connected programs and identification of said phase.

24. The method of claim 18, further comprising the step of stopping said rebuild process after said initiating step has commenced said stopping step comprises using a program or an operator command to end a rebuild process.

25. The method of claim 18, further comprising terminating execution of one of said one or more programs connected to said first storage structure or said second storage structure after commencement of said rebuild process.

26. The method of claim 25, further comprising:
   removing connection of said terminated program to said first storage structure and said second storage structure; and
   deallocating said first storage structure and said second storage structure.

27. The method of claim 14, wherein said first storage structure and said second storage structure have the same name.

* * * * *

UNITED STATES PATENT AND TRADEMARK OFFICE
CERTIFICATE OF CORRECTION

PATENT NO. : 5,515,499
DATED      : May 7, 1996
INVENTOR(S): Ruth A. Allen et al.

It is certified that error appears in the above-identified patent and that said Letters Patent are hereby corrected as shown below:

Col. 6, line 33         "FIG. 25" should be --FIG. 22--.

Col. 19, line 15        "(r)" should begin a new paragraph.

Signed and Sealed this

Twenty-fourth Day of September, 1996

*Attest:*

BRUCE LEHMAN

*Attesting Officer*        *Commissioner of Patents and Trademarks*